DATA PROCESSING SYSTEM HAVING PROGRAMABLY VARIABLE SELECTION FOR READING AND RECORDING INTERLACED DATA ON A MAGNETIC DRUM

Filed Aug. 11, 1965 26 Sheets-Sheet 1

INVENTOR
ANTHONY R. TALARCZYK
BY Charles A. Johnson
ATTORNEY

Nov. 28, 1967 A. R. TALARCZYK 3,355,718

DATA PROCESSING SYSTEM HAVING PROGRAMABLY VARIABLE SELECTION FOR READING AND RECORDING INTERLACED DATA ON A MAGNETIC DRUM

Filed Aug. 11, 1965 26 Sheets-Sheet 4

Nov. 28, 1967 A. R. TALARCZYK 3,355,718

DATA PROCESSING SYSTEM HAVING PROGRAMABLY VARIABLE SELECTION FOR READING AND RECORDING INTERLACED DATA ON A MAGNETIC DRUM

Filed Aug. 11, 1965 26 Sheets-Sheet 5

Nov. 28, 1967 A. R. TALARCZYK 3,355,718

DATA PROCESSING SYSTEM HAVING PROGRAMABLY VARIABLE SELECTION FOR READING AND RECORDING INTERLACED DATA ON A MAGNETIC DRUM

Filed Aug. 11, 1965 26 Sheets-Sheet 15

Nov. 28, 1967 A. R. TALARCZYK 3,355,718

DATA PROCESSING SYSTEM HAVING PROGRAMABLY VARIABLE SELECTION FOR READING AND RECORDING INTERLACED DATA ON A MAGNETIC DRUM

Filed Aug. 11, 1965

3,355,718

DATA PROCESSING SYSTEM HAVING PROGRAMMABLY VARIABLE SELECTION FOR READING AND RECORDING INTERLACED DATA ON A MAGNETIC DRUM

Anthony R. Talarczyk, Bloomington, Minn., assignor to Sperry Rand Corporation, New York, N.Y., a corporation of Delaware Filed Aug. 11, 1965, Ser. No. 478,885
30 Claims. (Cl. 340—172.5)

This invention relates generally to data processing systems, and more particularly, it relates to data processing systems wherein magnetic drum storage elements are utilized. Additionally, this invention relates to a programmably variable selection system for determining the reading and recording interlace arrangement of data words on the surface of the magnetic drum.

*Introduction*

This invention finds particular application in electronic computer industry. Consideration of the invention in the environment of electronic computers is believed to clearly set forth one unusually advantageous application of this invention and its accompanying advantages over the prior art. Digital electronic computers often utilize information represented and stored in the form of digitized data signals, often in the binary number system where it is necessary only to distinguish 1's and 0's. One technique for storing data signals employs magnetizable material disposed on the surface of equipment which commonly takes the form of a rotatable drum assembly. Such drums are normally coated with a magnetizable material to form a layer which can be readily magnetically altered in discrete areas. After the drum is coated with the magnetizable material, it is conveniently termed a record member. When the binary number system is employed, the individual binary digits are commonly referred to as bits of data, and respectively occupy a small portion of the recording surface of the record member. The discrete portions are magnetized to one state of magnetic remanence for a binary 1 and the opposite state of magnetic remanence for a binary 0. In order that the recorded data be readily available to fixed reading heads, the record member is rotated or moved at high speeds past the reading transducers. Transducer members having magnetic flux defining pole pieces, and generally referred to in the art as read/write heads, normally cooperate with the data storage device to transmit data signals to be stored magnetically on the surface, and to read stored data signals from the surface. As a selected area passes a selected transducer, information is read therefrom, or stored therein, by the activation of the transducer in said member which is disposed in close proximity to the magnetizable surface, but out of contact therewith.

For use by electronic computers, the bits are commonly associated in predetermined groups of bits. These groups usually have a predetermined number of bits and are individually commonly referred to as data words, machine words, operands, or other terms of art which are commonly used.

Magnetic drums are normally utilized in conjunction with electronic computers, and electronic computers may operate on data words in several different ways. One use of the magnetic drum made by electronic computers is the continuous storing action required for serial recording of sequentially occurring data words without a great deal of manipulation being performed by the computer on the individual data words. Such operation allows nearly continuous recording on the surface of the drum or nearly continuous reading from the surface of the drum. A common example of such continuous action is the buffering of data words for matching information handling rates of two or more equipments. Another operation often encountered in the utilization of magnetic drum systems by an electronic computer is to read a particular data word from the surface of the magnetic drum, perform an arithmetic manipulation on the data word, and restore the result at another location on the magnetic drum. The amount of manipulation performed on the data word will determine the elapsed time between the act of reading from the magnetic drum and the recording of the result thereon. Yet another operation commonly performed in the use of a magnetic drum system is to search the contents of the respective storage locations on the surface of the magnetic drum against a predetermined identifier word for purposes of locating a given file of information.

The magnetic drum is normally driven at a uniform speed so that the space-sequential locations on the surface of the drum occur in a fixed time relationship. Accordingly, it can be seen that for certain applications such as the continuous storing operation, that a minimum time between storage locations is desired to give the maximum operating rate and to provide maximum efficiency of the use of the computers transmission time. Similarly, when manipulation is to be performed on the data word read from a magnetic drum and the results restored thereon, it is desirable to accomplish the manipulation and restore the data during the same revolution of the drum in order to achieve maximum efficiency in the utilization of the computer's time. In the event an address cannot be accessed during the same drum revolution, it is necessary to wait a full drum cycle time before the information can be restored on the drum.

To accommodate the different data processing requirements and rates of occurrence, drum systems have been developed wherein sequentially addressable locations are physically spaced, commonly referred to as interlaced, around the periphery of the drum. These systems provide for the sequentially addressable storage locations to be off-set spatially by a predetermined number of data word storage locations. For instance, an interlace of two would find the sequential addressable locations spaced every other spatial location around the periphery of the drum. In a similar manner an interlace of four would find the sequentially addressable storage locations spaced every fourth data word storage location around the periphery of the drum. In a similar manner an interlace of eight would find the sequentially addressable storage locations spaced every eighth position and an interlace of sixteen would have these sequentially addressable locations spaced every sixteenth spatial position around the periphery. The system of interlace provides for a variable time elapse between the occurrence of sequentially addressable word locations.

Systems have been developed for manually changing the interlace selection for the magnetic drum system. The manual selection involves stopping the operation of the computing equipment and the magnetic drum system, removing certain selected wired circuits, and replacing the removed circuits with alternate circuits which control and effect the interlace alteration. Such a manual system is an inefficient use of the magnetic drum system operational time, and does not provide for the dynamically programmably variable selection of the interlace by a computing system which may be performing a plurality of problem solutions, each of which require a different interlace setting. For instance, in an operating system wherein the magnetic drum is utilized as an intermediate storage system, it may be that a list of data is to be read sequentially into the system from another source, thereby requiring a relatively low interlace, for instance, an interlace of two. After these data words have been read in and processed, and the data processing system moves on to another portion of the problem, it may be desired to load the magnetic drum with a series of operands which are to be arithmetically manipulated. If the programmer has predetermined that a higher interlace is desired to allow computation time for performing the arithmetic manipulation between the readout and the restore operations, it may be desirable to change the interlace of the operation of the magnetic drum to provide a more efficient use of the computer's time. As stated above, in the past it would be necessary to cause the electronic computer to stop and the magnetic drum system to be disabled so that circuitry could physically be changed thereby effecting the interlace alteration. This invention attends itself to providing a control system which permits the interlace of the magnetic drum storage system to be programmably altered by an associated electronic computer without requiring the electronic computer to be stopped, and without requiring the physical changing of electronic circuits in the magnetic drum system. Such a programmably alterable interlace provides efficiency in the use of the electronic computer's operational time, and eliminates the need for a skilled technician being in attendance during the operation of the magnetic drum system for changing the electronic circuits as required in the prior systems.

To accomplish the foregoing improvement in data processing systems having a programmable computer and at least one magnetic drum record member, control apparatus is provided for use in such an improved data processing system, including means for storing a computer supplied function word indicative of a specified drum operation and designating the selected interlace, means for decoding the specified operation and the interlace designator, means for reading prerecorded angular address words from the magnetic drum, each angular address word indicative of an addressable location on the magnetic drum, means responsive to the interlace decoding means for shifting the angular address by a predetermined amount determined by the interlace selection, and means for comparing the shifted angular address to a computer-specified angular address for determining when the desired storage location is available for the specified operation.

*Objects and drawings*

It is an object of the present invention to provide a new and improved data processing system.

It is a further object of this invention to provide an improved data processing system utilizing a magnetic drum storage system.

It is yet another object of this invention to provide an improved data storage system having a programmably alterable interlace capability.

It is an additional object of this invention to provide a novel data storage system in which sequentially addressable data word storage locations may be programmably interlaced in a predetermined spatial relationship around the periphery of a magnetic drum record member.

Another object of this invention is to provide a dynamically programmable control apparatus for altering the spatial relationship of sequentially addressable storage locations around the periphery of a magnetic drum by interlacing addressable locations for effectively altering the frequency of sequential data word transmission to and from the magnetic drum.

A still further object of this invention is to provide an improved magnetic drum control unit which is responsive to a computer-generated function word for dynamically altering the interlace selection for controlling the spatial arrangement of sequentially addressable storage locations on the surface of a magnetic drum.

Still a further object of this invention is to provide an improved control apparatus for controlling the operation of a plurality of magnetic drum record members, and for selecting the interlace storage format for each of such members.

Other objects and advantages of the invention will appear as the detailed description thereof proceeds in the light of the drawings forming a part of this application, in which.

Figures 1, 5A, 5B, 5C, 5D:
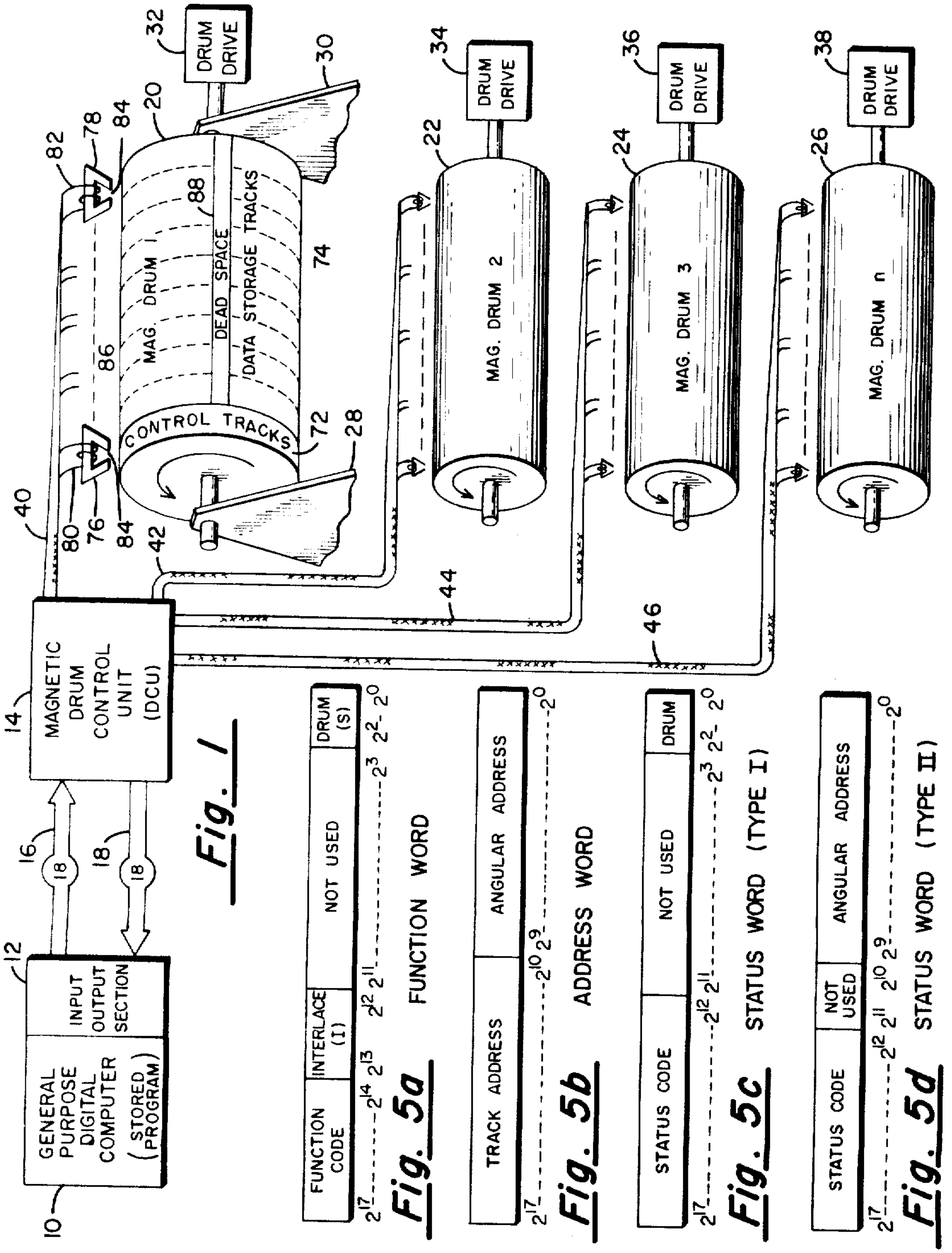
FIGURE 1 is a schematic and block diagram of a data processing system and illustrates data-flow paths to the plurality of magnetic drums from a computer and the data-flow paths to the computer from the magnetic drums through the magnetic drum control unit which provides the dynamically programmable interlace selection for the handling of data words on the magnetic drums.
Figure 6:
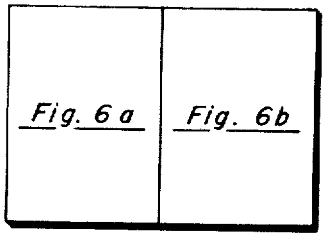
Figure 4:
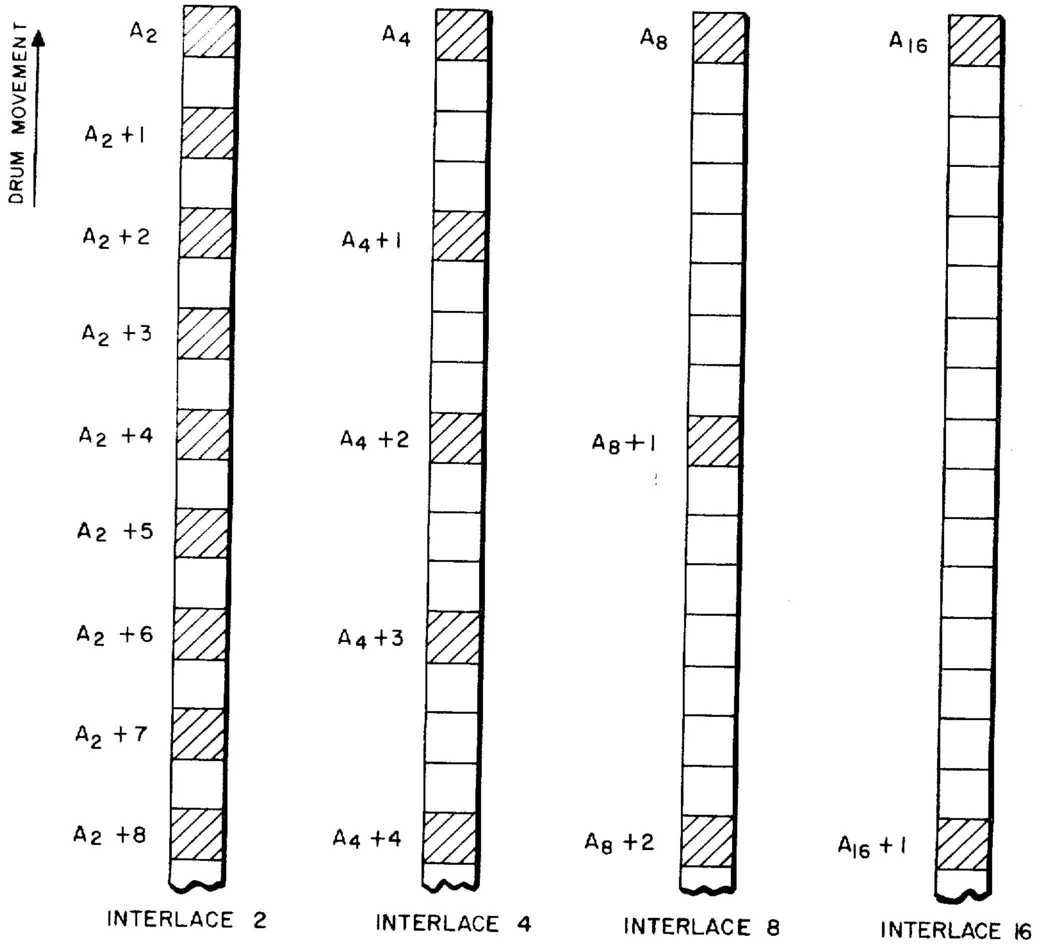
Figure 7A:
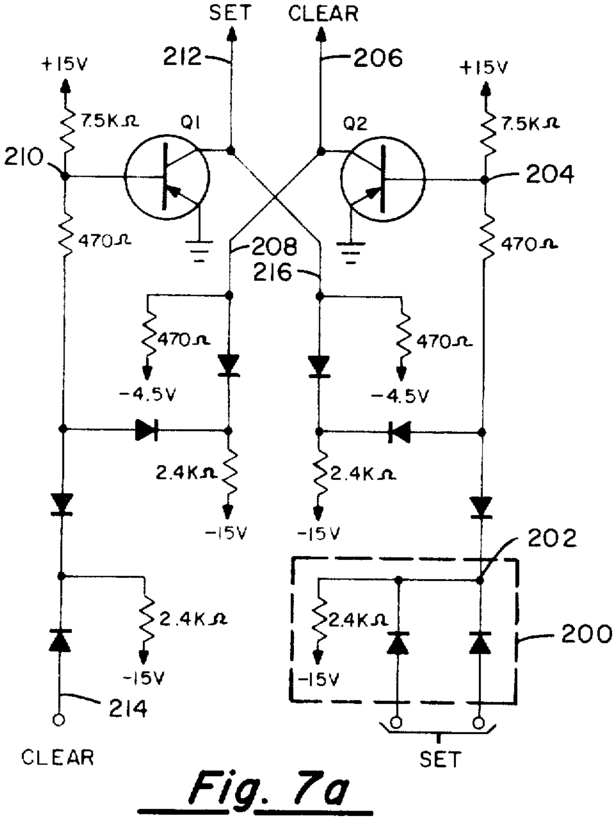
Figure 7B:
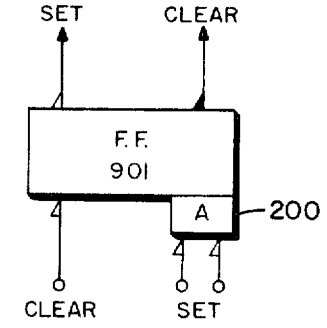
Figure 8A:
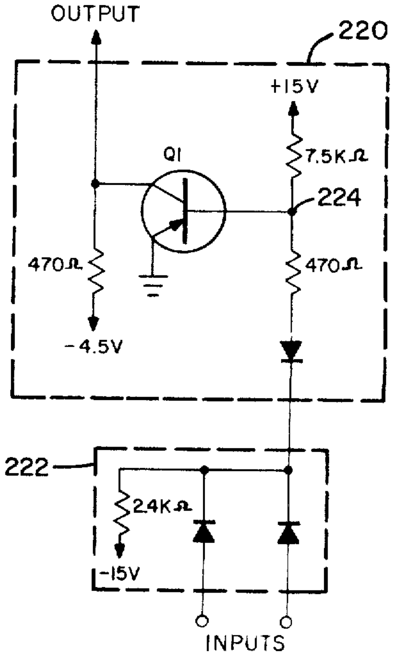
Figure 8B:
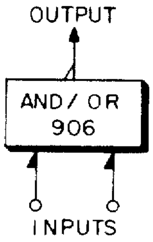
Figure 8C:
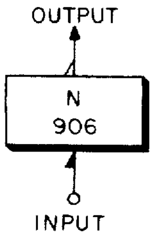
Figures 9A, 9B, 10A, 10B:
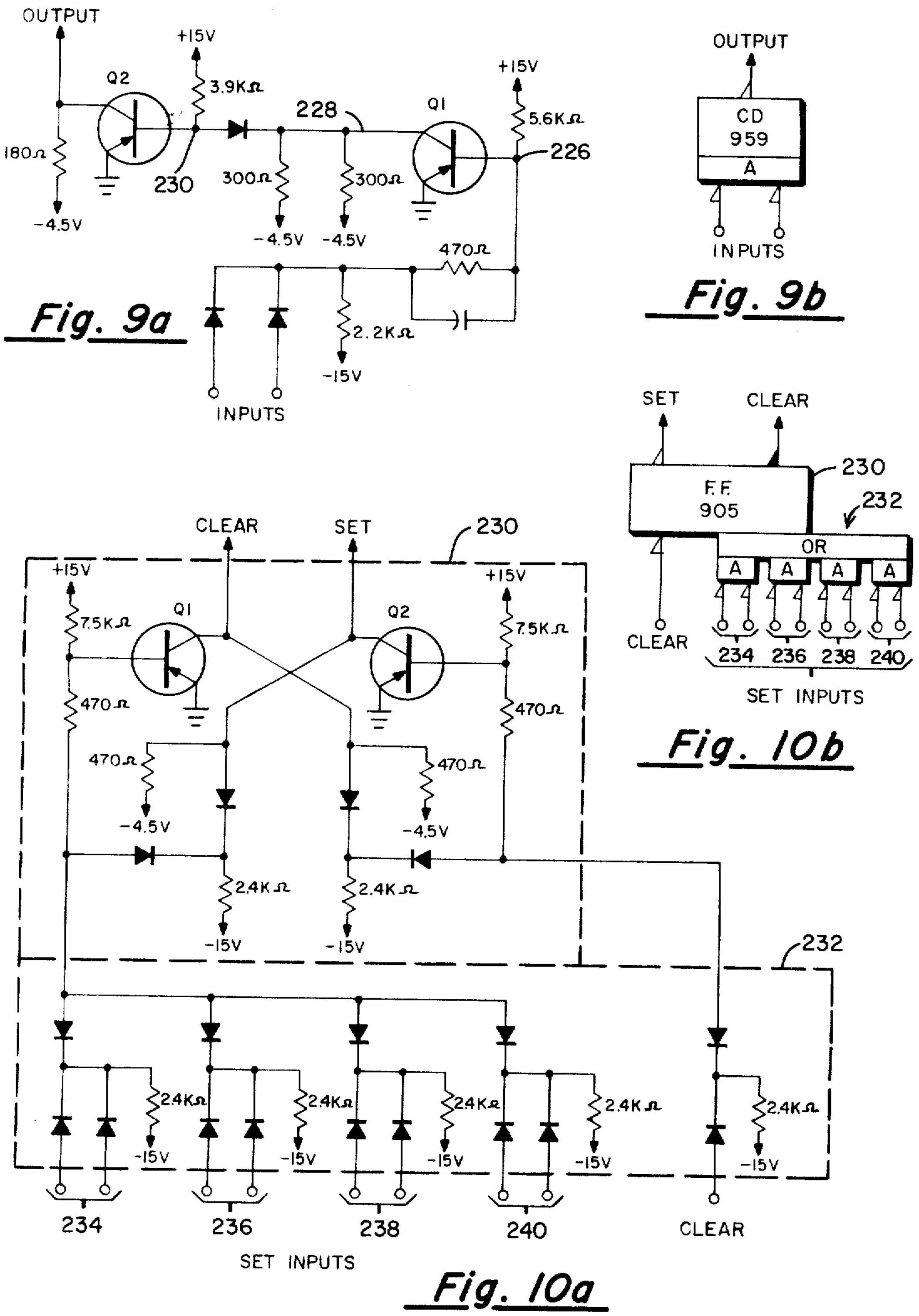
Figures 11A, 11B:
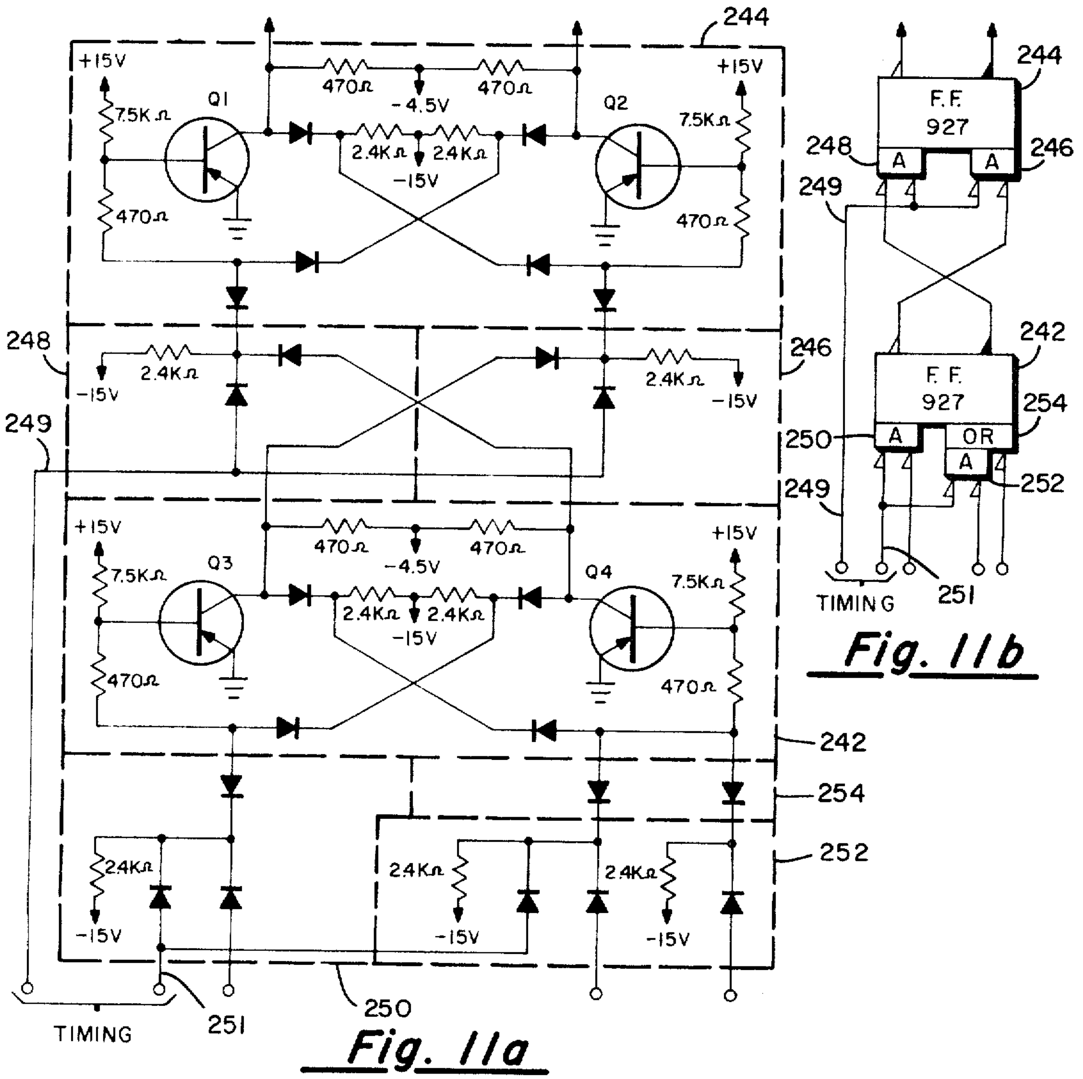
Figure 12A:
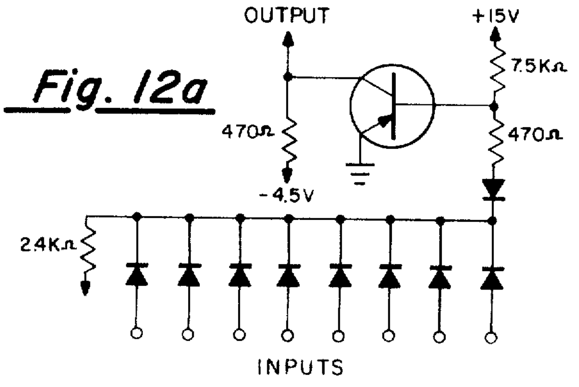
Figure 12B:
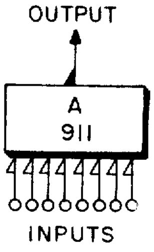
Figure 13A:
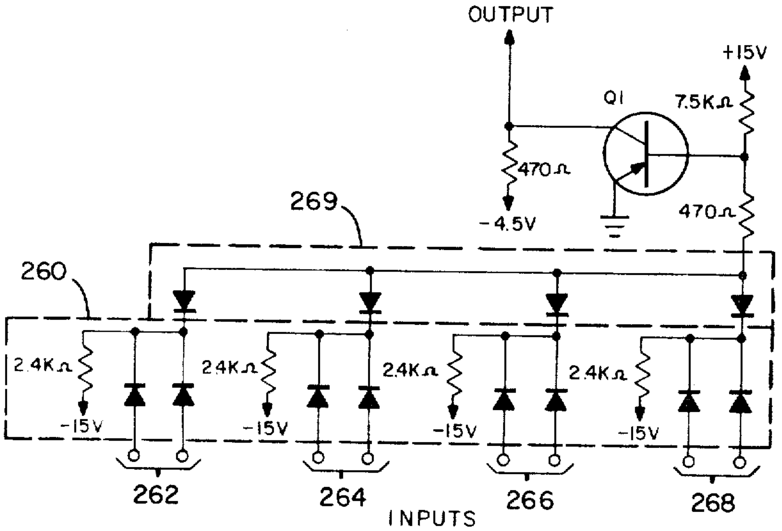
Figure 13B:
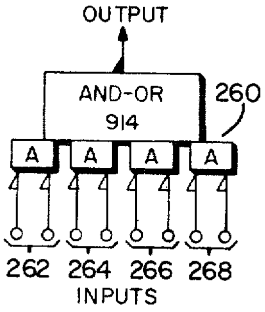
Figure 14A:
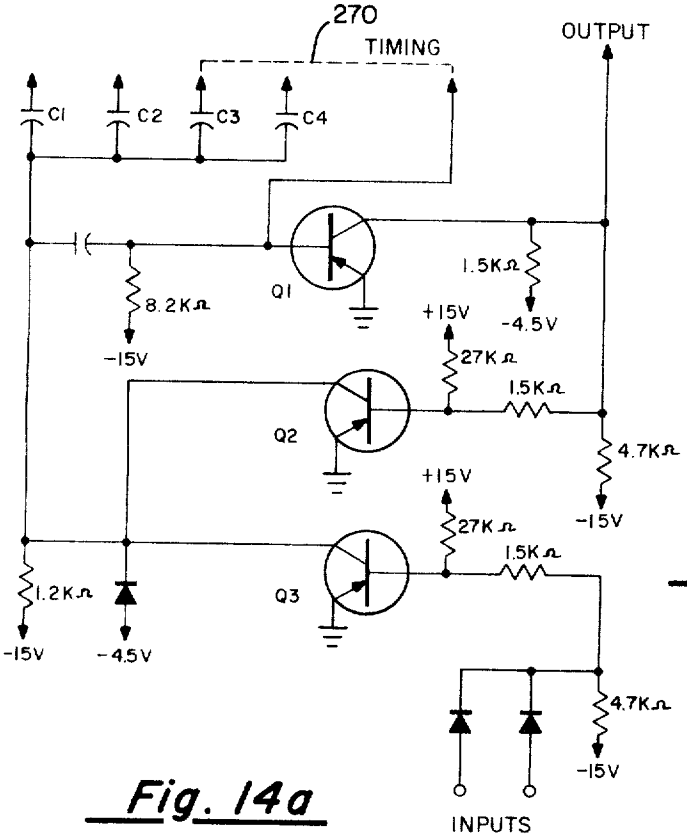
Figure 14B:
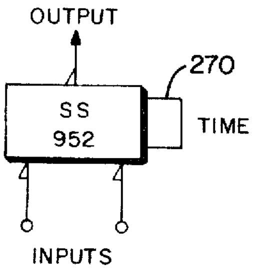
Figure 15A:
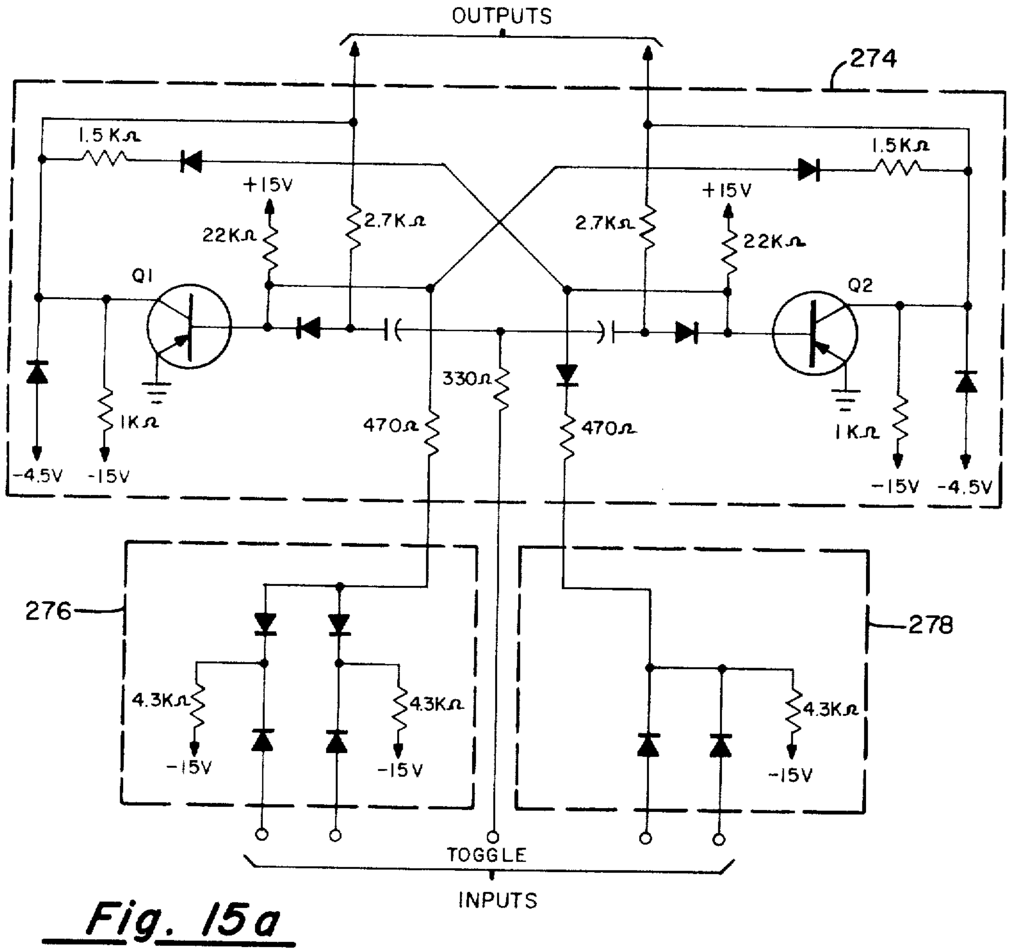
Figure 15B:
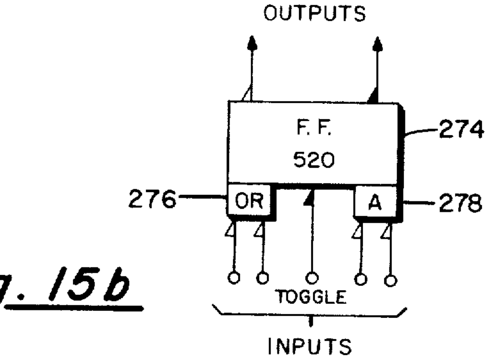
Figure 16:
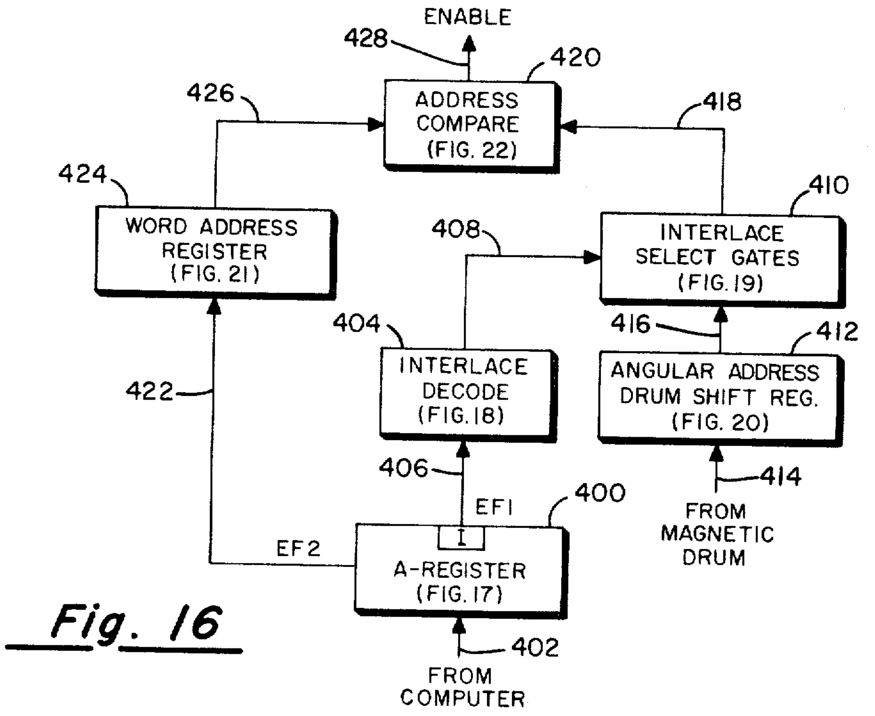
Figure 17:
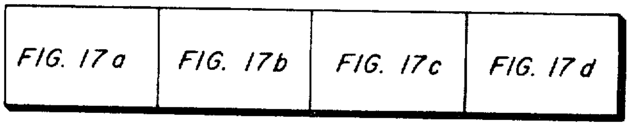
Figure 19:
Figure 20:
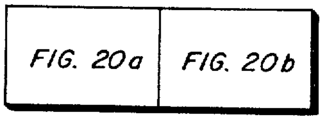
Figure 21:
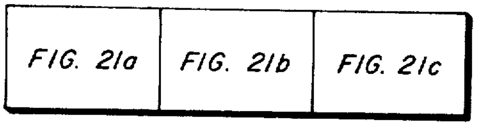
Figure 18:
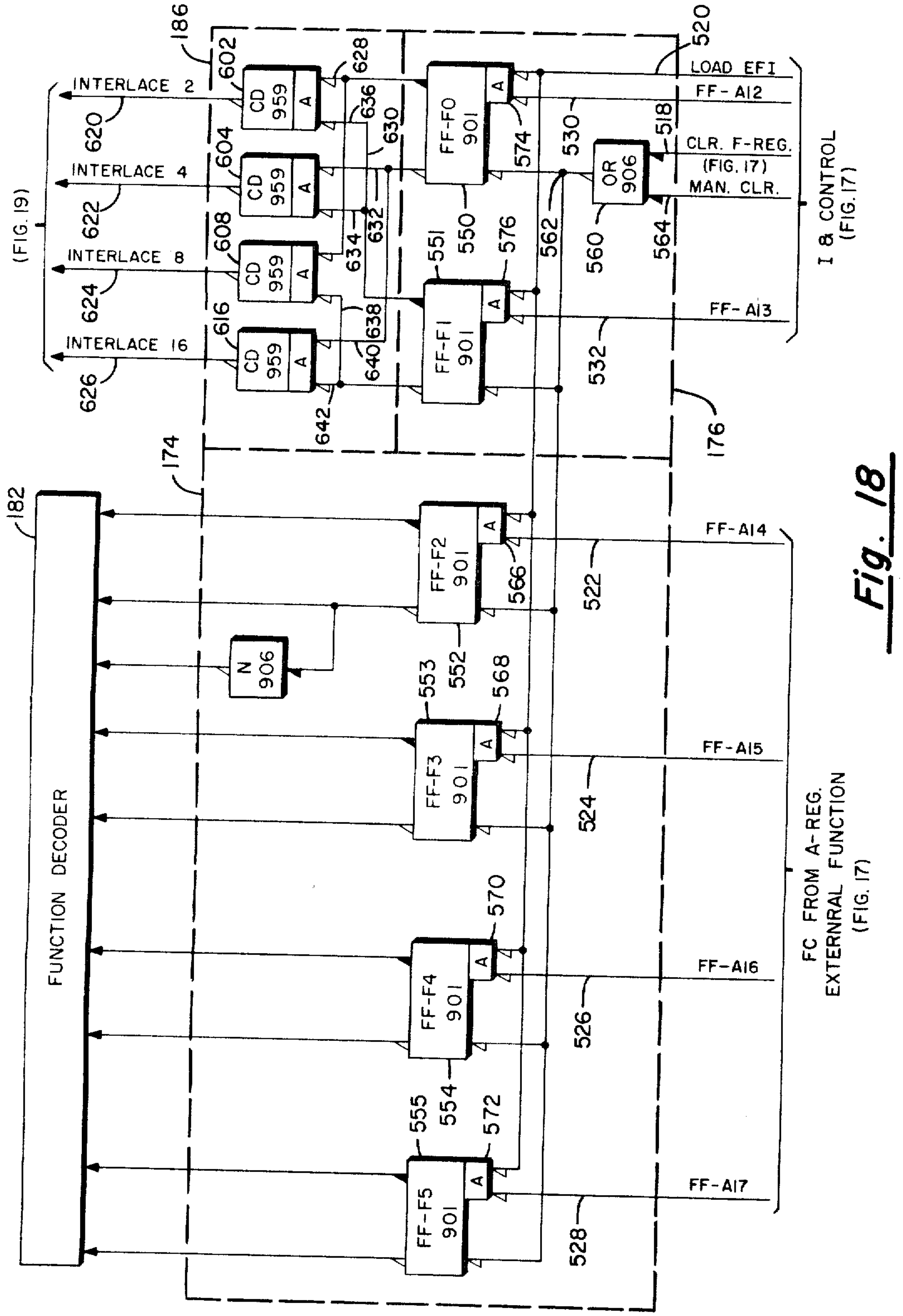
Figure 19A:
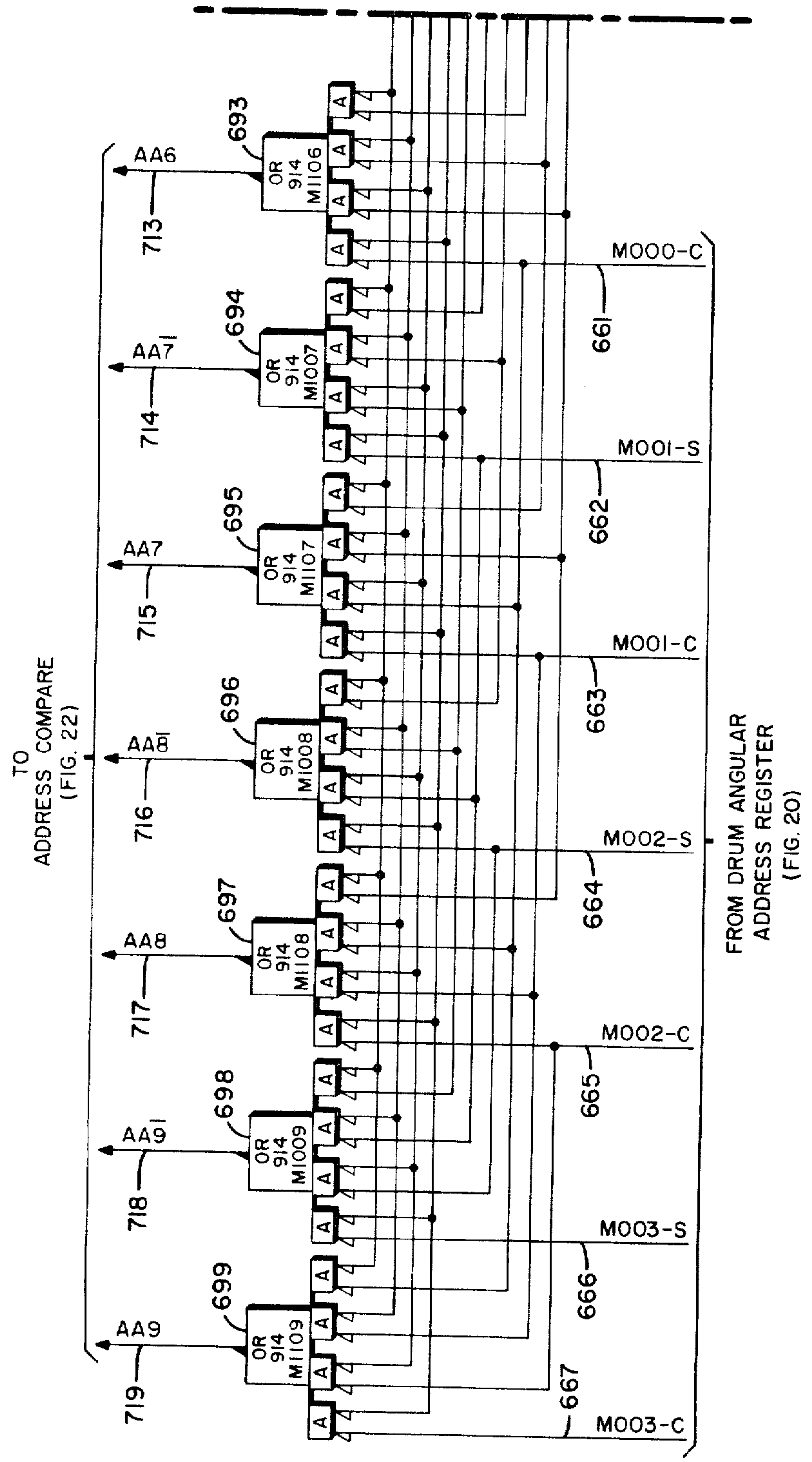
Figure 19B:
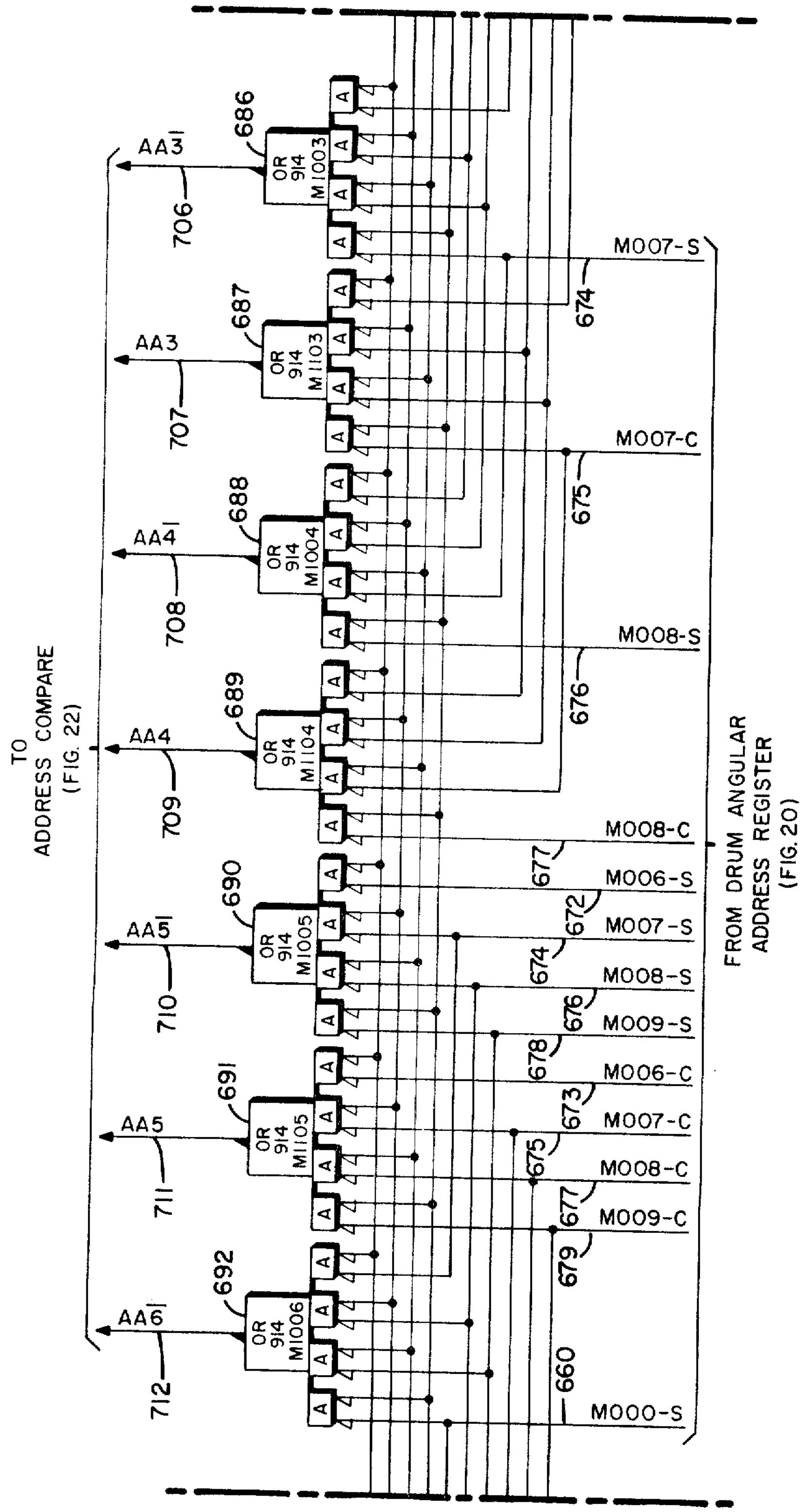
Figure 19C:
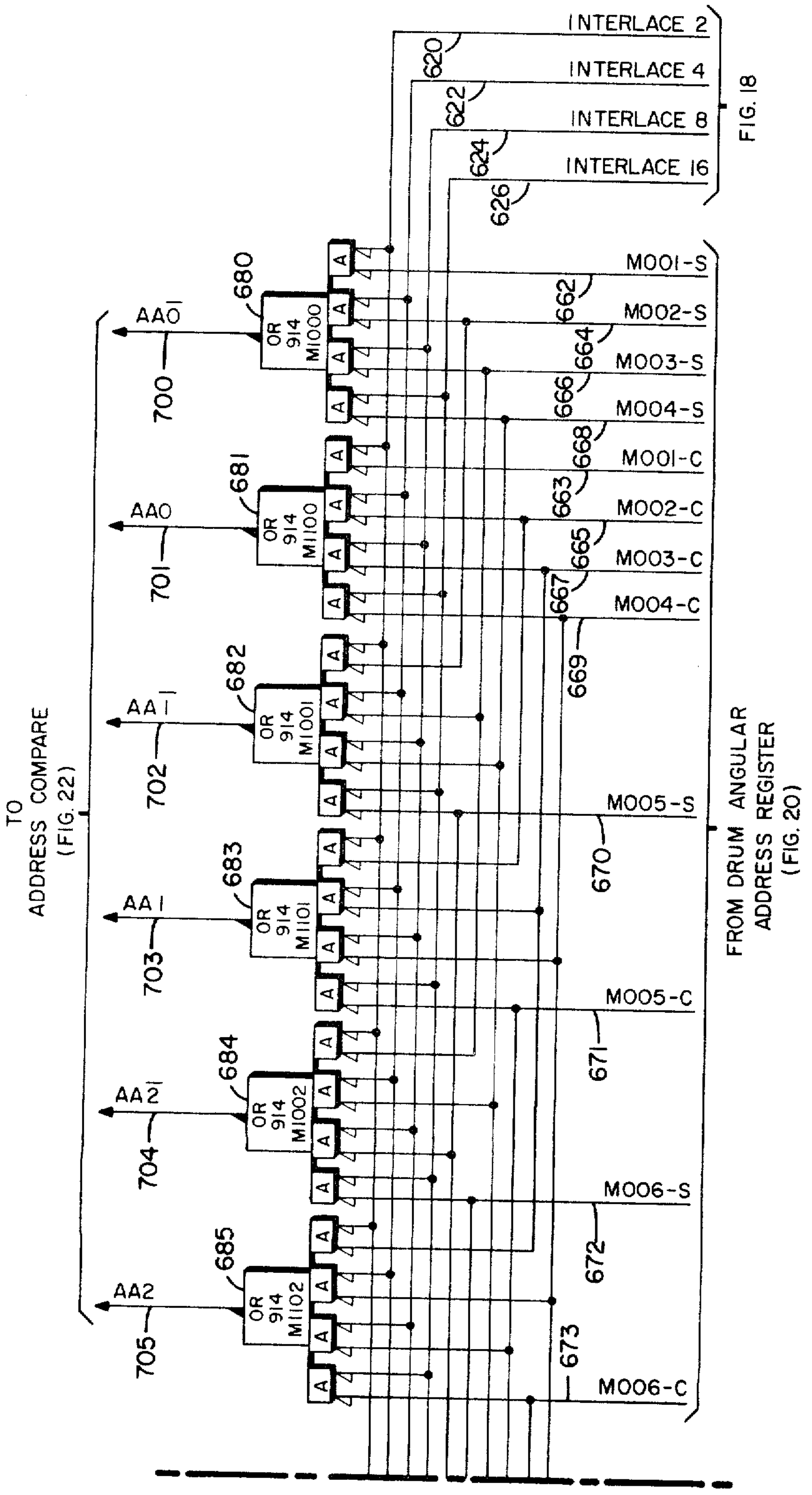
Figure 20A:
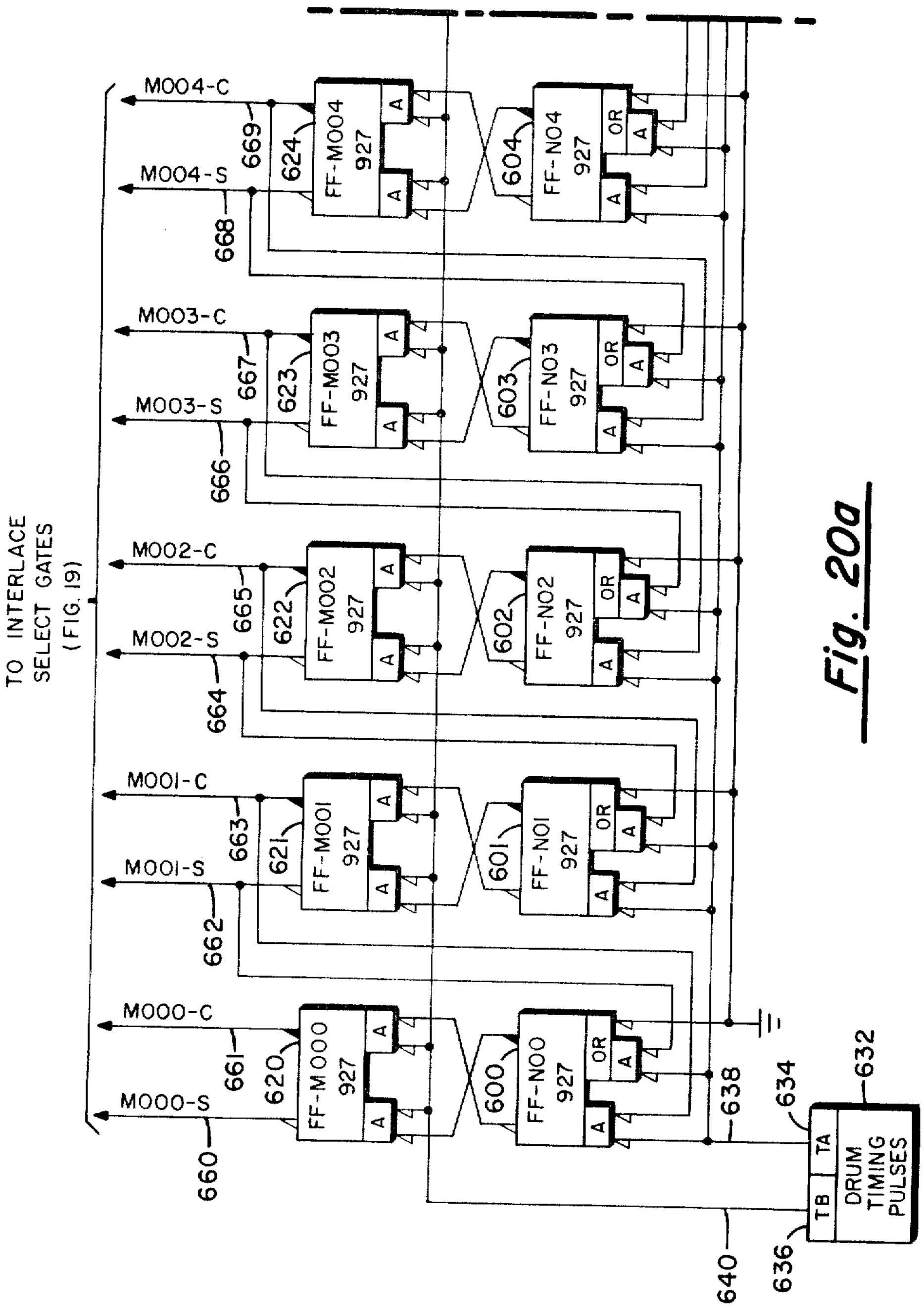
Figure 20B:
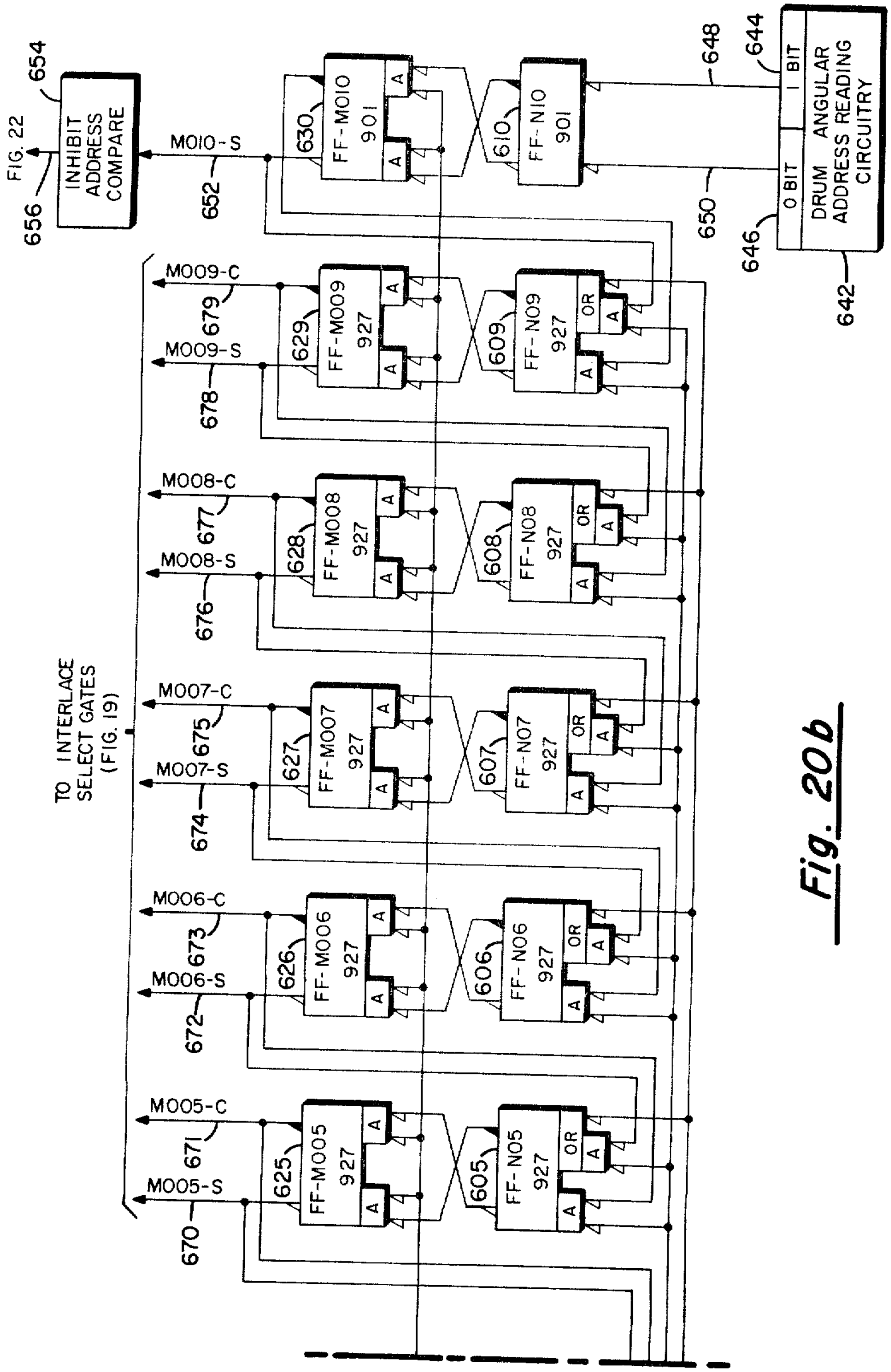
Figure 21A:
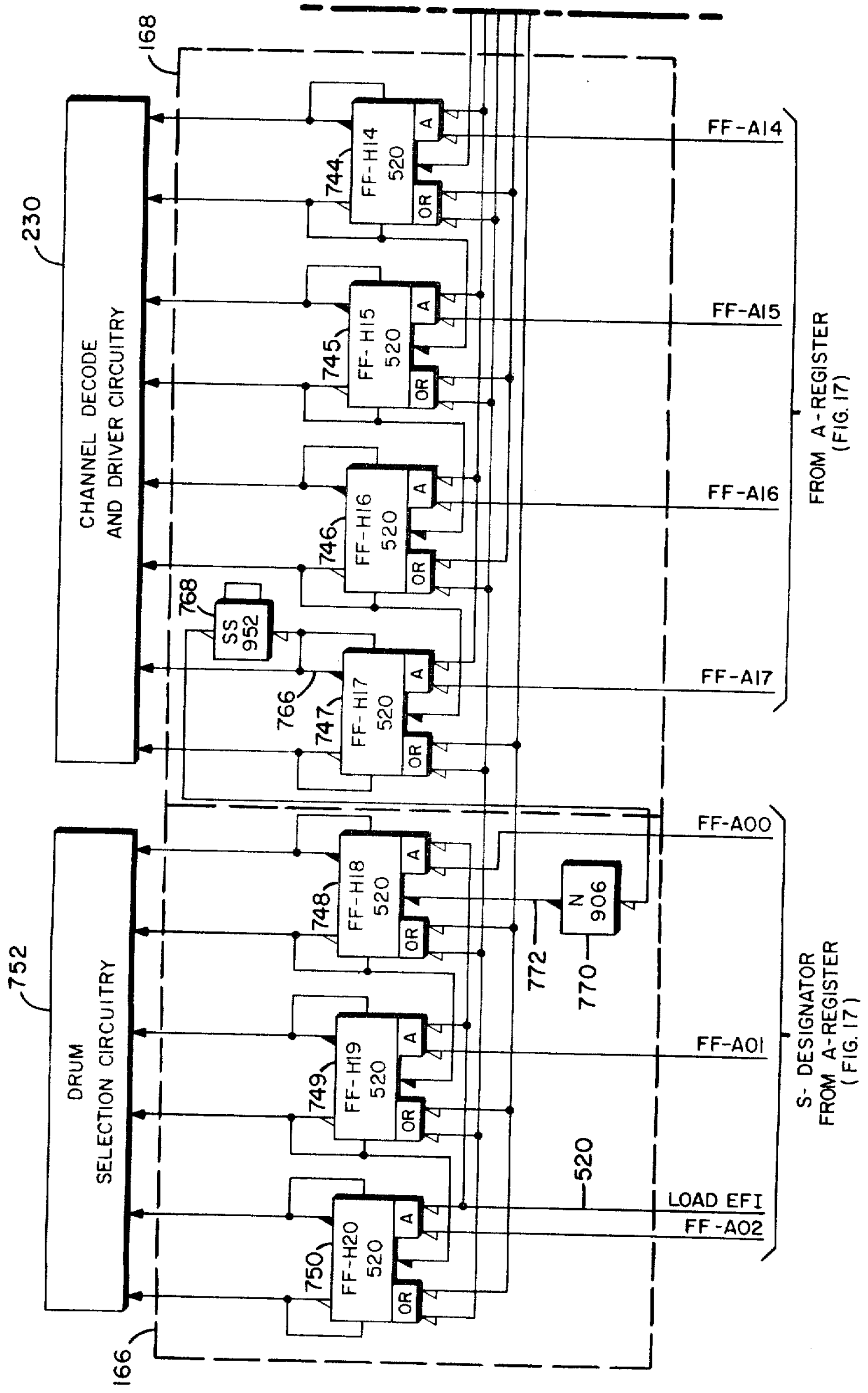
Figure 21B:
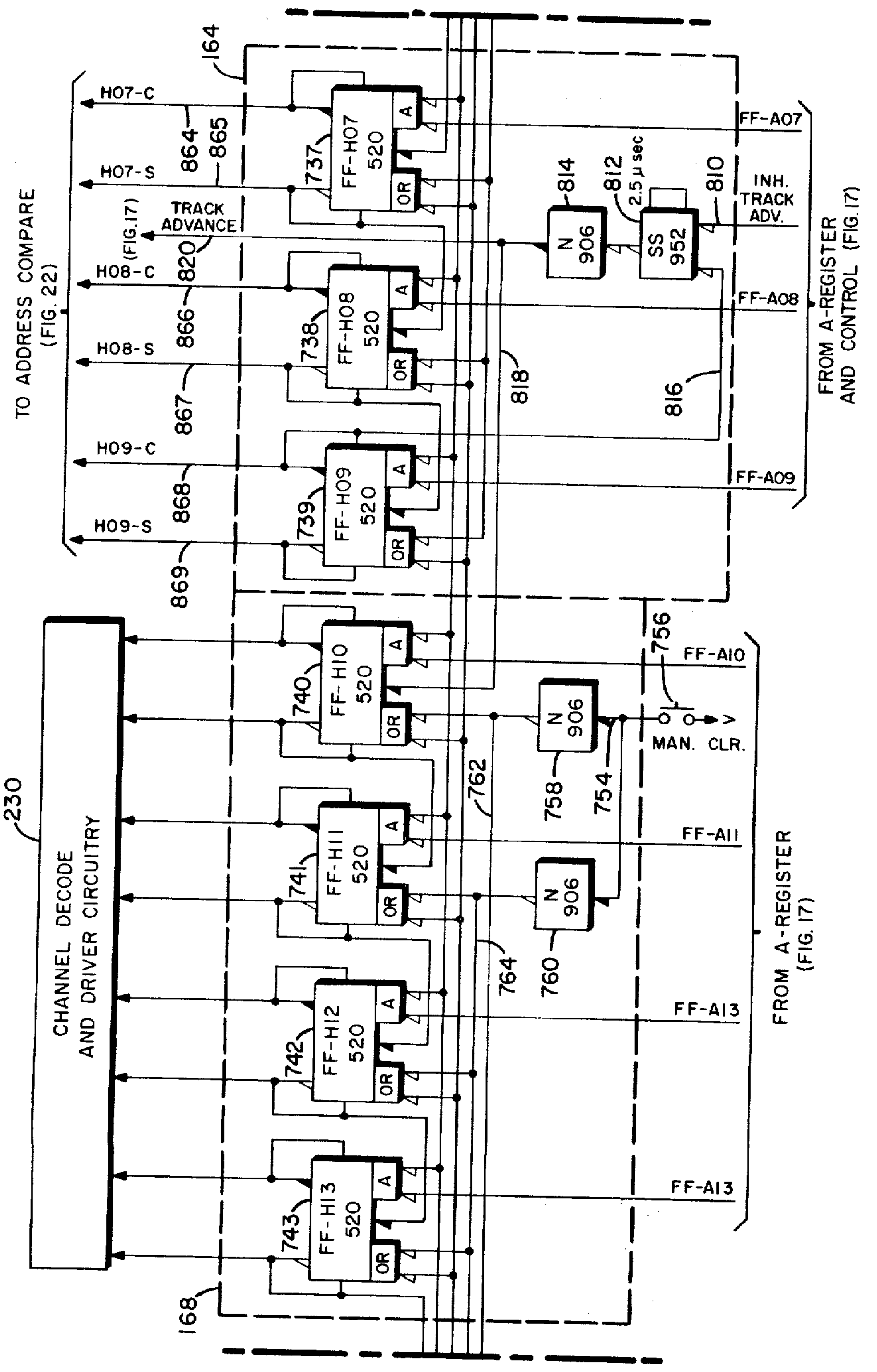
Figure 21C:
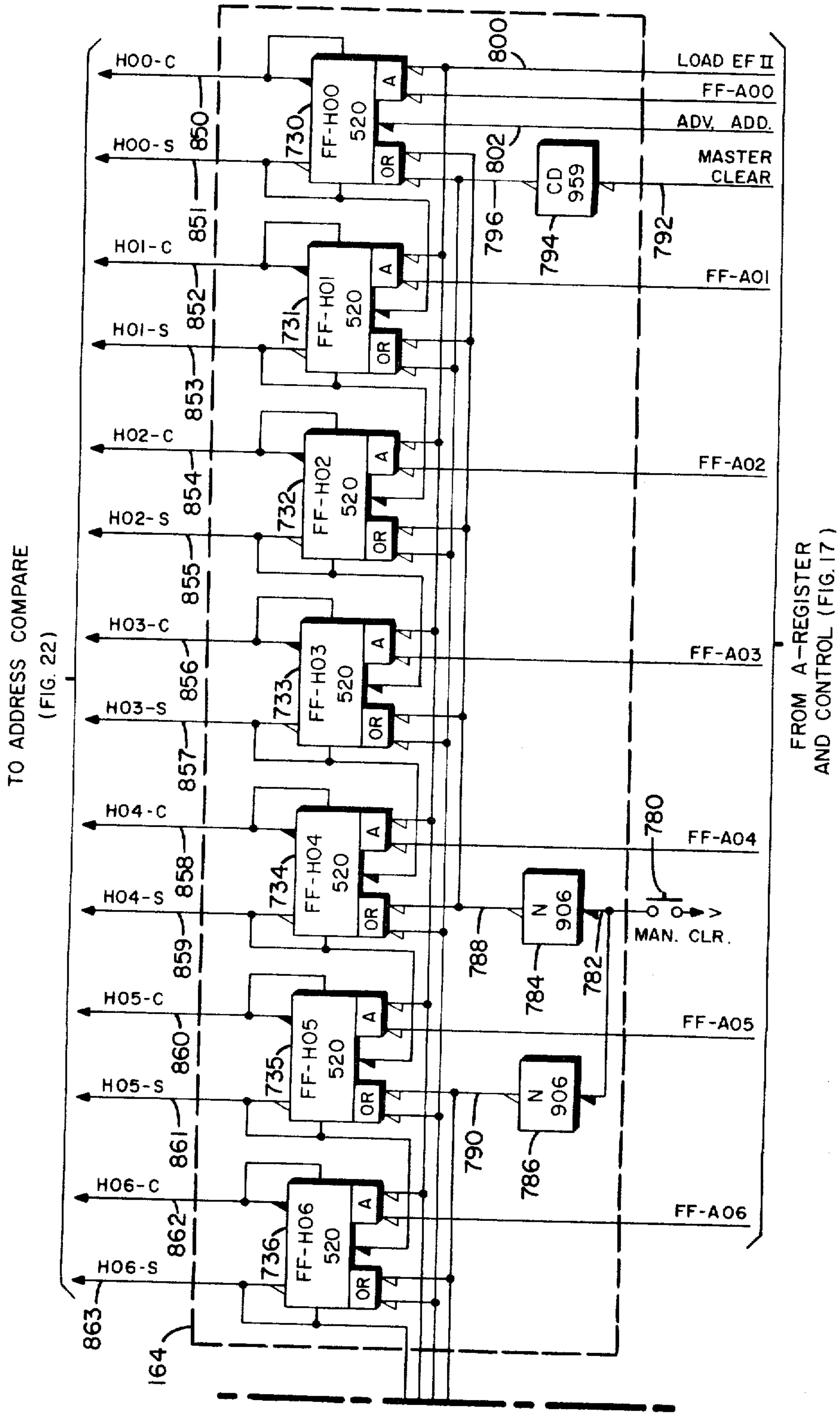
Figure 22:
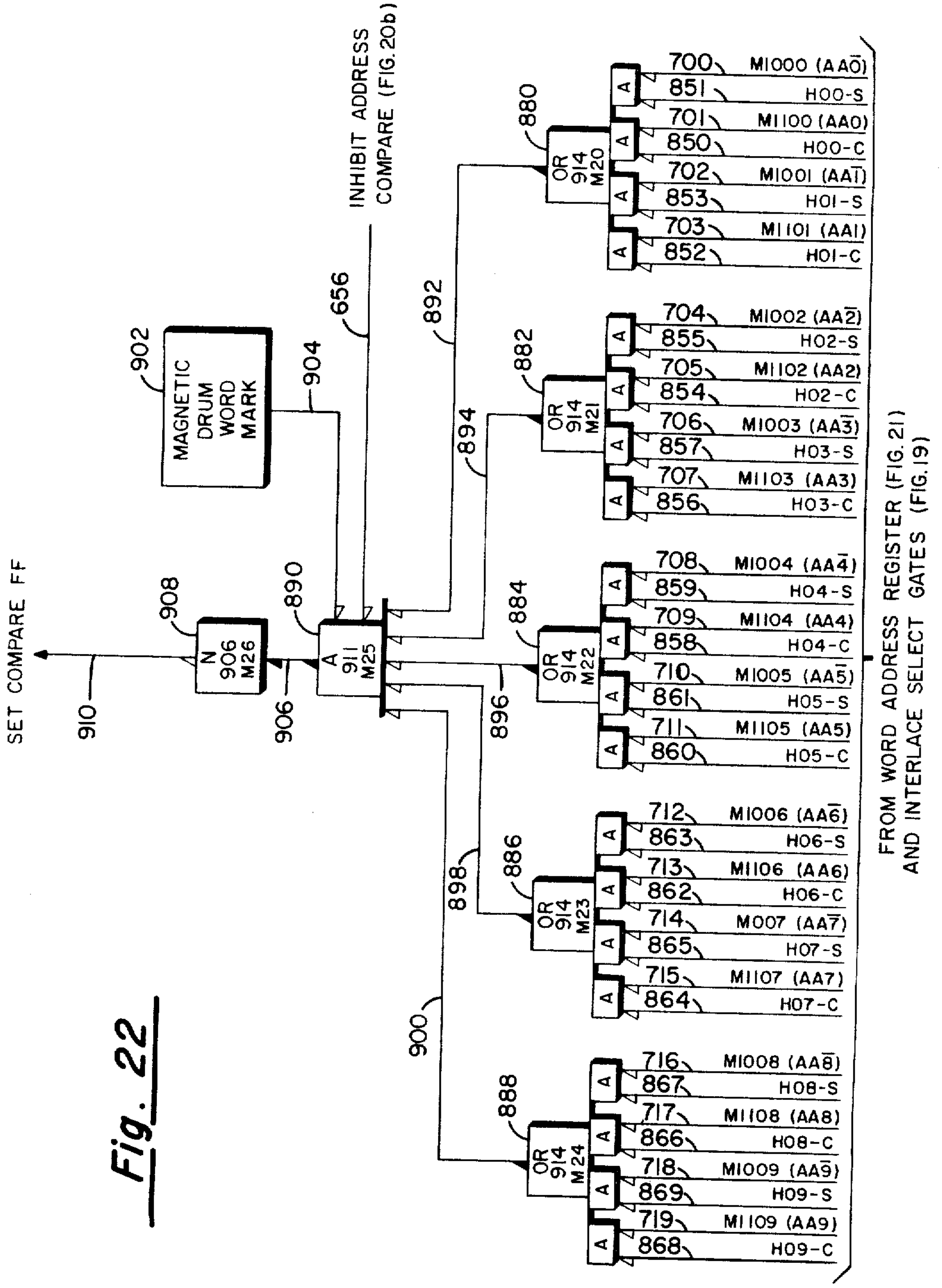

FIGURE 4 graphically illustrates various spatial arrangements of sequentially addressable data word storage locations for various programmably selectable interlace selections;

FIGURE 5*a* illustrates the format of the function word which is supplied by the general purpose computer and designates the operation to be performed by the magnetic drum unit, the interlace selection, and the drum unit selection;

FIGURE 5*b* illustrates the format of the address word and designates the track address and the angular address;

FIGURE 5*c* illustrates the format of a Type I status word and designates the status code and the drum unit;

FIGURE 5*d* illustrates the format of the Type II status word and designates the status code and the angular address;

FIGURE 6 illustrates the arrangement of drawings 6*a* and 6*b* which together are a block diagram representation of the data-flow paths, the control signal paths, and the operational units in the magnetic drum control unit;

FIGURE 7*a* is a schematic diagram of a Type 901 bistable flip-flop circuit;

FIGURE 7*b* is the logic block diagram symbolic representation of the Type 901 flip-flop;

FIGURE 8*a* is a schematic diagram of a Type 906 inverter circuit with diode logic input circuitry which can be considered either AND or OR logic depending upon the signal levels;

FIGURE 8*b* is the logic block diagram symbolic representation of the Type 906 logic circuit;

FIGURE 8*c* is the logic block diagram symbolic representation of the Type 906 logic circuit where only a single input terminal is utilized such that the negation function is achieved;

FIGURE 9*a* is a schematic diagram of the Type CD–959 driver circuit;

FIGURE 9*b* is the logic block diagram symbolic representation of the Type CD–959 driver circuit;

FIGURE 10*a* is the schematic diagram of a Type 905 bistable flip-flop circuit;

FIGURE 10*b* is the logic block diagram symbolic representation of the Type 905 flip-flop circuit;

FIGURE 11*a* is the schematic diagram of a Type 927 shift register stage;

FIGURE 11*b* is the logic block diagram symbolic representation of the Type 927 shift register stage;

FIGURE 12*a* is the schematic diagram of Type 911 Inverter-AND circuit;

FIGURE 12*b* is the logic block diagram representation of the Type 911 Inverter-AND circuit;

FIGURE 13*a* is the schematic diagram of a Type 914 Inverter AND-OR logic circuit;

FIGURE 13*b* is the logic block diagram symbolic representation of the Type 914 Inverter AND-OR circuit;

FIGURE 14*a* is the schematic diagram of a Type 952 single-shot circuit;

FIGURE 14*b* is the logic block diagram symbolic representation of the Type 952 single-shot circuit;

FIGURE 15*a* is a schematic diagram of a Type 520 toggle flip-flop circuit;

FIGURE 15*b* is the logic block diagram symbolic representation of the Type 520 toggle flip-flop circuit;

FIGURE 16 is a block diagram of the registers and interlace selection circuitry utilized in the programmable selection of the interlace of the sequentially addressable data words on the surface of the magnetic drums;

FIGURE 17 illustrates the arrangement of FIGURES 17*a*, 17*b*, 17*c* and 17*d* which together are the logic block diagrams of the A-Register and its associated control lines;

FIGURE 18 is the logic block diagram of the Function Code Decoder and the Interlace Decoding and Selection logic;

FIGURE 19 illustrates the arrangement of FIGURES 19*a*, 19*b* and 19*c* which together are the logic block diagrams of the Interlace Selection Gates;

FIGURE 20 illustrates the arrangement of FIGURES 20*a* and 20*b* which together are the logic block diagrams of the magnetic drum Angular Address Shift Register;

FIGURE 21 illustrates the arrangement of FIGURES 21*a*, 21*b* and 21*c* which together are the logic block diagrams of the Word Address Register; and FIGURE 22 is a logic block diagram of the Address Compare circuitry.

*Conventions employed*

Throughout the following description and in the accompanying drawings there are conventions employed that are familiar to those skilled in the art. Additional information concerning these conventions is set forth here. In the block diagram figures, a conventional full arrowhead is employed on lines throughout the drawings to indicate (1) a circuit connection or (2) the direction of pulse travel which is also the direction of control. In the logic diagram figures a conventional filled half-arrowhead is employed to indicate (1) a circuit connection, and (2) a logical "1" signal impressed on the line to achieve a desired output signal. A logical "1" signal for this embodiment is a high signal and is approximately ground potential. A conventional unfilled half-arrowhead is employed in the logic diagrams on lines to indicate (1) a circuit connection, and (2) a logical "0" signal impressed on the line to achieve a desired output signal. For this embodiment a logical "0" signal is a low signal and is approximately −4.5 volts. Cables which are used to transfer data are shown as lines with the arrowhead at one end thereof indicating the direction of data signal flow, and at some point intermediate the ends of those cables the lines are widened in the form of a circle. The number appearing within the circle indicates the number of conductors encompassed by the cable.

Boldface character symbols appearing within a logic block diagram symbol identify the common name for the circuit represented; that is, a common bistable flip-flop is identified by FF, a gate circuit is identified by GT, a logical AND circuit is identified by A, and a logical OR circuit is identified as OR. In addition to the boldface characters just enumerated, a dash followed by numerical designations will identify the stage of the circuit identified by the boldface character for registers, or the rank of logic. The circuit type is included in the logic block diagram symbol.

In the description, the general arrangement of the apparatus will be first described with respect to the manner to which the various circuit components and the apparatus are interconnected and in respect to the general overall operation which is performed by these components and apparatus. The description of the general arrangement will be followed by separate and more detailed description of the various components and apparatus, which so require it, to particularly point out the operation of apparatus which is an embodiment of the inventive concept.

*Data processing system*

FIGURE 1 is a diagrammatic representation of the data processing system which incorporates the invention concept of the subject invention. A general-purpose stored-program digital Computer 10 having an Input/Output section 12 coupled to a Magnetic Drum Control Unit 14 by a pair of 18-conductor cables labeled 16 and 18 for respectively transmitting data signals to and receiving data signals from the magnetic drum storage. The Magnetic Drum Control Unit 14 is coupled to a plurality of magnetic drum assemblies. The magnetic drums are designated Magnetic Drum 1, labeled 20; Magnetic Drum 2, labeled 22; Magnetic Drum 3, labeled 24; and Magnetic Drum 10, labeled 26. Magnetic Drum 1 is shown with support members 28 and 30 respectively at each end thereof. Each of the other magnetic drums 22, 24, and 26 have similar support members (not shown). Magnetic Drum 1 has associated therewith a driving mechanism indicated as Drum Drive, labeled 32, for driving the drum member in a rotational manner at a constant speed. Magnetic Drum 2 has associated therewith a similar Drum Drive 34; Magnetic Drum 3 has Drum Drive 36; and Magnetic Drum *n* has Drum Drive 38. The drum supports and driving apparatus are well-known in the art. Each of the magnetic drum elements is coupled to the Magnetic Drum Control Unit 14 by a separate cable. Magnetic Drum 1 is associated with cable 40; Magnetic Drum 2 is associated with cable 42; Magnetic Drum 3 is associated with cable 44; and Magnetic Drum *n* is associated with cable 46.

The Magnetic Drum Control Unit 14 is positioned functionally between the Computer 10 and the plurality of drums 20 through 26. It is understood that the Magnetic Drum Control Unit could be included in the computer assembly. The purpose of the Magnetic Drum Control Unit 14 is to interpret functions requested by the Computer 10, write or read data words from desired addresses on selected ones on the magnetic drums, indicate errors in the magnetic drum system to the Computer 10, and generally to control the entire magnetic drum subsystem operation. The Magnetic Drum Control Unit 14 is in direct communication with the general purpose digital Computer 10 via the input/output cables 16 and 18. Additionally, the Magnetic Drum Control Unit 14 is utilized to control the selection of the variable interlace, thereby effectively controlling the transfer rates of data to and from the respective magnetic drum units. Finally, the Magnetic Drum Control Unit 14 controls the writing, the reading, and the searching of data words on the respective magnetic drum units.

Figure 2:
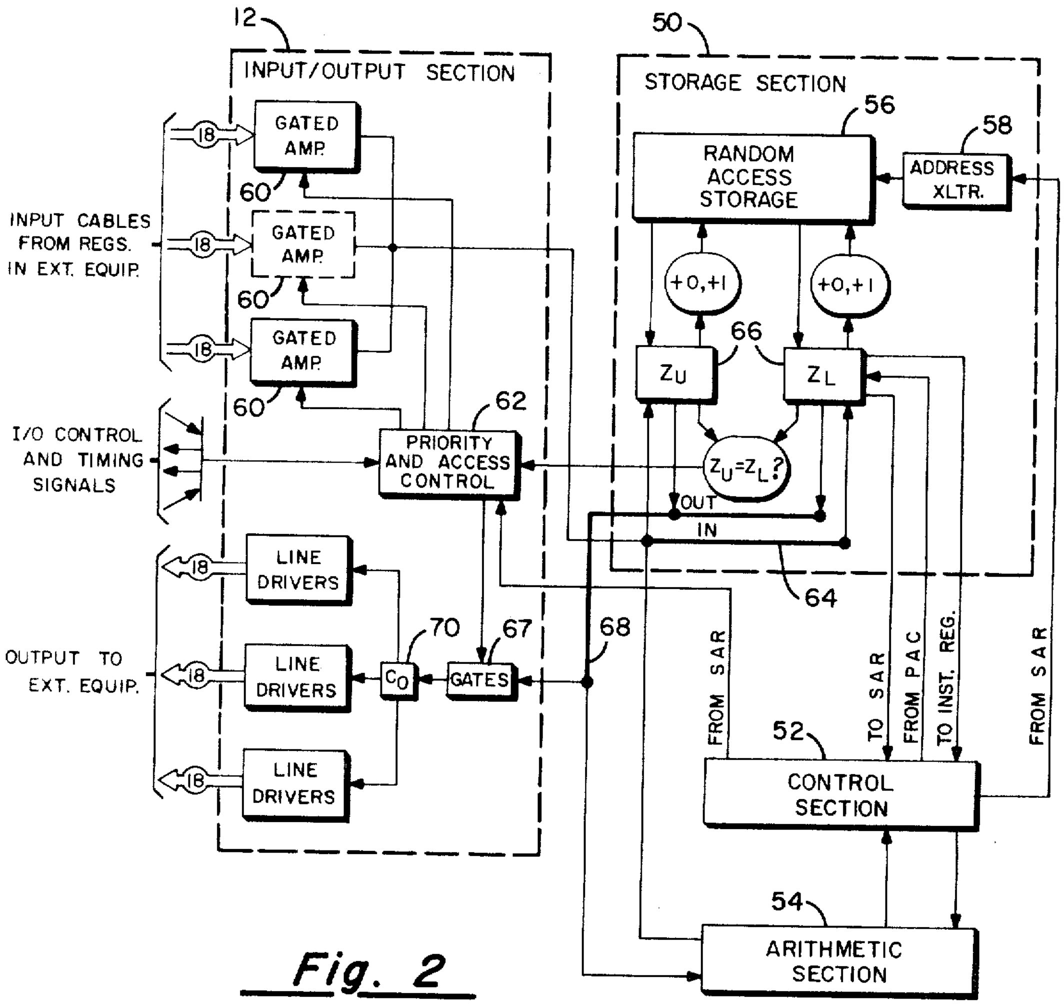
FIGURE 2 is a simplified block diagram of the sections of a general purpose stored-program digital computer which can be used in a data processing system which incorporates the programmably selectable interlace of data words on the magnetic drums.

The general purpose digital Computer 10 is shown in a simplified block diagram form in FIGURE 2. The computer is comprised primarily of four independent, but closely related sections. These sections are the Input/Output Section, shown enclosed in dashed block 12; the Storage Section, shown enclosed in dashed block 50; the Control Section 52; and the Arithmetic Section 54. The Control Section 52 includes distributor circuits for timing the operation of the computer and for guiding the performance of all of the operations of the computer. The Arithmetic Section 54 includes accumulators, adders, and other circuitry necessary in performing the designated arithmetic operation such as addition, subtraction, multiplication, division, logical operation, etc. The Storage Section 50 includes a mass internal storage designated random access storage and labeled 56. The random access storage may be of the magnetic core addressable type, or other types of mass memory well known in the art. Accompanied with the random access storage 56, is the address translation circuitry, labeled 58, for providing access to any of the addressable locations in the random access storage system. Since the Storage Section 50, the Control Section 52, and the Arithmetic Section 54, are only indirectly involved in the necessary description for gaining an understanding of the present invention they are presented in summary form and are not set forth in detail. Each routine of computer instructions is stored in the Storage Section 50 when the routine is being executed.

The computer in the subject description is provided with a plurality of normal input and normal output channels. For the sake of simplicity in this description, only three input channels and three output channels are illustrated. When an external device, such as the Magnetic Drum Control Unit 14, wishes to send information to the computer, it presents an 18-bit word to one of the channels to which it is coupled. These inputs are supplied to the gated amplifiers 60 associated with the particular input channel. Simultaneously, the external device presents an input request control signal to the priority and access control circuit 62. The purpose of the priority and access control network 62 is to honor the incoming requests on two or more channels on a predetermined priority basis and to generate enabling signals for the gated amplifiers 60. In response to the output from the priority network 62, the 18 bits of information presented to one of the sets of gated amplifiers will be permitted to pass via the input bus 64 to the memory communication register designated the Z register 66.

When the computer wishes to send a word of data to a particular piece of external equipment on one of its output channels, it sends an external function signal to the device. In response to this signal, the peripheral device sends back an output request control signal along with an index word address. This last mentioned signal is processed by the priority and access control circuit 62 in substantially the same manner as the input request is treated. In other words, a data word is read out from the memory 56 from an address determined at a unique index word and placed in the Z register 66. When the gates 67 are enabled by the priority network 62, this word of data passes from the Z register 66 by way of the output bus 68 to the output register $C_0$ (70). Once in this register, the data is available to the peripheral devices on all of the output channels. Other peripheral devices may be in a condition to accept the data, but only the particular channel which presented the output request is sent an output acknowledge signal and in a condition to accept the data. It will be noted that "Input" and "Output" are designated with reference to the computer in all cases. Copending patent application Ser. No. 143,425, enitled Digital Communication System, and assigned to the assignee of the present invention, contains a more detail description of a communication system of the type employed in the computer relating to the subject invention, though a different number of bits are therein illustrated as a machine word.

The Computer 10 is pre-programmed by storing a routine of instruction words, often referred to as a program, in the Random Access Storage section 56 of the Storage Section. The Control Section 52 includes a Storage Address Register (SAR) for controlling access to an address in the Random Access Storage 56. The Control Section 52 also includes a Program Address Counter (PAC) for continually stepping through the locations in the Random Access Storage which are designated as the addresses of the instructions of the stored program. It is the function of the Control Section 52 to read the instruction words out of Random Access Storage, to translate the desired operation, and to control the Arithmetic Section 54 and the Input/Output Section 12 in the performance of the various operations. The high speed storage and the Random Access Storage 56 is also utilized for storing data words otherwise referred to as operands. The data words stored in the Random Access Storage 56 are generally of the type which are frequently required or which are generated or required in a transient portion of the problem solution.

Referring again to FIGURE 1, there is shown the Magnetic Drum 1, with its associated Drum Drive 32. The composition of each of the illustrated magnetic drums is similar; hence, a description will be made for Magnetic Drum 1 only, it being understood that the description applies equally to all associated drums in the magnetic drum system. A portion of Magnetic Drum 1 is designated the control tracks, labeled 72. The control tracks are utilized in the timing and addressing of the portions of the surface of the rotatable magnetic drum. Recording of data on the surface of the drum and reading of data from the surface of the drum is accomplished by a plurality of magnetic heads which scan the annular portions of the drum to form what is termed "data tracks." These are shown as the dashed lines around the surface of the drum designated as portion 74. For example, the schematic illustration shows head 76 and head 78 respectively having coils 80 and 82 coupled into cable 40 and from there into read and record circuits which are a portion of the Magnetic Drum Control Unit 14. The heads 76 and 78 include a permeable core each having air gaps 84 disposed adjacent the periphery 86 of Magnetic Drum 1. In a similar manner, each of the plurality of data storage tracks has associated therewith a similar read-write transducer. The surface of the magnetic drums are coated with a magnetizable material to form a layer which can be readily magnetically altered in discrete areas. The data storage tracks continue serially around the periphery of the drum in a continuous fashion with the exception of a portion running along the longitudinal dimension of the magnetic drum, which is termed the "dead space," labeled 88. No recording of data is accomplished across the dead space. The dead space 88, in which no information is recorded, provides time to switch from track-to-track without direct requirement of skipping a drum revolution.

*Storage format and variable interlace*

Each of the magnetic drum assemblies illustrated in FIGURE 1 has a total of 330 identical recording heads such as head 78, mounted around the periphery of the drum rotor.

Figure 3:
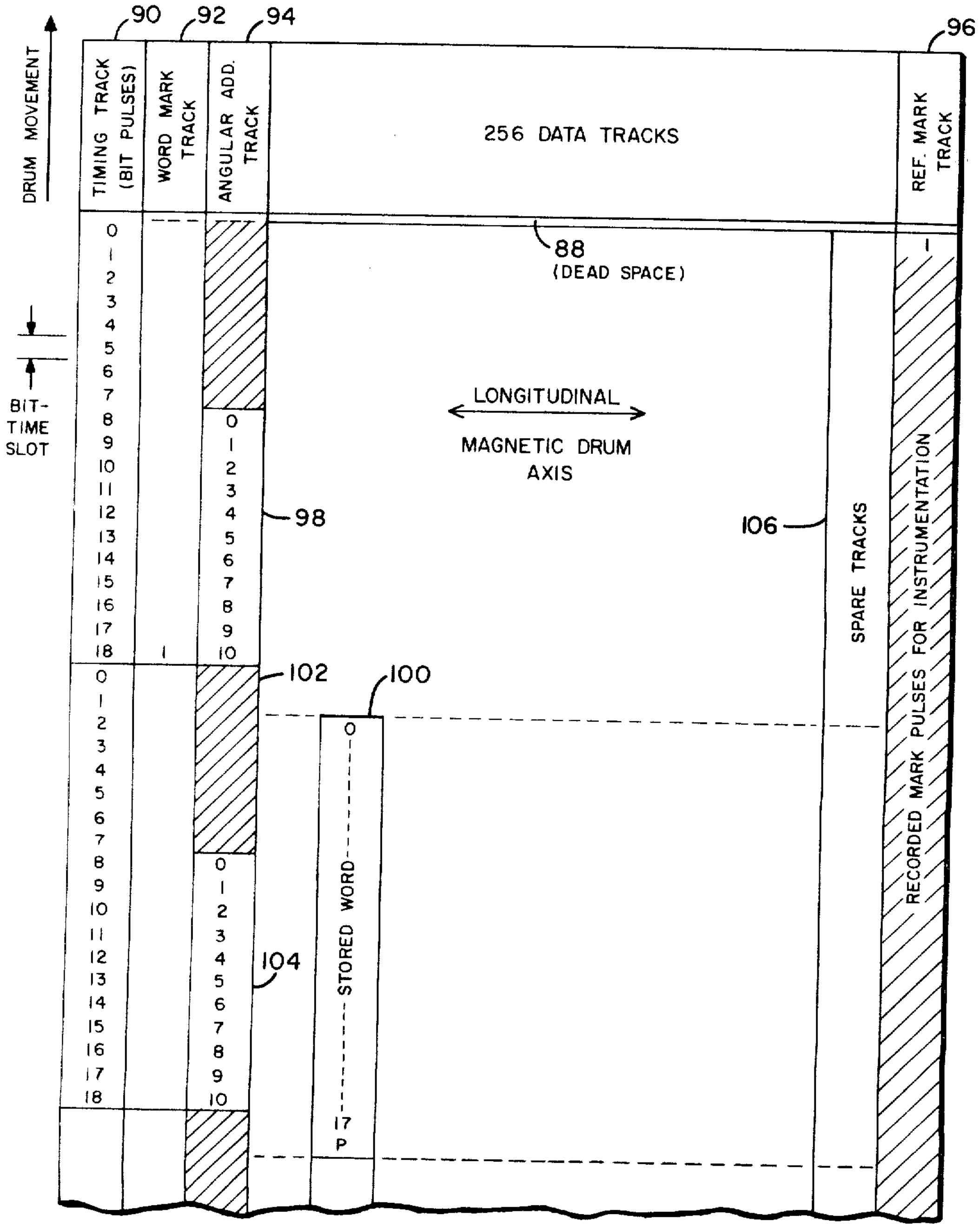
FIGURE 3 illustrates the format of the control tracks and the data tracks on the surface of the magnetic drum for this embodiment.

FIGURE 3 is a graphical representation of the spatial relationship and the timing relationship of the various portions of the surface of each of the magnetic drum units, and is a diagrammatic view of the surface of one of the magnetic drums and viewed as if the surface were removed from the drum rotor and laid out in a flat plane. In FIGURE 1 the control tracks 72 are illustrated at one end of magnetic drum 1. In FIGURE 3 the Timing Track 90, the Word Mark Track 92, and Angular Address Track 94, and the Reference Mark Track 96 are illustrated. These items form the control track 72 shown in FIGURE 1. In this embodiment, there are 256 addressable data tracks, each data track having a capacity of 1024 computer words. A bit-serial mode of recording is used, with each word which represents a data word occupying 19 successive bit positions along the track. A computer word is 18 bits in length and the 19th bit position is utilized to store a parity bit. The parity system of verifying correct read out of data words from a storage system is well-known in the art and does not form a relevant part of this invention, hence it will not be described in detail.

As described above, at the end of each of the data tracks a "dead space" 88 is provided to allow sufficient time for transients to die out when switching from track to track. In FIGURE 3 the dead space 88 is shown at the top of the drawing, thereby indicating that the portion falling below the dead space is what may be considered the start of each data track. For this embodiment, the dead space time interval is approximately 100 microseconds and is great enough for all associated circuitry to be stabilized to time to read or record the next successive address without missing a drum revolution.

In addition to the data tracks, four tracks are provided for controlling the transfer of data to and from the magnetic drum. Information on these tracks is permanently recorded at the time of manufacture. These four tracks are:

(1) Timing Track 90;
(2) Word Mark Track 92;
(3) Angular Address Track 94; and
(4) Reference Mark Track 96.

The system of providing a variable interlace for the recording of sequentially addressable data words utilizes the pre-recorded sequentially occurring angular address words from the surface of the magnetic drum. For this embodiment the interlace selections are powers of two. It is well-known that a shift of one bit-position of a binary number alters the value of the number by a power of two. For instance, the binary number.

$$0001101_2$$

represents the decimal number thirteen. A shift of one place results in $$0011010_2$$

which is a decimal twenty-six. This is a shift of $2^1$ or an interlace of two. A shift of two places of 01101 results in the value $$0110100_2$$

which is decimal fifty-two. This alters the value 13 by $2^2$, i.e., $13\times4=52$. This shift by $2^2$ is an interlace of four. The foregoing can be expanded for additional shifts. The pre-recorded sequentially occurring angular address words increase by 1 for each addressable storage location around the periphery of the drum. The shifted angular addresses read from the drum are compared by the Magnetic Drum Control Unit with the computer-designated angular address. It can be seen, then, that if the angular address read from the drum is shifted prior to the comparison operation, that the particular angular address will have an effective value different from the actual numerical value. For instance, if an interlace of four ($2^2$) is selected, the angular address will be shifted two places; so that, following the foregoing example, when physical position 13 is read from the drum it will have an effective value of 52. Therefore, comparison would be made when the angular address specified by the computer is 52. The next sequentially addressable data word would be physically located in the following manner:

$$13+1=14 \text{ decimal}$$
$$=0001110 \text{ binary}$$
$$\text{shifted } 2=14\times2^2=56 \text{ decimal}$$
$$=0111000 \text{ binary}$$

It can be seen that 56 differs from 52 by a value 4, which was the illustrative interlace selected. The foregoing can be expanded for other interlace selections, which are increasing powers of 2, and provides the physical interleaving of sequentially addressable data words around the periphery of the drum, since the actual angular address for each physical location is given a different effective address depending on the shifted value.

From the foregoing, then, it can be seen that the effective angular address is defined by the following relationship:

Effective Angular Address=(Magnetic Drum Angular Address) $2^i$ where $i$=shift count of angular address and is an integer value of 1 or more and depends on the interlace selection.

The Reference Mark Track 96 contains a single mark which establishes the end of the dead space, that is the beginning of data. The dead space 88, in which no information is recorded, provides time to switch from track to track without skipping drum revolutions.

The Timing Track 90 is a closed track in which a timing signal is recorded in each time cell, that is, each serial bit position. It provides timing pulses for controlling the transfer of data between the drum and the control unit.

The Word Mark Track contains 1024 marks which indicate the beginning of each word of data.

The Angular Address track 94 contains the binary coded angular position of each data word storage location on the drum.

It should be noted that each angular address coded portion of the angular address track 94 precedes in time its associated data words. This is illustrated wherein the the angular address shown in portion 98 is actually the angular address of the data word illustrated as 100. This provides a time equivalent of about 2 timing track pulses shown by portion 102 of the angular address track for performing the comparison of the stored angular address to a desired angular address by the Magnetic Drum Control Unit 14, for purposes of identifying a desired computer word in time to read it from the drum without missing a complete drum revolution. Similarly, the angular address shown in portion 104 of the angular address track 94 would correspond to the word stored next sequentially after the data word 100.

A portion of the drum 106 is utilized as spare track for replacing tracks on the magnetic drum unit which may for one reason or another become defective thereby preventing the total destruction of the unit by a faulty data track.

The magnetic drums are driven by their respective drum drive units at a speed which causes the timing track to provide pulses approximately at a 1.2 megacycle rate. It should be noted that the timing is derived from the drum itself so the signals for synchronizing the transfer of data is self-contained.

The direction of the arrow in the upper left of FIGURE 3 indicates the direction of magnetic drum movement. The arrow across the portion of the surface of the drum indicates the longitudinal axis of the magnetic drum unit.

Table I is a listing of magnetic drum storage parameters for the magnetic drum storage system provided in the embodiment of the subject invention.

TABLE I

| Item: | Parameters |
|---|---|
| Drums per system | 1 through 5 selectable. |
| Words per drum | 262,144 (18 bits). |
| Address range | Continuous. |
| Drum **0** | 0,000,000 to $077,777_8$. |
| Drum **1** | $1,000,000_8$ to $1,777,777_8$. |
| Drum **2** | $2,000,000_8$ to $2,777,777_8$. |
| Drum **3** | $3,000,000_8$ to $3,777,777_8$. |
| Drum **4** | $4,000,000_8$ to $4,777,777_8$. |
| Word per track | 1024 (18 bits). |
| Number of data tracks | 256. |
| Transfer rate | Variable. |
| Interlace **2** | 30 kilocycles. |
| Interlace **4** | 15 kilocycles. |
| Interlace **8** | 7.5 kilocycles. |
| Interlace **16** | 3.75 kilocycles. |
| Access time: | |
| Maximum | 17 milliseconds. |
| Average | 8.5 milliseconds. |
| Minimum | 100 microseconds. |
| Addressability | Word. |
| Recording format | Serial. |
| Parity | One bit per word (odd). |

FIGURE 4 is a graphic illustration of the variable interlace arrangement of addressable words on the surface of the magnetic drum. The arrow at the upper left of FIGURE 7 illustrates the direction of drum surface movement. Symbol "A" represents the address parameter and the subscript associated with A, designates the interlace setting. For each of the interlace settings illustrated, the cross hatched portions represent successively addressable computer words. For interlace 2 the first word $A_2$ is displaced one word time from the next sequential addressable word $A_2+1$. In a similar manner the second addressable word $A_2+1$ is displaced one computer word from the next sequential addressable computer word $A_2+2$. Therefore, it can be seen that each sequential addressable word when interlace 2 is selected is removed one computer word time slot from its preceding addressable computer word. This yields a situation that two complete revolutions of the drum are necessary to read out all of the available computer words when interlace 2 is the setting.

When interlace 4 is selected, the first word $A_4$ is removed four storage location time slots from the next sequential addressable word $A_4+1$. Therefore, it can be seen that when interlace 4 is selected, sequentially addressable computer words are located every fourth position around the periphery of the drum, and that four complete drum revolutions are necessary to address all possible locations on the surface of the drum.

In a similar manner, when interlace 8 is selected the computer word stored at address $A_8$ precedes the next sequential addressable computer word $A_8+1$ by 7 computer word time slots (every eighth position). This yields the operating condition that eight complete drum revolutions are required to sequentially address all possible drum storage locations, and completely utilize all available storage locations.

Finally, when interlace 16 is selected, the first addressable location $A_{16}$ precedes the next sequential addressable computer word address $A_{16}+1$ by 15 computer word time slots. Sequentially addressable locations are located every sixteenth location. This gives the operating condition that the magnetic must go through 16 revolutions to sequentially read out all possible addressable storage locations on the surface of the drum.

It can be seen that the spatial off-set for the various interlace selections for sequentially addressable storage locations is defined by the following relationship:

Spatial Off-Set$=2^i-1$
where $i$=shift count integer of 1 or more
$2^i$=interlace selection Referring back to Table I, the foregoing is illustrated by the transfer rate being listed as variable with the respective transfer rate frequencies being designated for the various selected interlace settings. It will be recalled that the magnetic drum is driven at a constant speed and independent of the interlace setting. It is the selection of the recording of sequential words after a variable time delay which provides the interlace of data words on the drum surface. It will be recalled from the foregoing discussion that the selection of the interlace arrangement of storage of computer words on the surface of the drum is dependent upon the predetermined rate of utilization of the magnetic drum system by the programmed operation of the general purpose digital Computer 10, to which the magnetic drum system is coupled.

*Function control and magnetic drum function repertoire*

To activate the magnetic drum storage system, the general purpose digital Computer 10 sends one or more instructions to the Magnetic Drum Control Unit 14 on the output line 16. This transmission is in the parallel mode and utilizes 18 bits. The operations that can be performed by the magnetic drum system will be described in detail below. While performing a specified operation, the magnetic drum system checks parity, notifies the computer of any abnormal conditions, and keeps the computer informed of the status of the operation requested.

To initiate a desired programmed performance of the magnetic drum system, the general purpose digital Computer 10 sends a function word to initiate the operation. FIGURE 5*a* illustrates the format of the bit arrangement in the function word. The high order four bit positions $2^{17}$–$2^{14}$ specify in coded form the operation the drum system is to perform. These operations are set forth in Table II below. The three lowest order bits in the function word are the "S" designator, $2^2$–$2^0$, and are used to select the desired magnetic drum unit. The range of magnetic drum units selectable for this embodiment are 0 through 4, or five individual magnetic drum units. It can readily be seen that this number can be expanded as desired by adding appropriate control circuitry in a manner similar to that disclosed below. In order to provide transfer rates compatible with various Computer 10 applications, successive addresses are interlaced around the periphery of the drum as described above. The degree of interlace is a function of the program and is determined by the I designator in the function word. The I designator is comprised of bit $2^{13}$ and $2^{12}$. It is by the use of the I designator that the dynamically variable interlace is rendered programmable by an instruction sent from the general purpose digital Computer 10 into the Magnetic Drum Control Unit 14 without necessitating stopping the entire system for a manual alteration of the interlace selection. The control circuitry situated in the Magnetic Drum Control Unit 14 which effects the actual selection of the interlace in response to the condition provided by the I designator will be described in more detail below. The following listing of I designator values indicates the interlace selected:

$I=0(00)$ interlace 2;
$I=1(01)$ interlace 4;
$I=2(10)$ interlace 8; and
$I=3(11)$ interlace 16.

From the foregoing it can be seen that the two bits provided for the interlace designator I are fully used in all possible combinations. In order to provide for interlace selections greater than those listed, it would be necessary to include another digit in the function word in the I designator field for providing bit combinations which would accommodate more interlace capabilities. The function word has a portion comprised of bits $2^{11}$ through $2^3$ which are not used, and could be used to expand I.

To completely initiate an action in the magnetic drum system, the Computer 10 normally sends the sequence of two words from the Input/Output Section 12 via cable 16 into the Magnetic Drum Control Unit 14. The first word normally sent is the function word described above. The second word provided in the parallel mode is normally the address word illustrated in FIGURE 5*b*. The address word serves two purposes. As the second word of the selection transfer, it specifies the magnetic drum address, including track and angular address, where the operation is to begin. A specification of the address where an operation is to start requires that the angular address on the surface of the drum be specified. This portion of the address word is carried in bits to $2^9$ through $2^0$ of the address word. A second portion of data which is necessary to finally provide a specific address is a designation of the particular track on the selected magnetic drum. The track address is carried in bits $2^{17}$ through $2^{10}$ of the address word. From the foregoing it can be seen that the selection of the particular drum by the S designator in the function word, coupled with the selection of a particular track and a particular angular address by the address word, completely specifies a unique starting position for the selection magnetic drum. It should be noted that address words may be also generated by the Magnetic Drum Control Unit 14 during a search function. In this case the address word is transferred to the general purpose Computer 10 via input channel 18 as input data. In the case of a search operation, it is necessary for the general purpose Computer 10 to transmit a third word in addition to the function word and the address word into the Magnetic Drum Control Unit 14. This third word is designated an identifier word and can be comprised of any 18 bit configuration that is desired to mark or indicate the item searched for. When a match is found between the identifier word and a word stored on the selected magnetic drum, the Magnetic Drum Control Unit 14 provides an address word as described above, for informing the computer of:

(1) The location of words that match the identifier;
(2) The location of a word in which a parity error was detected.

As stated above, the identifier word may contain any pattern of ones and zeros for which it is desired that the drum must search. This configuration can include a word containing all ones. For this embodiment, an end-of-block word consists of eighteen one bits, that is the octal equivalent $777777_8$. These end-of-block words may be used by the programmer to separate files or records stored on the drum. The end-of-block words are recognized by the Magnetic Drum Control Unit 14 only during a search first word function, and during all other functions they are treated as ordinary data words.

In this embodiment of the subject invention there are two types of status words wherein Type I is illustrated in FIGURE 5*c* and Type II is illustrated in FIGURE 5*d*. Status words are generated by the Magnetic Drum Control Unit 14 to advise the operating program in the general purpose digital Computer 10 of specified conditions existing in the magnetic drum subsystem. The status words are transferred via input channel 18 to the Input/Output Section 12 of the general purpose digital Computer 10, and are accompanied by a signal on the external interrupt line.

Type I status words occur during the following functions: (1) Write; (2) Read; (3) Search; and (4) Bootstrap.

The Type I status word identifies a particular drum unit by the code contained in bit positions $2^2$ through $2^0$. Certain bits are not used and are contained in the field $2^{11}$ through $2^3$. The status code is carried in bits $2^{17}$ through $2^{12}$.

Type II status words occur only during the Request Current Address function. The format employed in the Type II status words includes a status code carried in bits $2^{17}$ through $2^{12}$. Only two bits are not used in the Type II status word, being bits $2^{11}$ and $2^{10}$. An angular address is carried in bits $2^9$ through $2^0$.

Table II below illustrates the function repertoire in the magnetic drum system, and it includes the function code numerical designation in octal and binary forms as it would be specified in bits $2^{17}$ through $2^{14}$ in the Function Code portion of the function word. The second column designates the Function which corresponds to the function code, and the Description column describes briefly the nature of each of the available functions.

TABLE II.—FUNCTION REPERTOIRE

| Function Code | | Function | Description |
|---|---|---|---|
| (Octal) | Binary | | |
| 01 | 0 001 | Write | Record continuously on magnetic drum. |
| 02 | 0 010 | Read | Read continuously from magnetic drum. |
| 04 | 0 100 | Search All Words | Search all addresses on magnetic drum, comparing the contents of each to the Identifier Word. When find is made, notify computer via input Address Word. |
| 06 | 0 110 | Search All Words, Read. | Search all addresses on magnetic drum, comparing the contents of each to the Identifier Word. When find is made, read continuously from magnetic drum, starting from the find address. |
| 10 | 1 000 | Bootstrap | Read continuously from address zero of drum zero. |
| 12 | 1 010 | Request Current Address. | Notify the computer of the address currently in position on the selected drum unit. |
| 14 | 1 100 | Search First Word | After sensing an End-Of-Block Word, compare the first word in a record with the Identifier Word. If a find is made, send an input Address Word to the computer. |
| 16 | 1 110 | Search First Word, Read. | After sensing an End-Of-Block Word, compare the first word in a record with the Identifier Word. If a find is made, read continuously from magnetic drum, starting at the find address. |
| 17 | 1 111 | Stop Search | Stop search operation. |

The functions listed in Table II above will be briefly described.

A Write operation (function code 01) is initiated by two computer words, a function word followed by an address word. Data words transmitted from the Computer 10 to the Magnetic Drum Control Unit 14 are recorded in successive drum locations. Writing continues as long as data words are made available, or until the last address of the magnetic drum system is used. During peak input/output load periods, a data word not received in time to be recorded on the specified magnetic drum will be held in the Magnetic Drum Control Unit 14 and written on the designated magnetic drum during the next sequential drum revolution.

A Read operation (function code 02) is initiated by two computer words, a function word followed by an address word. Data words are read from successive addresses on the specified magnetic drum and transmitted to the Computer 10 via the Magnetic Drum Control Unit 14. Reading continues as long as data words are accepted by the Computer 10 until the last address is reached, or until an erroneous operation is detected. During peak input/output load periods, a data word not accepted by the Computer 10 will be stored in the Magnetic Drum Control Unit 14 until the data word is accepted. The next subsequent data word will be read during the next revolution of the specified magnetic drum.

There are five types of Search operations possible in the magnetic drum system. The instructions that designate the various types of search operations are set forth in the following paragraphs.

Search-All-Words (function code 04)—Type 1—This instruction provides a means for determining the addresses of data words on the specified magnetic drum that match the identifier word. This search operation is initiated by sending three computer words to the magnetic drum system:

(1) A function word;
(2) The address word; and
(3) The identifier word, in this particular order.

When a "find" is made, that is when the search matches up a word on the magnetic drum with the identifier word, the magnetic drum address of the find-word is sent to the computer as an input address word. This search operation is repeated as long as the computer accepts these address words or until:

(1) The operation is terminated by the computer by initiating a new function;
(2) The last address on the selected magnetic drum has been search when an end-of-drum status code is generated; or
(3) A parity error occurs.

If no find is made, the search is terminated when the last address on the selected drum has been searched and an end-of-drum status code is generated. A search operation may be terminated by the program operating in the Computer 10 at any time after the function transfer has been completed. The size of the input buffer limits the possible finds that can occur. It should be noted that data words stored on the magnetic drum are *not* transferred to the Computer 10 during this operation. Instead, only the address of the words found to compare to the identifier words are transmitted to the computer.

Search-All-Words, Read (function code 06)—Type 2—This instruction provides a means for locating a specific data word on the specified magnetic drum, and for transferring all subsequently occurring data words. It is executed in the same manner as the Search-All-Words instruction described above. Beginning at the specified address, data words are read from the magnetic drum and compared with the specified identifier word. When a find is made, the Magnetic Drum Control Unit 14 switches to a normal read mode, and begins transferring data words to the Computer 10. The first word transferred to the computer is the find-word followed by data words from successively occurring addresses on the specified drum. Reading continues as long as data words are accepted by the computer or until:

(1) The operation is terminated by the computer;
(2) The contents of the last address of the selected drum has been transferred; or
(3) A parity error occurs.

When the contents of the last address of the selected magnetic drum has been transferred to the computer, and end-of-drum status code is sent to the computer. The Search operation may be terminated by the program at any time after the function transfer has been completed.

Search-First-Word (function code 14)—Type 3—This instruction provides a means for determining the addresses of specific data words on a specified magnetic drum that match a specified identifier word. This function is initiated in the same manner as the Search-All-Words instruction as described above. The search begins at the specified address. When an end-of-block word is detected, the next following word is compared with the identifier word. If a find is made, the address of the find-word is transferred to the Computer 10 as an input address word. The search operation is repeated as long as the computer accepts address words or until:

(1) The operation is terminated by the computer;
(2) The last address on the selected drum has been reached; or
(3) A parity error occurs.

Only the word following the end-of-block word is compared with the identifier word. If comparison is not made, the search is resumed after the next sequentially occurring end-of-block word is detected by the Magnetic Drum Control Unit 14. When the last address on the selected drum has been searched, an end-of-drum status code is sent to the computer. The search operation may be terminated by the computer at any time after the function transfer has been completed. If the identifier word is an end-of-block word, the next word is compared. It is handled the same as any other identifier word.

Search-First-Word, Read (function code 16)—Type 4—This instruction provides a means for locating and reading a specific record on a specified magnetic drum. The first word of the record must be the key word. Searching begins when an end-of-block word is detected. The word following the end-of-block word is compared with the identifier word. If the word following the end-of-block word does not match the identifier word, searching is suspended until the next end-of-block word is detected by the Magnetic Drum Control Unit 14. When a find is made, the Magnetic Drum Control Unit 14 switches to a normal read mode and begins transferring data words to the Computer 10. The first word transferred is the find-word followed by data words from successively occurring addressable locations on the magnetic drum. Reading continues as long as data words are accepted by the Computer 10 or until:

(1) The operation is terminated by the computer;
(2) The contents of the last address of the selected drum have transferred; or
(3) A parity error occurs.

When the contents of the last address on the selected magnetic drum have been transferred, an end-of-drum status code is sent to the computer. The search function may be terminated by the computer at any time after the function transfer has been completed.

Stop Search (function code 17)—Type 5—This instruction stops a search operation when the program has obtained the desired information.

Request Current Address (function code 12)—This operation informs the program operating in the Computer 10 of the address currently in position on the selected magnetic drum. It is initiated by a function transfer consisting of a function word. Approximately 70 microseconds after receipt of the function word, the magnetic drum system will send an external interrupt signal to the Computer 10. The Type II status word will contain the status code and angular address that was read from the magnetic drum just prior to the external interrupt signal.

Bootstrap (function code 10)—The bootstrap is initiated by one computer word. The function word has bit $2^{17}$ set equal to 1. The bootstrap instruction initiates a continuous read from address 0 of magnetic drum 0. Reading continues as long as data words are accepted by the computer, or until the last address has been reached, or until an error is detected .The bootstrap function can be utilized to initiate the loading of a program stored starting at address 0 on drum 0 into the internal memory of the Computer 10.

*Magnetic drum control unit*

Figure 6A:
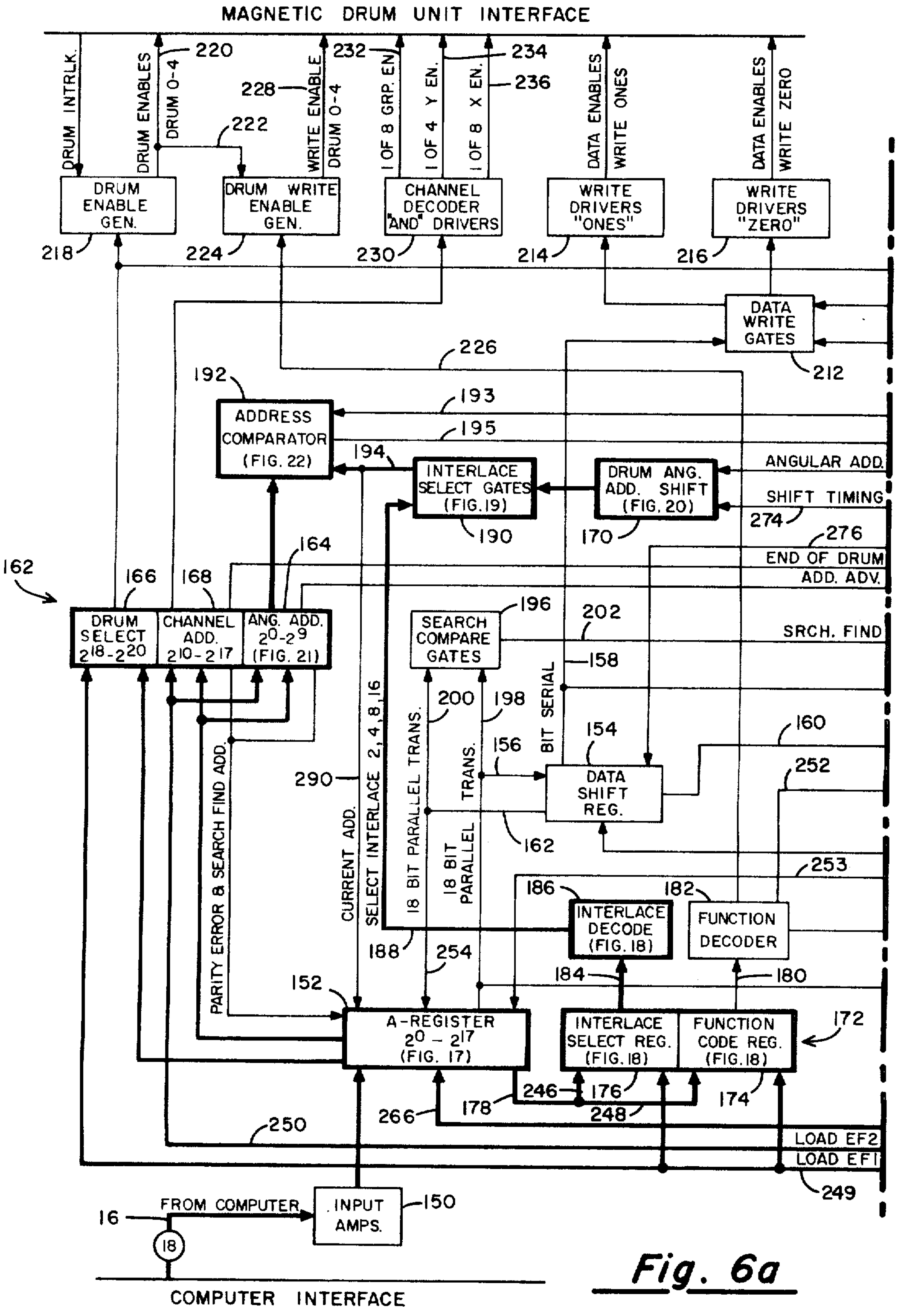
Figure 6B:
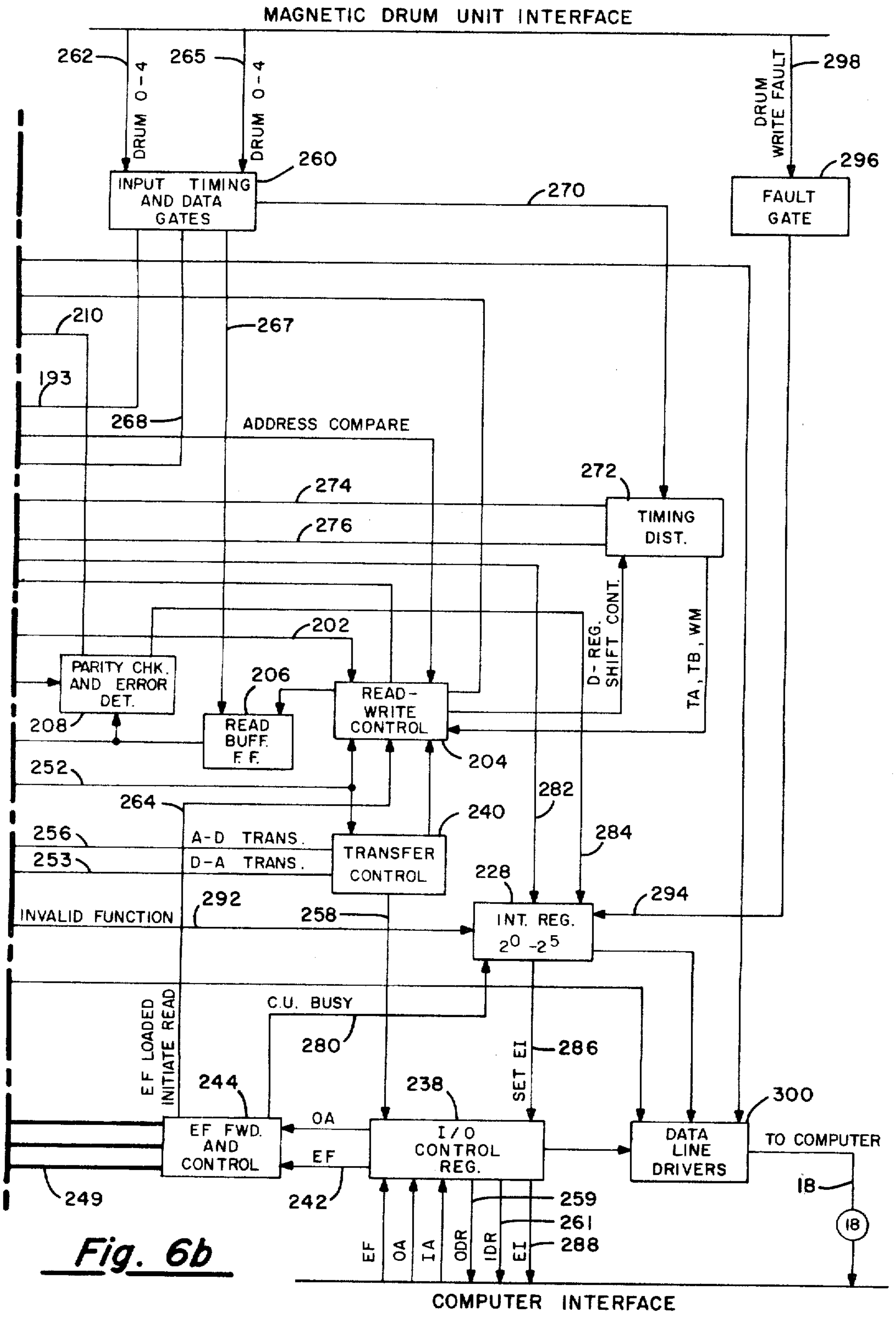

FIGURE 6 illustrates the arrangement of FIGURES 6*a* and 6*b*, which together form a logical block diagram of the Magnetic Drum Control Unit illustrated as block 14 in FIGURE 1. The functional performance of the various portions of the Magnetic Drum Control Unit will be described with a more detailed presentation of the circuitry arrangement utilized in the dynamic programmably alterable interlace selection being presented below. In this logical block diagram, the elements utilized in providing the dynamically alterable interlace selection are shown in heavy lines, while the remainder of the Magnetic Drum Control Unit is shown in lighter lines.

A Magnetic Drum Control Unit receives data words in parallel on the cable 16 at the computer interface. The input signals are applied to input amplifiers 150 which in turn provide the signals to the Assembly Register 152. The Assembly Register is designated the A-Register and is comprised of 18 similar stages, which for this embodiment, comprises a plurality of bistable flip-flop circuits. It is the function of the A-Register 152 alternatively to store the current data word, a function word, an address word, an identifier word, or an end-of-block word during various portions of the operation of the magnetic drum system.

A Data Shift Register 154 comprised of 18 stages is utilized for disassembling and assembling data words. During a writing operation, the Data Shift Register 154 receives the data word on 18 parallel conductors 156. Since writing is in the serial mode, the Data Shift Register 154 provides the data signals in bit serial form on conductor 158 for writing on the selected magnetic drum. During a read operation, the Data Shift Register 154 receives data signals in a bit serial mode on conductor 160 and assembles a complete data word in the stages of the Data Shift Register. Having assembled a data word, the Data Shift Register provides the assembled data word on 18 parallel transmission paths 162 as an input to the A-Register 152 for ultimate transmission to the computer.

A Word Address Register 162, designated WAR, is comprised of 21 stages designated $2^0$ through $2^{20}$, and is used in three distinct portions. The lowest order portion comprised of bits $2^0$ through $2^9$, labeled 164, and is utilized for storing the angular address. The highest ordered stages labeled 166, is comprised of bit position $2^{18}$ through $2^{20}$, and is utilized to store the bit signals which represent the drum unit selected for the operation in progress. The intermediate stages, labeled 168, and comprised of bit stages $2^{10}$ through $2^{17}$ is utilized to store the channel address. The channel address is comprised of the track selection bits. The track selection is broken into three distinct portions wherein the X selection is bits $2^{10}$ through $2^{12}$, the Y selection is bits $2^{13}$ and $2^{14}$, and the Z selection is bits $2^{15}$ through $2^{17}$.

The Drum Angular Address Shift Register 170 is comprised of eleven stages designated $2^0$ through $2^{10}$, and is utilized for assembling and storing the angular address read from the magnetic drum for comparison with the angular address stored in the angular address portion 164 of the Word Storage Register 162. The Angular Address Shift Register 170 receives bit-serial signals read from the angular address track on one magnetic drum unit and assembles them into the angular address word.

The Function Code Register 172 stores the function to be performed in the Function Code portion 174. The Function Code portion is comprised of bit positions $2^2$ through $2^5$. The Function Code Register 172 also includes an Interlace Select portion comprised of bits $2^0$ and $2^1$, which is utilized for storing the interlace selection designator I from the function word, and is labeled 176. The Function Code Register 172 receives the function code and interlace designation from the A-Register 152 via transmission path 178. The Function Code portion 174 of the Function Code Register 172 provides the function code signals along path 180 as input signals to the Function Decoder 182. The Interlace Select portion 176 of the Function Code Register 172 provides the interlace selection signals along path 184 to the Interlace Decode circuitry 186. The interlace Decode circuitry 186 provides enabling signals on along path 188 for selection of the appropriate control circuitry which effects the dynamic alteration of the interlace selection.

The Interlace Select Gates 190 select the proper stages of the Drum Angular Address Shift Register 170 which are to be compared against the Word Address Register portion 164 which holds the angular address. The Address Comparator 192 provides an indication when the angular address read from the selected drum is found to be equal to the angular address stored in portion 164 of the Word Address Register 162. The Address Comparator 192 is enabled upon the receipt of each Word Mark (WM) on line 193. When the desired angular address compares with the effective angular address provided by the Interlace Select Gates 190 on line 194, an enable pulse is provided by the Address Comparator 192 on line 195.

The Search Compare Gates 196 function to generate a signal on conductor 202 when the word read from the magnetic drum, as assembled in the Data Shift Register, compares with an identifier word stored in the A-Register 152. The search find signal provided by the Search Compare Gates 196 on conductor 202 is applied to the Read/Write Control Circuitry 204 and controls the setting of the Read Buffer Flip-Flop 206, which in turn controls the Parity Check and Error Detection Circuitry 208. If a write operation is being performed, the result of correct parity check by Parity Check and Error Detection Circuitry 208 causes a signal on path 210 to enable the Data Write Gates 212, thereby providing a bit serial writing operation from the Data Shift Register 154 via transmission path 158 into the Write Drivers "Ones" 214 or the Write Drivers "Zeros" 216.

In response to the S designator stored in the Drum Select portion 166 of the Word Address Register 162, the Drum Enable Generator 218 causes the selected drum to be enabled via path 220, and the remainder of the drums to be locked out. In addition to enabling the selected drum, the Drum Enabled Generator 218 causes a signal to be produced on conductor 222 which enables Drum Write Enable Generator 224. Therefore, if a write operation is specified, the Function Decoder 182 will also provide a signal on conductor 226 which will cause the write circuitry to be enabled via conductor 228.

The Channel Decoder AND Drivers 230 are responsive to the signals stored in the Channel Address portion 168 of the Word Storage Register 162 for providing signals for the group enable on line 232, for the Y enable on line 234, and a signal is applied on line 236 for the X enable.

The I/O Control Register 238 receives and transmits control signals to and from the computer and supplies commands ultimately to the Transfer Control Circuitry 240. This is accomplished when an external function (EF) signal is received from the computer from the I/O Control Register 238. Under such conditions a signal is applied on line 242 to the EF Function Word and Control Circuitry 244. This control circuitry 244 causes the interlace select bit designated as the I portion of the external function word stored in the A-Register 152 to be transmitted via path 246 into the Interlace Select Register 176, and to cause the Function Code portion of the external function word stored in the A-Register 152 to be transmitted via data path 248 into the Function Code Register 174, by providing an enable signal on path 249. Additionally, when the second word has been received from the computer into the A-Register 152, a signal is provided on control line 250 to cause the channel address portion to be loaded into the Channel Address portion 168 and the angular address portion to be loaded into the angular address portion 164 of the Word Address Register 162 from the A-Register 152. The Function Decoder Circuitry 182 provides a signal on path 252 to control the Transfer Control Circuitry 240. The Transfer Control Circuitry 240 controls the storage and movement of data words in the Magnetic Drum Control Unit. If the external function word loaded in the A-Register 152 indicates that a read operation is to be performed, the Transfer Control Circuitry 240 causes control signals to be issued along path 253 for controlling the transmittal of data from the Data Shift Register 154 into the A-Register 152 in a parallel manner along transmission path 254. In the event that the external function word indicates that a write operation is to be performed, control signals are issued along path 256 to enable the transmittal of data from the A-Register 152 into the Data Shift Register 154 via path 156. The Transfer Control Circuitry 240 also operates to provide control signals along path 258 such that if a write operation is specified, signals are issued to clear the A-Register 152 and to set the ODR drive line, 259. Alternatively, if a read operation is specified signals are issued to cause the A-Register 152 to be loaded and to cause the IDR drive line 261 to be set.

For a read operation the EF control 244 issues a signal on path 264 to activate the Read/Write Control Circuitry 204; and, additionally, sends a signal on path 266 to the A-Register 152. In the event a write operation is indicated, the Function Decoder 182 provides a signal along path 252 to activate the Read/Write Control Circuitry 204 in the write mode.

The entire operation of the Magnetic Drum Control Unit is timed and controlled by the Input Timing and Data Gates 260. This circuitry operates to receive the Timing Track pulse (TT), the Read Mark pulses (RM), the Word Mark pulses (WM), and the Angular Address signals (AA) as indicated by path 262, from the recorded tracks on the surface of the magnetic drum. Additionally, the data signals are serially read from the drums via path 265. The data signals are fed via path 267 to the Read Buffer Flip-Flop 206 for ultimately being assembled in the Data Shift Register 154. The Angular Addresses are transmitted via path 268 into the Drum Angular Address Shift Register 170, and the Word Mark pulses are provided via path 193 to the Address Comparator 192. The Timing Track pulses and the Word Mark pulses are also transmitted via path 270 to the Timing Distribution Circuitry 272. The Timing Distribution Circuitry 272 controls the shift timing in the Drum Angular Shift Register 170 via control path 274, and controls the operation of the Data Shift Register 154 via path 276.

The Interrupt Register 278 is comprised of six stages $2^0$ through $2^5$, and operates to store interrupt codes associated with this system. The computer is always informed by the Magnetic Drum Control Unit as to the status of the magnetic drum system operation. Through the status words, described above, the operating program is also made aware of the status condition.

When the computer issues a new function word to the Magnetic Drum Control Unit prior to the completion of a previously requested function, a Not-Ready code (01) will be transmitted via path 280 into the Interrupt Register 228, and operates to block further new action. As soon as the output operation is completed, the Magnetic Drum Control Unit assumes a ready condition, but the computer must reinitiate the function word that could not be performed.

If during a Search operation the end-of-drum is detected for the selected drum, or during the read portion of a Search-Read operation after the last address on the selected drum has been read, a signal will be sent to the Interrupt Register 228 via path 282.

If a parity error is detected during a Read operation, code 04 is set in the Interrupt Register via path 284, and an external interrupt signal is sent from the Interrupt Register via path 286 and on to the computer via path 288. If the input buffer is still active when the external interrupt signal is acknowledged, the word in error will be transferred via the Input Data Lines 18 and the Read function will be concluded. If a parity error is detected during a Search operation, an external interrupt signal is sent to the computer via external interrupt line 288. If the input buffer is still active when the external interrupt signal is acknowledged, the drum address of the word in error will be transferred via the Input Data Lines 18 and the Search function will be concluded. Parity errors will be detected during both the Search portion and the Read portion of Search-Read operations.

The current address code (10) is generated in response to a request current address external function instruction. It will occur approximately 70 microseconds after the instruction is received. The status word contains the status code and the angular address of the selected drum. The current address is placed on the A-Register 152 via line 290.

If the Function Decoder 182 detects an invalid function, the illegal function word code (20) is set via path 292 into the Interrupt Register 278. The illegal function word code is also generated when the starting address specified in the function word is beyond the address range of this system, or if an output operation is initiated in an area locked out by the write lock-out switches available on the maintenance panel.

In the event multiple heads are selected due to component malfunction, a drum write fault code 40 will be entered via path 294 in the Interrupt Register 278. This code is derived from Fault Gate 296 which is responsive the the drum write fault received on path 298. The interrupt is generated only when the drum in which the fault exists is addressed by the computer.

A series of 18 Data Line Drivers are provided for driving input channel 18 for sending data words to the computer from the A-Register 152.

Having considered all of the major portions of the Magnetic Drum Control Unit, a summary of drum addressing will be advantageous in understanding the operation of the Magnetic Drum Control Unit. The particular drum unit is specified in the Function Word while the track and angular position on the selected drum are contained in the Address Word which is sent subsequent to the sending of the function word from the computer. The complete address is stored in the Word Address Register 162. This register is also a counter which advances one count each time a word is transferred to or from the selected magnetic drum. Data transfer begins at the address specified by the computer and proceeds sequentially through each sequentially addressable angular position on the track until the last position is reached. At this point, the carry pulse from the Angular Address portion 164 of the counter advances the Track Address portion 168 one count. This selects the next higher numbered track and so on down through the total available number of tracks on the selected drum. When the last track on the selected drum is reached, the carry pulse from the Track Address portion 168 of the Word Address Register 162 carries into the Drum Select portion 166 of the Word Address Register 162, and advances the selection of the magnetic drum by one count. This operates to advance sequentially and automatically the sequential storage onto the next available drum unit. The preceding sequence of events continues through the track for the next sequential drum and then on through the entire magnetic drum system. The foregoing description is presented to provide a clear understanding of the internal organization of the stored data words. It should be noted, however, that the address ranges are continuous regardless of the number of drums in the sub system. Consequently, the individual magnetic drums available in the magnetic drum system may be visualized as one large storage device without regards to drum number, truck number or angular position, for a particular continuous operation.

A data write lock-out feature is provided in the magnetic drum system which may be initiated by selecting manual switches on the operator's console. The purpose of this feature is to inhibit writing in selected regions of the magnetic drum system. Control of the lock-out feature is provided by means of seven switches located on a maintenance panel. Each of these switches control a specific area of the magnetic drum system as defined in the following Table III.

TABLE III

| Switch Number | From Address | To Address |
|---|---|---|
| 0 | 000000 | 007777 |
| 1 | 010000 | 017777 |
| 2 | 020000 | 037777 |
| 3 | 040000 | 077777 |
| 4 | 100000 | 177777 |
| 5 | 200000 | 277777 |
| 6 | 400000 | 777777 |

If a program initiates a write operation in a locked out area, an illegal function code will be generated by the Magnetic Drum Control Unit.

Variable interlace which may be dynamically programmably altered in the Magnetic Drum Control Unit is a primary aspect of the subject invention. The Magnetic Drum Control Unit controls the selection of the interlace by means of the Interlace Select Gates 190. The selected interlace code (I designator) is stored in the two bit positions of the Interlace Select Register 176. The purpose of the Interlace Select Gates is to determine the method of decoding the angular address read from the selected magnetic drum and thereby determines the interlace factor. Select Gates for this embodiment provide a range of interlace from 2 to 16 (power of 2). As an example, assume an Interlace of 2 has been selected. The $2_0$ position of the angular address read from the magnetic drum is shifted forwarded to the $2_{10}$ position and all other positions are shifted back one. The output of the Interlace Select Gates 190 are then compared with the output of the Word Address Register 162 at the Angular Address portion 164 by the Address Comparator 192. The Angular Address contained in the Word Address Register 162 is advanced by one for each word transfer, preventing a compare for alternate sequentially read angular addresses for each drum revolution. For this example the time is doubled between sequentially available words. This system of shifting the angular addresses read sequentially from the magnetic drum is further extended for the interlace of 4, 8, and 16 described for this embodiment of the subject invention. From the example of Interlace 2, it can be seen that two drum revolutions are necessary to access all physical locations. Further, it can be seen that the Interlace selection in each case determines the number of drum revolutions to sequentially access sequentially addressable storage locations. This follows from the shifting by a multiple of a power of two of the angular address read from the magnetic drum. The system will be described in more detail below.

*Logic circuits*

Characteristic circuits for providing the necessary logical functions for implementing the dynamic programmably alterable interlace selection will be described below. The logic diagram block representation will also be described for each of the logic circuits. It should be understood that the following circuits are intended to be illustrative only in that other circuits capable of performing the same or equivalent logical functions could equally as well be used. In the schematic diagrams, input signals are applied in all cases at the lower extremity of the schematic circuit diagram, and output signals are derived from the terminal shown at the top of the schematic diagram. The logic block diagram symbols utilize the conventions set forth above in that the unfilled half-arrow represents an input terminal which is a low signal and for this embodiment is approximately −4.5 volts. The low signal represents by definition a logical 0 value in the binary number system. The filled half arrowhead represents a high signal which for this embodiment is approximately ground potential, and represents a 1 in the binary number system. The logic circuits incorporated in this embodiment, utilize transistor amplifiers and diode intermediate connections. The output circuits of the respective logic circuits are coupled directly to the input circuit of subsequent logic circuits. For the following consideration leakage currents are not considered.

The schematic circuit diagram illustrated in FIGURE 7*a* is designated a Type 901 bistable flip-flop comprised of cross-coupled transistors Q1 and Q2 having associated therewith a logic array comprised of a plurality of unidirectional conducting components, such as diodes. The circuitry illustrated in dashed block 200 comprises an AND circuit and is termed the Set input side of the flip-flop. The circuit operates such that a low signal must be impressed on both of the Set input terminals to cause junction point 202 to be brought to a low level thereby causing the base 204 of transistor Q2 to be biased in the forward direction such that transistor Q2 is caused to fully conduct. This causes the output signal line, line 206, designated the Clear output terminal, to be raised to the high level causing transistor Q2 to conduct, causes cross-connection line 208 to be brought to the high level also resulting in the base 210 of transistor Q1 to be reverse-biased such that transistor Q1 will not conduct appreciably. This results in a low signal being impressed on output terminal, designated the Set terminal, and labeled 212. It should be noted that while only two input terminals are shown on the Set side of the flip-flop, that by adding additional input terminals, with associated diodes, can cause the requirement of as many input signals as desired being present to cause the flip-flop to be Set. When a low signal is impressed on input terminal 214, designated the Clear input terminal, the operation is similar to that just described, but in reverse order. Such an application of a low signal to the Clear input terminal causes the base 210 of transistor Q1 to be forward bias with respect to the emitter, such that transistor Q1 conducts, thereby resulting in a high signal on the Set output terminal 212. Additionally, the high output signal is carried on cross-coupling line 216 to ultimately result in reverse biasing the base 204 of transistor Q2, thereby causing the output signal on the Clear output terminal 206 to be low.

The logic block diagram symbol illustrated in FIGURE 7*b* represents the circuit illustrated in FIGURE 7*a*, or other logic circuits which would perform the same logical function. The arrowhead arrangement is such that it illustrates the condition that when two low signals are impressed on the Set input terminals the AND circuit portion 200 is satisfied, and the flip-flop block is caused to produce a low signal on the Set output terminal and a high signal on the Clear output terminal. The open arrowhead illustrated on the Clear input terminal indicates that when a low signal is applied thereto that the reverse condition is set forth on the Set and Clear output terminals, as just defined above.

FIGURE 8*a* illustrates schematically an Inverter circuit shown enclosed in dashed block 220 coupled to an input circuit shown as enclosed in dashed block 222, the entire circuit being designated a Type 906 logic circuit. When each of the input terminals has low signals applied thereto, the base 224 of transistor Q1 is forward bias, such that transistor Q1 conducts and provides a high signal on the output terminal. If either or both of the input terminals have high input signals applied thereto, the base terminal 224 is reverse bias causing transistor Q1 to terminate conduction, and results in a low output signal on the output terminal. It can be seen then that the logic is such that input circuit 222 is an AND circuit for low signals, or an OR circuit for high signals.

The logic block diagram symbol for the schematically represented circuit of FIGURE 8*a* is shown in FIGURE 8*b*. It will be noted that in the block the term AND/OR indicates that the circuit can be considered to be an AND inverter for low pulses, or an OR inverter for high input signals. When used in the logic diagram, the nature of the input signals will designate whether the term AND or OR is to be used. If only one of the input terminals of the circuit shown in FIGURE 8*a* is utilized, the circuit results in an inverter amplifier operation. The logic block diagram symbol as illustrated in FIGURE 8*c*, shows this operation wherein a low signal on the input terminal is inverted by the circuit resulting in a high output signal on the output terminal. The designation N within the block identifies the negation operation of the circuit.

The circuit shown schematically in FIGURE 9*a* is a driver circuit, designated CD–959. The operation is such that when low signals are applied to each of the input terminals, the base terminal 226 of transistor Q1 is forward biased, thereby causing transistor Q1 to conduct and its output terminal 228 to approach ground or a high level. This high level on conductor 228 reverse biases the base 230 of transistor Q2 thereby causing it to reduce its conduction and results in a low signal being supplied on the output terminal. FIGURE 9*b* is the logic block diagram representation of the operation of the driver circuit shown in FIGURE 9*a*.

FIGURE 10*a* is a schematic diagram of a bistable flip-flop, designated as a Type 905 circuit. The operation of the flip-flop circuit portion shown enclosed in dashed block 230 is similar to that of the cross-coupled flip-flop described and shown in FIGURE 7*a*. The portion of the circuit shown in dashed block 232 is an AND-OR diode logic circuit and operates such that if low signals are applied on both of the input terminals of groups 234, 236, 238, or 240, of the Set input terminals, that the output signal on the Set output terminal will also be low. If a low signal is applied on the Clear input terminal, a low signal will be provided on the Clear output terminal and the Set output terminal will be switched to a high signal. FIGURE 10*b* is the logic block diagram symbolic representation of the circuit illustrated in FIGURE 10*a* with the bistable flip-flop 230 shown being driven by AND-OR circuit 232 on the Set input side, and with the single Clear input terminal.

FIGURE 11*a* illustrates schematically a register stage used in a shift register and is a cascaded flip-flop circuit designated as Type 927. A pair of cross-coupled bistable flip-flops shown respectively in dashed block 242 and dashed block 244 are utilized in conjunction with diode logic circuits to form the shift register stage. Timing input signals are applied on the input terminals designated Timing. A pair of AND circuits in dashed blocks 246 and 248 respectively, are utilized to intercouple the cascaded stages of cross-coupled flip-flops 242 and 244. One of the timing circuits 249 is coupled to AND circuits 248 and 246, while the Timing circuit 251 is coupled to AND circuit 250 and AND circuit 252. Logic inputs are provided to input terminals associated with AND circuit 250, AND circuit 252, and OR circuit 254 for controlling the operation of the stage of the shift register. FIGURE 11*b* illustrates the logic block diagram symbolic arrangement used in the logic diagram representations, which will be set forth below, for representing the circuit shown schematically in FIGURE 11*a*. The various portions of the circuit illustrated in FIGURE 11*a* carry the same reference numerals in FIGURE 11*b*, and the same convention of signal representation is used.

FIGURE 12*a* is a schematic diagram of an Inverter-AND circuit designated as Type 911, which operates similarly to that circuit described in FIGURE 8*a*, the difference being the number of input terminals provided. When all input terminals have low signals impressed thereon the signal available at the ouput terminal is high. FIGURE 12*b* illustrates the logic block diagram symbol for the schematically shown circuit of FIGURE 12*a*.

FIGURE 13*a* is a schematic diagram of an Inverter AND/OR circuit designated as a Type 914 logic circuit. The circuit is comprised of a transistor inverter amplifier including transistor Q1 and its associated biasing network, and a plurality of diode elements arranged in conjunction with the voltage supply to form an AND/OR input circuit to the transistor inverter circuit. The circuit operates such that if any of the AND circuits, shown by the diode arrangement in dashed block 260, are satisfied by receiving low input signals at input terminals 262, 264, 266, or 268, the signal at the output terminal will be high. The diodes shown enclosed in dashed block 269 form a part of the OR circuitry. FIGURE 13*b* is a logic block diagram symbolic representation of the circuit shown schematically in FIGURE 13*a*, and the reference numerals applied in the consideration of the schematic diagram as carried over into the logic diagram representation.

FIGURE 14*a* is a schematic diagram of a Single-Shot circuit designated as a Type 952 logic circuit. The Single-Shot circuit operates when activated by the proper combination of input pulses on the input terminals to provide an output pulse for the predetermined duration dependent upon the coupling of the selected value of the capacitors C1, C2, C3, or C4 to Timing terminal. For example, for the circuit diagram shown by coupling the 100 picofarad capacitors C3 to Timing terminal, the pulse provided on the output terminal has a duration of 2.5 microseconds. This illustrative coupling is shown by dashed line 270. The arrangement of the diode logic in combination with the transistor logic provided by transistor Q1, Q2 and Q3 results in an operation wherein when the input terminals have low signals impressed thereon, the output terminal will provide a low output signal of a duration dependent upon the wiring selection of the capacitors C1 through C4. The logic block diagram representation of the Type 952 Single-Shot circuit is illustrated in FIGURE 14*b* with the connection 270 indicative of the time selection for the Single-Shot arrangement.

FIGURE 15*a* is a schematic diagram of a bistable toggle flip-flop circuit designated as a Type 520 logic circuit. The operation of the cross-coupled flip-flop portion 274 is similar to that described for the cross-coupled flip-flop portion of the circuit illustrated in FIGURE 7*a*. The diode logic shown enclosed in dashed block 276 provides the logical OR function and the diode logic shown illustrated within dashed block 278 provides an AND logical function. In addition to the switching input terminals just mentioned, the Type 520 toggle flip-flop includes a Toggle input circuit which causes the state of the flip-flop portion 274 to switch to its alternative stable state irrespective of its existing operating condition upon the application of a high signal on the Toggle input terminal. FIGURE 15*b* is a logic diagram symbol for the Type 520 toggle flip-flop circuit, as used in the detailed logic block diagram description below.

*Programmable interlace—selection control*

FIGURE 16 is a simplified block diagram of the portions of the Magnetic Drum Control Unit illustrated in FIGURES 6*a* and 6*b* which dynamically performs programmably variable interlace selection requested by an associated computer instruction. The portions of the Magnetic Drum Control Unit which are not related primarily with the Interlace selection have been omitted, and detail control lines for the various portions have also been omitted. The intention is to illustrate the flow of external function words from the computer and the flow of the angular address words from the magnetic drum through the interlace selection circuitry. Each block element includes a drawing figure designation where the detail logic block diagrams are illustrated for the function shown.

The A-Register 400 is comprised of 18 bistable flip-flops. Each of the flip-flops comprise a storage stage which stores 1-bit of the external function words received from the computer via cable 402. Control is provided, but not shown, for gating the first received external function word (see FIGURE 5*a*) into the Interlace Decoding Circuitry 404 via path 406. The Interlace Decoding circuitry 404 operates on the I-designator, that is, the interlace selection bits, and determines the amount that the angular address read from the magnetic drum will be shifted for comparison to the angular address specified in the second external function word received from the computer. The degree of shifting, as described above, of the angular address read from the magnetic drum determines the interlace selection. The Interlace Decoding circuitry 404 provides an enabling signal on line 408 which enables the appropriate Interlace Select Gates 410 for providing the desired shifting of the angular address read from the magnetic drum. The Angular Address Drum Shift Register 412 reads sequentially the angular address bits from the magnetic drum via line 414 and is comprised of eleven shifting stages. Once the angular address read from the drum has been assembled in the Angular Address Shift Register 412, appropriate control circuitry gates the Angular Address to the Interlace Select Gates via path 416. The angular address read from the drum will be shifted in the Interlace Select Gates according to the selection provided from the Interlace Decode circuitry 404 via path 408. The shifted angular address will be provided on path 418 into the Address Compare circuitry 420. After having received the first external function word in the A-Register 400, and after having the first external function word shifted into the Interlace Decoding circuitry 404, a second external function word will be received in the A-Register via path 402. The second function word is of the format illustrated in FIGURE 5*b* and includes an angular address portion. The entire second external function word will be transmitted via path 422 into the Word Address Register 424. The Word Address Register 424 is comprised of 21 bistable flip-flop and the appropriate control circuitry, which includes control circuitry for counting. The portion of the Word Address Register which contains the angular address will be directed via path 426 to the Address Compare circuitry 420. If the angular address received from the computer via path 402 in the second external function word compares identically with the shifted angular address read from the magnetic drum, the Address Compare circuitry will provide an enable pulse on path 428 which indicates that the designated operation to be performed at the requested address may be performed. However, in the event that the angular address requested by the computer does not compare with the shifted angular address read from the magnetic drum, the Address Compare circuitry will not issue the enable pulse on line 428, and the circuitry will proceed to read the next sequential angular address from the magnetic drum via line 414. The angular address selected by the computer and stored in the Word Address Register 424 will be retained therein until such time as the angular address read from the magnetic drum, when shifted by the Interlace Select Gates 410, meets the required equality comparison in the Address Compare circuitry 420.

Having considered generally the dynamically alterable Interlace selection system, a more detailed consideration of this portion of the logic will be made below. FIGURES 17*a*, 17*b*, 17*c* and 17*d* when viewed as illustrated in FIGURE 17 illustrate the logic block diagram of the A-Register. The A-Register is comprised of 18 bistable flip-flop circuits of the Type 905 illustrated schematically in FIGURE 10*a*, respectively sequentially indicated as FF–A00 through FF–A17, and labeled sequentially 450 through 467. The Magnetic Drum Control Unit Timing and Control 468 is shown in block form and comprises the circuitry utilized to read the Timing Track pulses from the magnetic drum, to form the timing commands, and to control the operation of the Magnetic Drum Control Units, as described and shown in FIGURES 6*a* and 6*b*. This circuitry is not shown in detail since it does not add to the description and understanding of the interlace selection system. At the outset, the Magnetic Drum Control Unit and Timing Control 468 issues a clear pulse on the Clear A line 470, which is fed to the Clear terminal of each of the flip-flops which comprise the A-Register, and operates to set each of the flip-flops in the 0-state. This prepares the A-Register to receive data words and control words from the computer. When an external function word is received from the computer on conductors 16 by the Input Amplifier 150 the respective bits of the external function word are applied in parallel on cable 472 such that each bit is fed to an associated flip-flop in the A-Register. The external function word is not transmitted directly into the A-Register, but requires an enable pulse to be provided by the Magnetic Drum Control Unit Timing and Control 468 via cable 474. The AND circuits which accept the external function word from the Input Amplifier 150 via path 472 and which receives the Load A enable pulse via cable 474, are associated with flip-flops FF–A00 through FF–A17 and are respectively sequentially labeled 480 through 497, and are individually associated with respective bistable flip-flop circuit. The Load A enable pulse is applied to the AND circuit on each stage of the A-Register which receives the respective bits of the external function word. Upon being enabled by the Load A pulse, the external function word is gated through the OR circuit of each of the stages into the Type 905 bistable flip-flops and the value of the external function word has been set into the A-Register. The first external function word is of the format illustrated in FIGURE 5*a* and it will be seen that the function code portion is stored in the flip-flops FF–A14, FF–A15, FF–A16 and FF–A17, shown enclosed in dashed block designated FC. The interlace selection designator I is stored in the flip-flops FF–A12 and FF–A13, shown enclosed in dashed block designated I. The drum designation S is stored in flip-flops FF–A00, FF–A01, and FF–A02, shown enclosed in dashed block designated S. The remaining flip-flops in the intermediate portion of the A-Register are not used during the storage of the first external function word. Referring briefly to the block diagram illustrated in FIGURES 6*a* and 6*b*, the External Function Word Control circuitry 244 provides via line 266 the enable pulse for loading the word into the A-Register. Additionally, the External Function Word Control 244 provides for loading the drum select portion of the A-Register, flip-flops FF–A00 through FF–A02, into the Word Address Register 162 the portion being Drum Select storage 166. The logic block diagram of the Word Address Register is shown in FIGURE 21, and is described below.

The other input circuits for the A-Register will only be summarized in that they do not relate to the programmable selection of the interlace. As described above, the A-Register is also utilized for receiving data words to be recorded on the magnetic drums from the computer, and is utilized to receive words read from the magnetic drum which are to be fed to the computer. One of the input circuits to the A-Register, not shown in detail, is the Data Shift Register 154, whose input signals are provided on path 499. The entry of data words from the Data Shift Register into the A-Register is enabled by a pulse on line 500.

Another source of input to the A-Register for certain operations is the contents of the Word Address Register (WAR–162), shown in detail in FIGURE 21, which is illustrated as being transmitted via path 502 into the A-Register. This transmittal is enabled by an enable pulse being supplied on line 504, by the Magnetic Drum Control Unit Timing and Control 468.

A further input to the A-Register is that of the current address 506 which is provided as inputs to the designated stages via transmission path 508, and is enabled by enable pulse being provided on path 510.

The A-Register, as described above, is utilized for several functions in the Magnetic Drum Control Unit which are unrelated to the selections to the variable interlace. Accordingly, the output signals which do not relate to the interlace selection will only briefly be mentioned. The Clear output terminal of each of the flip-flops in the A-Register are fed via path 512 as inputs to Search Compare Gates 196 when the search compare function is requested. The Search Compare Gates 196 are not illustrated in detail. The output signals from the Set side of each of the bistable flip-flops in the A-Register are fed to the Word Address Register 162 via path 514. This is not related to the interlace selection and will not be described in detail. The transmittal of the Angular Address specified in to the second external function word from the A-Register to the Word Address Register 162 will be described in more detail below in the consideration of FIGURE 21.

Having loaded the first external function word in the A-Register, the Function Code digits are available on the FF–A14 Set line labeled 522, FF–A15 Set line labeled 524, the FF–A16 Set line labeled 526, and the FF–A17 Set line labeled 528. The interlace selection bits are available in the Set line FF–A12 labeled 530, and the FF–A13 Set line labeled 532. These circuits are coupled to decoding circuitry shown in FIGURE 18.

Prior to decoding of the function and the interlace select bits it is necessary to clear the Function Code Register illustrated in FIGURE 18, and designated the F-Register. To do this, a Clear pulse is provided on line 518 from the Magnetic Control Unit Timing and Control 468. In addition to the Clear pulse for the F-Register, an enable pulse is provided on line 520 to cause the loading of the first external function word into the F-Register by the Magnetic Drum Control Unit Timing and Control 468.

FIGURE 18 is a logic block diagram of the Function Code and Interlace Selection Register designated the F-Register, and is comprised of six Type 901 bistable flip-flops, of the type illustrated schematically in FIGURE 7*a*, and sequentially indicated as FF–F0 through FF–F5 which are respectively sequentially labeled 550 through 555. The Clear F-Register pulse applied on line 518 is applied as an input signal into a Type 906 Inverter-OR circuit 560 which operates to provide a Clear pulse to the Clear side of each of the F-Register flip-flops via bus 562. The Clear pulse operates to set each of the F-Register flip-flops to the 0-condition. In addition to the Clear pulse which is received from the Magnetic Drum Control Unit Timing and Control 458, Inverter-OR circuit 560 can be activated by a Manual Clear 564, which operates in a similar manner to provide a Clear pulse on bus 652, which is provided as a Clear input signal to the Clear side of each of the F-Register flip-flops.

The Function Code portion of the F-Register, is shown enclosed in dashed block 174, and the Interlace Select portion of the F-Register is shown enclosed in dashed block 176. The Interlace Decode circuitry is illustrated and shown enclosed in dashed block 186. These numerical references are the same as those employed in the block representation of FIGURES 6*a* and 6*b* and can be related thereto.

The function code bits are received on lines 522, 524, 526 and 528 and are respectively applied to AND circuits 566, 568, 570 and 572. The interlace selects bits are received on lines 530 and 532 and are respectively applied to AND circuits 574 and 576. When the Magnetic Drum Control Unit Timing and Control 468 issues an enable pulse on the Load EF–1 line 520, which is repectively applied to AND circuits 566, 568, 570, 572, 574 and 576, the Function Code and the Interlace Designator bits are enabled into the Set side of the F-Register flip-flops. Once the Function Cole and Interlace Designator I are stored in the F-Register, the A-Register is free to be utilized for the next sequential function word and for subsequent transmittal of data either to or from the computer. The Function Code portion 174 of the F-Register provides output signals to the Function Decode Circuitry 182, as described in FIGURES 6*a* and 6*b*, and is not shown in detail since it does not relate to interlace selection. The Function Decode Circuitry 182 operates to decode the Function Code digits and to initiate the action indicated thereby.

When the Interlace Designator I has been set in flip-flops FF–F0 and FF–F1, the output signals therefrom are provided as input signals to the Interlace Decode circuits shown enclosed in dashed block 186, which are comprised of four Type CD–959 driver circuits, labeled 602, 604, 608 and 616. An active output signal from driver circuit 602 on line 620 indicates that an interlace of two has been selected; an active output signal from driver circuit 604 on line 622 indicates that an interlace of four has been selected; an active output signal from driver circuit 608 on line 624 indicates that an interlace of eight has been selected; and an active output signal from driver 616 on line 626 indicates that an interlace of 16 has been selected. For any given selection of an Interlace Designator I, only one of lines 620, 622, 624, or 626 will have an active output signal impressed thereon, and the remaining three lines will be inactive. Driver circuit 602 receives input signals from the Clear side of FF–F0 on line 628 and from the Clear side of FF–F1 on line 630. Driver circuit 604 receives input signals from the Set side of FF–F0 on line 632 and from the Clear side of FF–F1 on line 634. Driver circuit 608 receives input signals from the Clear side of FF–F0 on line 636 and from the Set side of FF–F1 on line 638. Driver circuit 616 receives input signals from the Set side of FF–F0 on line 640 and from the Set side of FF–F1 on line 642.

Table IV illustrates a tabulation of the interlace possible for this embodiment and the positions shifted for the angular address word read from the magnetic drum for each interlace selection.

TABLE IV

| Interlace Selection | Angular Address Positions Shifted | Interlace Designator (I) Value | Driver Circuit Active |
|---|---|---|---|
| 2 | 1 | 00 | 602 |
| 4 | 2 | 01 | 604 |
| 8 | 3 | 10 | 608 |
| 16 | 4 | 11 | 616 |

Only when both inputs to the AND circuit associated with one of the driver circuits are of a low value will the driver circuit be active. If one or both of the input signals to the AND circuit of the driver is high, the driver circuit is inactive. Therefore, for each of the four possible I-Designator states, one and only one of the four driver circuits will be active. The output signals from the Interlace Decoding circuitry 186 are fed to the Interlace Selection Gates which are illustrated in FIGURE 19, and control the amount of shifting of the angular address read from the magnetic drum and thereby determine the effective value of each angular address for purposes of establishing the effective storage locations which can be sequentially addressed.

The logic block diagram of the Angular Address Shift Register illustrated in FIGURES 20*a* and 20*b* is comprised of a plurality of Type 927 shift register stages illustrated schematically in FIGURE 11*a* and a single stage comprised of Type 901 flip-flops circuits illustrated schematically in FIGURE 7*a*. The Angular Address Shift Register is a double rank register having an input gating rank and an output rank flip-flops. The input rank is designated the N portion, and its flip-flops are designated FF–N00 through FF–N09, sequentially labeled 600 through 609 respectively. An additional flip-flop designated FF–N10, labeled 610, is also provided on the input rank. The output rank of the Angular Address Shift Register is comprised of a plurality of flip-flops sequentially designated FF–M000 through FF–M009, sequentially labeled 620 through 629 respectively. An additional flip-flop designated FF–M010, labeled 630 is provided in the output rank. The output rank is collectively denominated the M-Register. Drum Timing Pulses 632 are provided as control inputs to the Angular Address Shift Register. These Drum Timing Pulses alternately occurring as the Timing Pulse A, designated TA and labeled 634; and Timing Pulse B, designated TB and labeled 636, are provided. These timing pulses control the shifting of the angular address sequentially into the Angular Address Shift Register. Timing pulses TA are applied on line 638 as an input control signals to the N rank of the Angular Address Shift Register. Timing pulses TB are applied on line 640 as control input pulses to each flip-flop in the output rank M0. Apparatus for reading the angular address signals from the Angular Address Track is illustrated as block 642, and includes apparatus for providing a signal when a "1" signal is read in a bit position of the angular address 644, and apparatus for providing a signal when a "0" signal is read in a bit position of the angular address 646. The apparatus for providing the Timing Pulses and for reading the angular addresses are not shown in detail. The sequentially read 0 and 1 bit signals which comprise the angular address, are applied as input signals to FF–N10. The 1-bit signals are applied on line 648 and the 0-bit signals are applied on line 650, and control the condition of FF–N10 when Timing Pulse TA is present. The subsequent occurrence of a TB pulse causes FF–M10 to be altered according to the condition of FF–N10. The output signal from FF–M010, labeled 630, is provided on line 652 as an input signal to an inverter circuit 654 which is utilized to inhibit the address compare operations. The output signal from Inhibit Address Compare 654 on line 656 is directed to the Address Compare circuitry illustrated in FIGURE 22, and operates to inhibit the address comparing function across the dead space 88. Addresses are written in the dead space, but are marked with a 1-bit in position M010. This 1-bit operates to inhibit the comparison. Addresses are written in a continuous manner in the Angular Address track, and for this embodiment, addresses of $2000_8$ and over are in the dead space. Angular Addresses over $1777_8$, but a 1-bit in the $2^{10}$ position, hence inhibit comparison. The alternate occurrence of Timing Pulses TA and TB on line 638 and 640 respectively operates to cause sequential read angular address signals to be gated into the input rank (N rank) on the TA pulse, and into the output rank (M0 rank) on the TB pulse. It can be seen, then, that as each signal of the angular address is read by the Drum Angular Address Reading Circuitry 642, that the bits are transferred sequentially down the Angular Address Shift Register.

Both the Set and the Clear output terminals of the M0 output rank are utilized as input signals to the Interlace Select Gates illustrated in FIGURE 19. Each of the output lines of stages FF–M00 through FF–M009 are labeled with corresponding alpha-numerical designations, and indicate the Set and Clear sides of the respective flip-flops by the "S" for the Set and a "C" for the Clear side. Proceeding in order from left to right across the Angular Address Shift Register the output terminals are sequentially given numerical designations for stages FF–M00 through FF–M009 of 660 through 679 respectively. A detailed explanation of the shifting of the angular address bits from stage to stage in the Angular Address Shift Register is not deemed necessary for a clear understanding of the subject invention and the operation is readily apparent of any consideration of the logic diagram.

FIGURE 19 defines the relationship of FIGURES 19*a*, 19*b* and 19*c* which collectively illustrate the logic block arrangement of the Interlace Select Gates. The Interlace Select Gates are comprised of a plurality of Type 914 Inverter AND/OR circuits, as illustrated in FIGURE 13*a*. The Interlace Select Gates are designated the M1 rank of logic and carry reference designations of M1 with identifying numerals for each of the stages. The Interlace Select Gates are M1000, labeled 680; M1100, labeled 681; M1001, labeled 682; M1101, labeled 683; M1002, labeled 684; M1102, labeled 685; M1003, labeled 686; M1103, labeled 687; M1004, labeled 688; M1104, labeled 689; M1005, labeled 690; M1105, labeled 691; M1006, labeled 692; M1106, labeled 693; M1007, labeled 694; M1107, labeled 695; M1008, labeled 696; M1108, labeled 697; M1009, labeled 698; and M1109, labeled 699. Each of the Interlace Select Gates has four AND circuits associated therewith and each of the AND circuits has a different Interlace Select line controlling its operation. The Interlace Decoding circuitry illustrated in FIGURE 18 provides an active input condition on one and only one of the of Interlace Select Lines 620, 622, 624, or 626, and maintains the other three non-selected lines in the inactive state. It can be seen that this operates to enable only one AND circuits associated with each of the Interlace Select Gates and controls the manner in which the angular address, which is stored in the Angular Address Shift Register, described and illustrated in FIGURE 20, is to be shifted prior to the comparison with the angular address specified in the Word Address Register. The Output terminals from the Angular Address Shift Register stages are coupled into the Interlace Select Gates on input lines which bear corresponding numerical and reference designation for the respective stages. It will be noted that each output terminal of the Angular Address Shift Register is coupled to four separate stages of the Interlace Select Gates. For this embodiment four possible interlace selections are provided; hence, four possible shift conditions are required, thereby utilizing the enabled one of the four AND circuits to establish the selected interlace condition. In the event that fewer interlace selections would be utilized for an alternate embodiment, there could be correspondingly fewer Interlace Select Gates. Alternatively, if a greater number of interlace selections is desired, it is necessary only to expand the number of Interlace Select Gates to accommodate the higher number of shift positions required for adjusting the angular address word read from the magnetic drum Angular Address Track. It is possible that for any given stage in the Interlace Select Gates that more than one of the associated stages of the Angular Address Shift Register will be active or set, and applying signals to the respectively associated AND circuit. However, only the AND circuits which carry the enable from the active Interlace Selection line will meet the requirements for completing the AND circuit, thereby assuring proper action of the shifting of the angular address word by the desired amount in the Interlace Select Gates. Each of the Inverter AND/OR circuits, which comprise the Interlace Select Gates, has associated therewith an output terminal. These output terminals are labeled sequentially from right to left for each associated stage 700 through 719, respectively. Each odd numbered numeral in this range represents the value of the angular address bit position, and each even numbered numeral in this range represents the complement value of the angular address bit position designated. The true value is represented by the numerals 0 through 9, and the complement value of the bit position is represented by numeral 0 through 9 with the bar over the numeral. The output terminals of the Interlace Select Gates are coupled the Address Compare circuitry in FIGURE 22, and the input terminals to the Address Compare circuitry bear the same alpha-numerical reference values and numerical label as those illustrated on the output terminals of the Interlace Select Gates.

FIGURE 21 defines the relationship of FIGURES 21*a*, 21*b*, and 21*c* which collectively are the logic diagram of the Word Address Register. For purposes of discussion, the Word Address Register is also referred to as the H-Register. The H-Register is comprised of a plurality of Type 520 toggle flip-flops illustrated schematically in FIGURE 15*a*. The H-Register toggle flip-flop stages are sequentially designated FF–H00 through FF–H20, and are labeled 730 through 750 respectively. Each stage of the H-Register receives an input signal on one of the AND input terminals from an associated stage in the A-Register (see FIGURE 17) via one of the conductors in the cable designated 514 in FIGURE 17*d*. The flip-flop alpha-numeric designation of each of the input lines from the A-Register indicates the stage in the A-Register with which the stage of the H-Register is associated.

The H-Register is broken into three separate sections, as described in FIGURES 6*a* and 6*b*. The storage of the S-Designator, which defines the drum until selection, is accomplished in stages FF–H18, FF–H19, and FF–H20. The storage of the S-Designator is shown enclosed in dashed block 166. The output signals from the S-Designator storage portion 166 of the Word Address Register are directed to the Drum Selection Circuitry illustrated as block 752. The drum selection circuitry 752 is generally described in FIGURES 6*a* and 6*b* and is not shown in detail here.

Figure 17A:
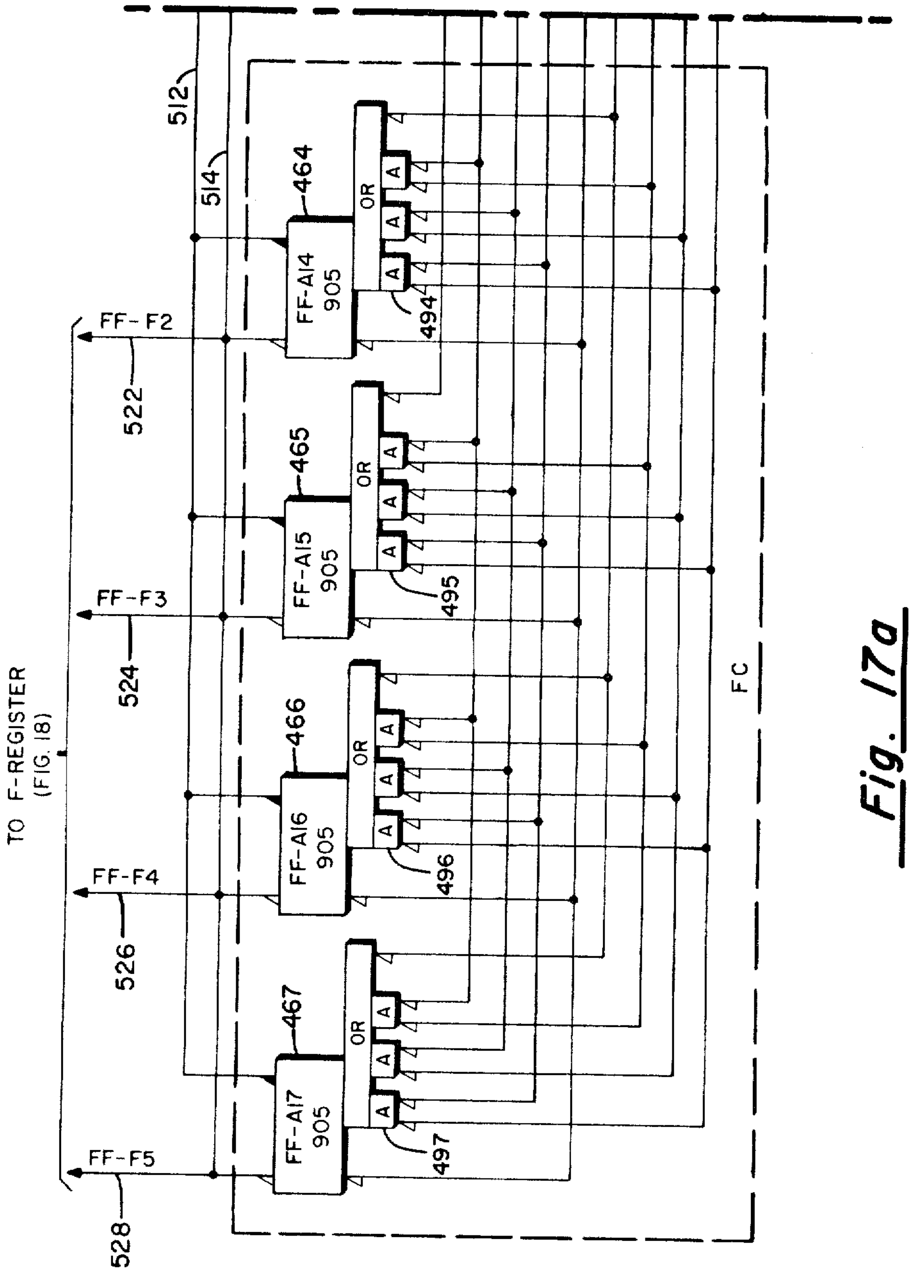
Figure 17B:
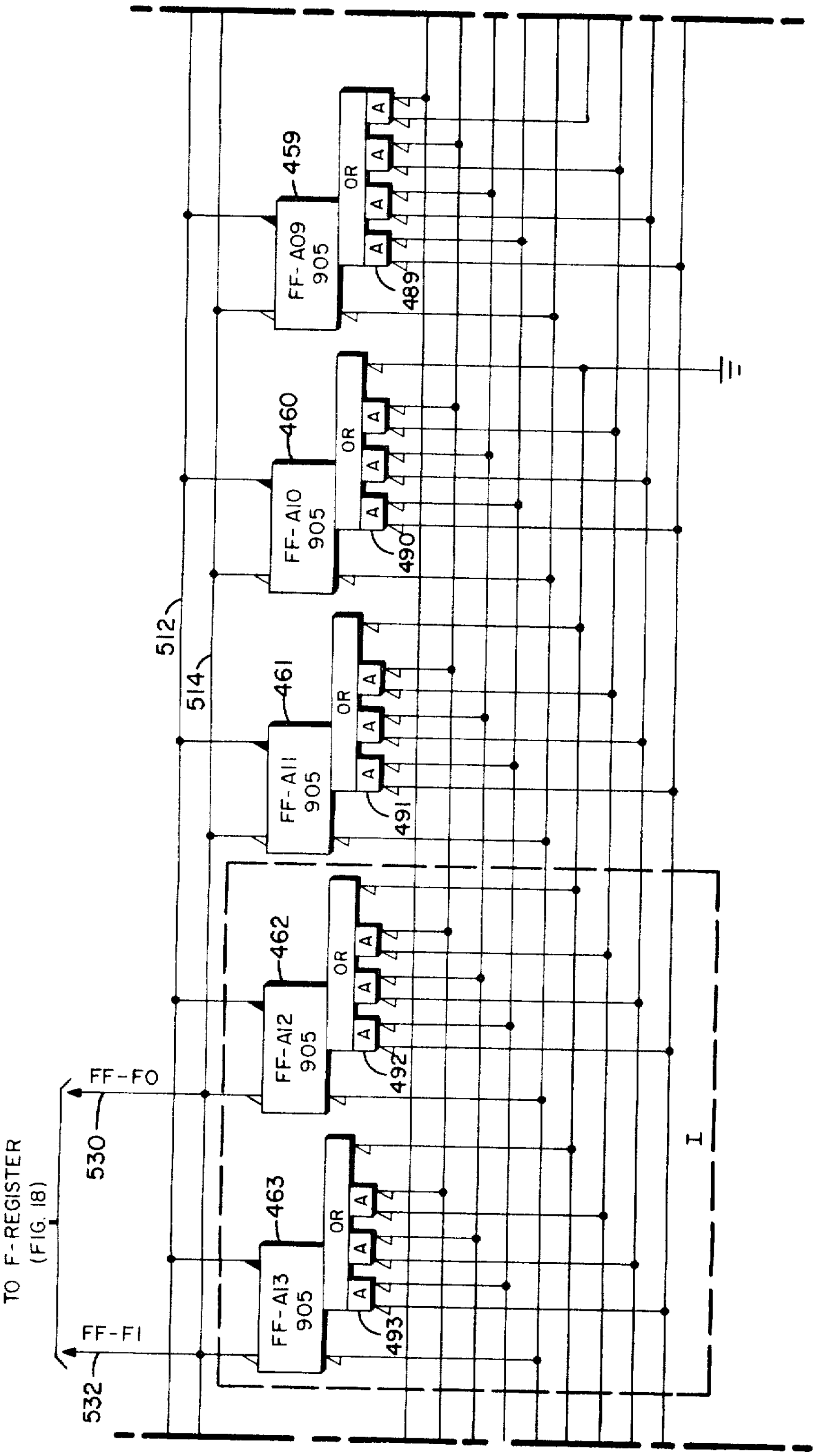
Figure 17C:
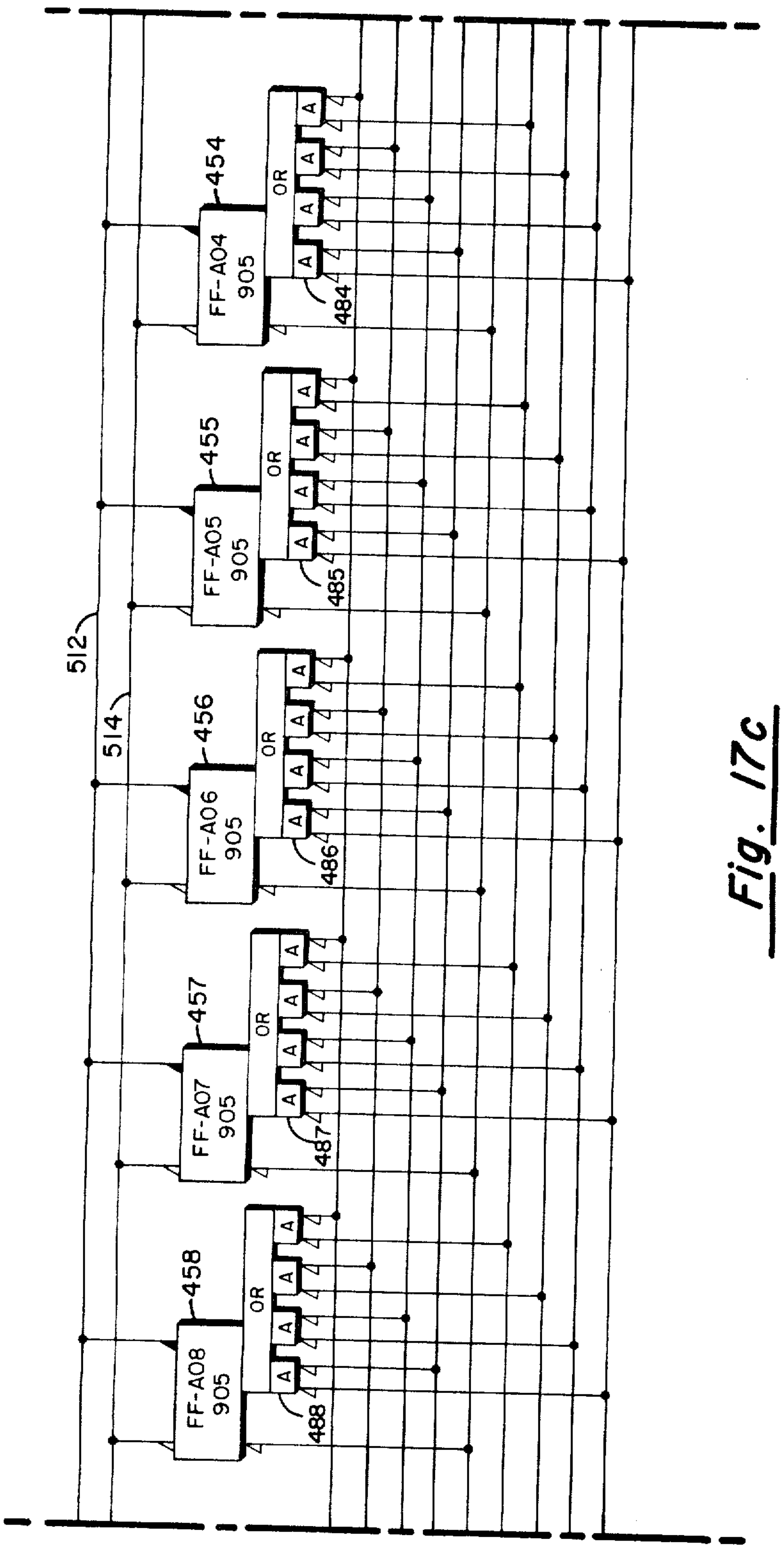
Figure 17D:
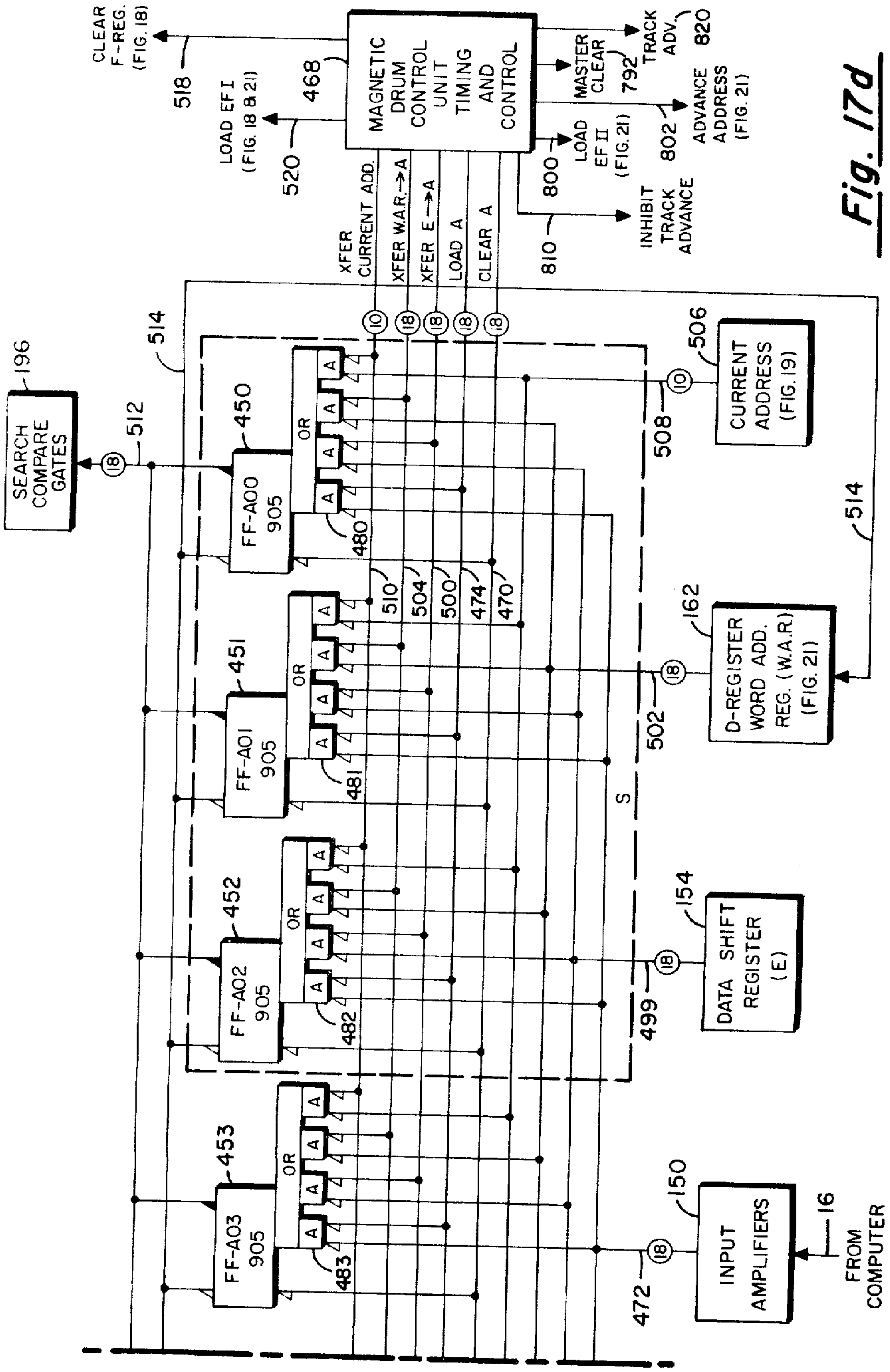

The S-Designator portion 166 is loaded when the Load EF–I line 520 is activated by the Magnetic Drum Control Unit Timing and Control 468 (see FIGURE 17*d*). The loading of the S-Designator portion 166 is accomplished at the same time as the external function word is transmitted from the A-Register into the Function and Interlace Decoding circuitry.

The Channel Address portion of the Word Address Register is illustrated enclosed in dashed block 168, and is comprised of stages FF–H10 through FF–H17. The output terminals of each stage of the Channel Address portion are directed to the Channel Decode and Driver Circuitry, illustrated as block 230. The Channel Decode and Driver Circuitry 230 is generally described in association with FIGURES 6*a* and 6*b*, and further detail description will not be presented. The Channel Address portion 168 has a Manual Clear line 754 which has a pushbutton 756 on the maintenance panel to allow selectively manually applying a voltage level V which will clear the channel address stages 740 through 474 when the pushbutton 756 is depressed. The voltage V is directed to a pair of Type 906 inverter circuits labeled 758 and 760. These inverter circuits drive lines 762 and 764 respectively and operate to clear the higher ordered stages in the H-Register. Manual Clear button 756 also operates to clear the S-Designator portion 166 of the H-Register. The highest ordered stage FF–H17, labeled 747 of the Channel Address portion 168, is coupled to the S-Designator storage portion 166. The Clear output terminal 766 is coupled to a Type 952 Single Shot circuit 768, which has a 0.75 microsecond delay, and which in turn is coupled to an input circuit of a Type 906 Inverter circuit 770. Inverter circuit 770 is coupled to the toggle input terminal 772 of H-Register stage 748. This coupling of stage 474 to stage 748 through the Single Shot 168 and Inverter circuit 720 is provided for advancing automatically the selection of the next higher drum unit when the currently utilized drum unit has been completely filled on the Record operation or has been completely read on a Read operation, and when the operation specified by the computer has not been completed. The operation of the Single Shot circuit 768 is to provide a delay such that switching can occur in the drum system.

The Angular Address Storage portion of the H-Register is indicated enclosed within dashed block 164, and is comprised of register stages FF–H00 through FF–H09, labeled 730 through 739 respectively. At a maintenance console (not shown) a Manual Clear button 780 is provided for making a contact to a voltage level V to line 782. The Manual Clear line 782 is coupled to the input terminals of a pair of Type 906 Inverter circuits designated 784 and 786. Inverter circuits 784 drives line 788 for clearing stages FF–H00 through FF–H04, and Inverter circuit drives line 790 for clearing circuits FF–H05 through FF–H09, when pushbutton 780 is depressed. The entire H-Register is also cleared when a Master Clear pulse is received on line 792 from the Magnetic Drum Control Unit Timing and Control Section 468. The Master Clear pulse is directed to drive circuit Type CD–959, labeled 794, which drives line 796 to clear the entire H-Register. As mentioned above, each stage in the Angular Address portion 164 of the H-Register is associated with the corresponding stage in the A-Register, and the respectively associated stages are indicated by the alpha-numeric A-Register flip-flop designations on the input lines to the H-Register. When the first external function word has been transmitted out of the A-Register into the Function and Interlace Decoding circuitry, and a second external function word has been read into the A-Register, the Magnetic Drum Control Unit Timing and Control 468 issues a signal on the Load EF–II line 800 which is provided as an enable pulse to the AND input terminals of H-Register stages FF–H00 through FF–H17, labeled respectively 730 through 747. This causes the Angular Address and the Channel Address to be gated into the designated stages of the H-Register.

Each time a sequential operation is completed on an address, the Magnetic Drum Control Unit Timing and Control 468 issues an Advance Address Pulse on line 802 which is received as an input signal on line 802 to the toggle input terminal of FF–H00, labeled 730. This causes the Angular Address stored in the Angular Address portion 164 of the H-Register to be advanced by 1. The advancing of the Angular Address in the Word Address Register provides for automatic sequencing in the addressing.

It will be recalled in the discussion above that it was described that the changeover of sequentially addressable storage locations was performed automatically when a given track was completely filled. This is accomplished by providing a carry pulse from the Angular Address portion 164 of the Word Address Register into the Channel Address portion 168 of the Word Address Register. This carry operation can be inhibited by the Magnetic Drum Control Unit Timing and Control Section 468 by providing an inhibit pulse on line 810. This inhibit pulse is directed as an input signal to a Type 952 Single Shot circuit 812 having 2.5 usec. duration, which in turn provides an input signal to a Type 906 Inverter circuit 814. The output signal from the highest order stage FF–H09, labeled 739, is directed as an input signal on line 816 to the Single Shot circuit 812. When the H-Register stage 739 is in the appropriate condition and the Inhibit Track Advance Pulse on 810 is absent, the Single Shot circuit 812 is activated and causes the signal on line 818 to automatically advance the track selection in the Channel Address portion 168 by toggling the lowest order stage FF–H10. An indication is also provided by a signal on line 820 back to the Magnetic Drum Control Unit Timing and Control 468 that the track has been advanced.

The Clear and Set output terminals of each stage in the Angular Address portion 164 of the H-Register are directed to the Address Compare circuitry of FIGURE 22. From right to left the output terminals are labeled sequentially 850 through 869 respectively. In this range, the even numbered numerals are associated with the Clear output terminals and the odd numbered numerals are associated with the Set output terminals. Each of the output lines 850 through 869 also are labeled with the alpha-numeric flip-flop Clear or Set designation.

FIGURE 22 is the logic block diagram of the Address Compare Circuitry and is comprised of five Type 914 Inverter AND/OR circuits of the type illustrated schematically in FIGURE 13*a*. The Address Compare circuitry is designated the M2 rank of logic. The five M2 Inverter AND/OR circuits which receive the input signals from the Word Address Register and from the Interlace Select Gates are designated M20, labeled 880; M21, labeled 882; M22, labeled 884; M23, labeled 886, and M24, labeled 888. It will be noted that each of the just-mentioned logic circuits utilize four AND input circuits. The input signals applied to the AND circuits are derived from the Word Address Register, that is, the H-Register illustrated in FIGURE 21, and from the Interlace Select Gates illustrated in FIGURE 19. Each of the input terminals carry the alpha-numeric designation of the M1 rank and stage of the H-Register stage which are coupled to the input lines. The reference numerals applied also correspond to the output terminals of the associated logic. The Address Compare circuitry operates such that when a particular signal for a bit position in the Angular Address stored in the Word Address Register compares (is of the same voltage value) with the associated shifted address signal for a read from the magnetic drum, the particular Inverter AND/OR circuit is activated and provides a signal on its output terminals indicative that the bit position comparison has been met. A Type 911 Inverter AND circuit designated M25 and labeled 890, of the type illustrated schematically in FIGURE 12*a*, is provided for combining the output signals from each of the Inverter AND/OR circuits and control input signals to ultimately determine whether or not the angular address stored in the Word Address Register compares exactly with the shifted Angular Address word read from the magnetic drum. Input signals to the Inverter AND circuit 890 are received from logic circuit 880 on line 892; from logic circuit 882 on line 894; from logic circuit 884 on line 896; from logic circuit 886 on line 898; and from logic circuit 888 on line 900. Two control signals are also applied to logic circuit M25, labeled 890. One of these control signals is provided on line 656 The comparison operation will be inhibited as long as the Inhibit Address Compare Signal is provided on line 656 (as described in conjunction with FIGURE 20). The Address Compare operation will also be inhibited until the Word Mark pulse is read from the Word Mark Track of the magnetic drum, as indicated by block 902, and the Word Mark signal applied as an enabling signal on line 904 to logic circuit M25. It can be seen, then, that when the Word Mark pulse is present on line 904, and when the Inhibit Address Compare signal is in the enabled condition on line 656, and when each comparison circuits, 880, 882, 884, 886, and 888 are in the comparison condition that all input signals to circuit M25 will be of the same condition and the associated AND circuit will be satisfied. This will provide a signal on line 906 indicative of the comparison condition. The comparison signal on line 906 will be provided as an input signal to a Type 906 Inverter circuit, designated M26 and labeled 908. Inverter circuit M26 will provide an output signal on line 910 which will indicate that Angular Address comparison has been made and that the storage location associated with the effective angular address can either be written into or read out of depending upon the function specified. The comparison signal developed on line 910 is provided to set a compare flip-flop (not shown) which maintains its Set condition for a period long enough to allow the designated operation to be completed.

The foregoing description has been directed to an embodiment utilizing a rotatable magnetic drum operated in the bit-serial reading and recording mode. It is apparent that the foregoing programmably alternable interlace selection system can equally as well be utilized with a rotatable magnetic drum system operable in the bit-parallel mode of reading and recording. For such an alteration it would be necessary only to modify the timing pulses read from the Timing Track and to utilize a parallel Angular Address Register in place of the serial shift type illustrated in FIGURE 20. The dynamically alterable interlace concepts can also be applied to a magnetic storage system wherein the record member is a rotatable disc storage number rather than the rotatable cylindrical magnetic drum of the type illustrated.

From the foregoing description of a preferred embodiment it can be seen that the various objects and purposes of the invention has been achived. While there have been shown and described and pointed out the fundamental novel features of the invention as applied to a preferred embodiment, and a description made of the operation of such embodiment, it will be understood that various omissions and substitutions and changes in the form and details of the device illustrated and in its operations may be made by those skilled in the art without departing from the spirit of the invention. It is the intention therefore, to be limited only as indicated by the scope of the appended claims.

What is claimed:

1. A data processing system including in combination:
at least one rotatable magnetic record member, including means for recording data words magnetically on the surface of said record member and for magnetically reading signals stored on the surface of said record member, said record member having control signals pre-recorded on the surface thereof;
a programmable computer capable of operating pursuant to a program of instruction, and including means for providing programmable alterable function words, said function words having at least a coded portion indicative of the desired time-relationship of sequentially addressable storage location on said record member; and
control means responsively coupled to said computer for selectively altering the time-relationship of sequentially addressable storage locations on said record member in response to said coded portion of said function word.

2. Apparatus as in claim 1 wherein said control means includes:
input means for receiving said computer-provided function word including said coded portion;
decoding means responsively coupled to said input means for providing an interlace selection signal indicative of the selected interlace arrangement in response to said coded portion;
receiving means for receiving and at least momentarily storing pre-recorded control signals indicative of angular address words read from the record member; and
interlace selection gates responsively coupled to said decoding means and arranged to receive as input signals, the angular address word signals stored in said receiving means, said interlace selection gates operative to alter the effective addressing value of said angular address words in response to said interlace selection signals.

3. A data processing system including in combination:
a plurality of rotatable magnetic record members, each of said record members including means for recording data words magnetically on the surface of said member and for magnetically reading signals stored on the surface of said member, said record member having control signals pre-recorded on the surface thereof, said pre-recorded control signals including distinguishable angular address words for use in assessing discrete annular storage locations on the surface of said record member;
a programmable computer capable of operating pursuant to a program of instructions; and
a record member control unit responsively coupled to said computer for receiving programmably alterable function words from said computer, said function words having at least a first coded portion indicative of the programmed interlace selection for the handling of data words and a second coded portion indicative of the selected one of said plurality of record members, said control unit further including means coupled to said selected record members for altering the effective value of said pre-recorded angular address words read from said record members for controlling the spatial relationship of sequentially addressable storage locations in accordance with the programmed interlace selection.

4. Apparatus as in claim 3 wherein said programmable computer comprises a digital computer having an addressable memory section for storing and operating programs of instructions, and arithmetic section, a control section for controlling the performances of said instructions, and input section and an output section for receiving signals from external devices and for sending signals to external devices respectively, and means for supplying said programmably alterable function words to said record member control unit for controlling the data word interlace arrangement.

5. Apparatus as in claim 3 wherein said record member comprises a rotatable magnetic drum assembly having a magnetizable material coated on the surface thereof, means for supporting and driving said drum, said record member having a plurality of read and write transducers arranged on said drum supporting means and in cooperative relationship with the surface thereof for reading and writing signals on the magnetizable surface as it moves past said transducers, and said record member including means for activating selected ones of said transducers in response to applied selection signals.

6. Apparatus as in claim 5 wherein said record member includes a plurality of control tracks pre-recorded on said magnetizable surface, said control tracks being unalterable during operation of said record member, and including a timing track for providing sequentially occuring timing signals in a continuous manner as said magnetic drum is rotated for use in synchronizing and timing the operation of said record member control unit, an angular address track having unique signal groupings recorded thereon, each of said groupings indicative of addressable storage positions, and each of said unique signal grouping occurring in a time-leading relationship to its associated storage position, a word mark track having word mark signals recorded thereon, each of said word mark signals having predetermined time-relationship to an associated one of said unique signal grouping.

7. Apparatus as in claim 3 wherein said record member control unit includes input means for receiving said programmably alterable function words from said computer, decoding means responsively coupled to said input means for providing an interlace selection signal indicative of the selected interlace arrangement in response to said first coded portion of said alterable function word, receiving means for receiving and at least momentarily storing, pre-recorded signals indicative of angular address words read from said record member, and interlace selection gates responsively coupled to said decoding means and arranged to receive as input signals the angular address word signals stored in said receiving means, said interlace selection gates operative to alter the effective addressing value of said angular address word in response to said interlace selection signal.

8. Apparatus as in claim 7 and further including in combination means for automatically advancing said second coded portion indicative of the selected one of said plurality of record members when the storage capacity of said selected record member has been exhausted during a continuous drum system operation, thereby automatically selecting the next available record member.

9. A data processing system including in combination:

at least one rotatable magnetic record member, including means for recording data words magnetically on the surface of said member and for magnetically reading signals stored on the surface of said member, said record member having control signals pre-recorded on the surface thereof, said pre-recorded control signals including distinguishable angular address words for use in accessing discrete angular storage locations on the surface of said record member;

a programmable computer capable of operating pursuant to a program of instructions; and a record member control unit responsively coupled to said computer for receiving programmably alterable function words from said computer, said function words having at least a coded portion indicative of the programmed interlace selection for the handling of data words, said control unit further including means coupled to said record member for altering the effective value of said pre-recorded angular address words for controlling the spatial relationship of sequentially addressable storage locations in accordance with the programmed interlace selection.

10. Apparatus as in claim 9 wherein said programmable computer comprises a digital computer having an addressable memory section for storing and operating program of instructions, an arithmetic section, a control section for controlling the performances of said instructions, an input section and an output section for receiving signals from external devices and for sending signals to external devices respectively, and means for supplying said programmably alterable function words to said record member control unit for controlling the data word interlace.

11. Apparatus as in claim 9 wherein said record member comprises a rotatable magnetic drum assembly having a magnetizable material coated on the surface thereof, means for supporting and driving said drum, said record member having a plurality of read and write transducers arranged on said drum supporting means and in cooperative relationship with the surface thereof for reading and writing signals on the magnetizable surface as it moves past said transducers, and said record member including means for activating selected ones of said transducers in response to applied selection signals.

12. Apparatus as in claim 9 wherein said record member includes a plurality of control tracks pre-recorded on said magnetic surface, said control tracks be unalterable during operation of said record member, and including a timing track for providing sequentially occurring timing signals in a continuous manner as said magnetic drum is rotated for use in synchronizing and timing the operation of said record member control unit, an angular address track having unique signal groupings recorded thereon, each of said grouping indicative of addressable storage positions, and each of said occurring unique signal grouping occurring in a time-leading relationship to its associated storage position, a word mark track having word mark signals recorded thereon, each of said word mark signals having predetermined time-relationship to an associated one of said unique signal grouping.

13. Apparatus as in claim 9 wherein said record member control unit includes input means for receiving said programmably alterable function words from said computer, decoding means responsively coupled to said input means for providing an interlace selection signal indicative of the selected interlace arrangement in response to said first coded portion of said alterable function word, receiving means for receiving and at least momentarily storing, pre-recorded signals indicative of angular address words read from said record member, and interlace selection gates responsively coupled to said decoding means and arranged to receive as input signals the angular address word signals stored in said receiving means, said interlace selection gates operative to alter the effective addressing value of said angular address word in response to said interlace selection signal.

14. An improved data processing system including in combination:

at least one rotatable magnetic record member having a magnetizable material coated on the surface thereof, means for supporting and driving said record member, said record member having a plurality of read and write transducers arranged on said record member supporting means and in cooperative relationship with the surface thereof for reading and writing signals on said magnetizable surface as it moves past the transducers, and said record member including means for activating selected ones of said transducers in response to applied selection signals, said record member including a plurality of control tracks pre-recorded on said magnetizable surface, said control track being unalterable during the operation of said record member, and including a timing track for providing sequentially occurring timing signals in a continuous manner as said magnetic record member is rotated for use in synchronizing and timing the operation of said data processing system, an angular address track having unique signal groupings recorded thereon, each of said signal groupings indicative of addressable storage positions, and each of said unique signal groupings occurring in a time-leading relationship to its associated storage position, a word mark track having word mark signals recorded thereon, each of said word mark signals having a predetermined time-relationship to an associated one of said unique signal groupings, and said record member including means for selectively recording data words magnetically on the surface of said record member and for magnetically reading signals stored on the surface of said record member;

a programmable computer having an addressable memory section for storing an operating program of instructions, an arithmetic section, a control section for controlling the performance of said constructions, an input section and an output section for receiving signals from external devices and for sending signals to external devices, and means for supplying programmably alterable function words to said record member, said function word having at least a first coded portion indicative of the programmed interlace selection for the handling of data words; and dynamically alterable control means coupled intermediate said record member and said computer and including first receiving means for receiving, and at least momentarily storing, said function word having said first coded portion indicative of a computer designated interlace selection for sequentially addressable words on said record member, second receiving means for receiving, and at least momentarily storing, signal groupings indicative of pre-recorded angular address words read from the surface of said record member, said angular address words respectively indicative of discrete data word storage locations, function word decoding means responsively coupled to said first receiving means, including means for decoding said first coded portion for determining the interlace designation, storage means for at least temporarily storing signal groupings indicative of computer designated angular address words, shifting means coupled to said second receiving means and responsively activated by said function word decoding means for shifting said pre-recorded angular address words read from the rotatable record member for effecting a programmably alterable effective address for each storage location on said record member, and comparing means coupled to said storage means and to said shifting means for providing an indicating output signal when the computer-designated angular address word has a predetermined relationship to the effective value of said pre-recorded angular address word, whereby the spatial relationship of sequentially addressable storage locations are interleaved in accordance with said coded value of said programmed interlace designation.

15. Dynamically alterable interlace control apparatus for use with at least one addressable cyclic magnetic record member, said record member having a plurality of independent data-storage tracks and pre-recorded control tracks, said control tracks including a continuous source of timing pulses and angular address words uniquely identifying discrete addressable storage locations on the surface of the said record member, said interlace control apparatus arranged to receive programmably alterable control signals from an associated computer, the interlace control apparatus including:

input means for receiving computer-generated function words said function words including at least coded interlace selection designators;

decoding means responsively coupled to said input means for providing interlace selection signals indicative of the selected interlace arrangement in response to said coded interlace selection designators;

receiving means for receiving, and at least momentarily storing, pre-recorded signals indicative of angular address words read from the record member; and interlace selection gates responsively coupled to said decoding means and arranged to receive as input signals the angular address word signals stored in said receiving means, said interlace selection gates operative to alter the effective addressing value of said angular address words in response to said interlace selection signals.

16. Apparatus as in claim 15 wherein said input means includes a storage register comprised of a plurality of bistable flip-flop stages, said storage register including means for setting said register to a first stable condition in response to an activating signal, and including means for gating said function word signals into the associated ones of said stages of said storage register.

17. Apparatus as in claim 15 wherein said decoding means includes a plurality of storage elements each having input circuits and output circuits for providing true and complement signal values for each of said coded interlace selection designators, each of said elements associated with a respective predetermined stage of said input means and including means for receiving a gating signal for causing the signals indicative of said coded interlace selection designators to be transferred from said input means and stored in said storage elements, and a plurality of signal combining circuits, each having input terminals and output terminals, ones of said input terminals respectively coupled to predetermined ones of said output circuits for providing an active driving signal on one of said output terminals and for deactivating all other ones of said output terminals in response to said coded interlace designators.

18. Apparatus as in claim 15 wherein said receiving means includes a plurality of bistable circuits, each of said bistable circuits having true and complement output circuits, and including input circuits for receiving angular address words read from the record member.

19. Apparatus as in claim 15 wherein said receiving means includes a shift register having a predetermined number of bistable circuit stages, each of said stages having true and complement output circuits, said shift register having means for serially receiving signals collectively indicative of angular address words read from said record member, and said shift register further including means for receiving pre-recorded timing signals read from said record member for controlling the serial shifting and assembly of the angular address signals in the said shift register.

20. The apparatus as in claim 15 wherein said interlace selection gates comprise an angular address word shifting circuit including a plurality of logic circuits, each of said logic circuits having an output circuit and having a plurality of signal-combining input circuits, said plurality of signal-combining input circuits for each of said logic circuits being equal to the number of said decoding means output terminals and each of said signal-combining circuits for each of said logic circuits being coupled to a different one of said decoding means output terminals, the active one of said decoding means output terminals enabling the associated ones of said signal-combining input circuits, and the inactive ones of said decoding means output terminals disabling the respectively associated ones of said signal-combining input circuits, and means for coupling said true and complement output circuit of said receiving means to predetermined ones of said signal-combining input circuits, the signals provided at said logic circuit output terminals in response to said activating signals and said angular address words being indicative of the effective value of said angular address words read from said record member for accessing the interlaced addressable storage locations on said record member.

21. A dynamically alterable data-word interlace control apparatus for use with at least one magnetic record member, said record member having control signals pre-recorded thereon, said control apparatus comprising:
means for receiving signals indicative of coded interlace designators, said interlace designators defining the time-relationship of sequentially addressable storage locations on the record member; and
dynamically alterable control means controlled by the timing signals pre-recorded on the record member for selectively altering said time-relationship of sequentially addressable storage locations in response to said interlace-designators.

22. Dynamically alterable interlace control apparatus for use with at least one addressable cyclic magnetic record member, said record member having a plurality of independent data-storage tracks and pre-recorded control tracks, said control tracks including a continuous source of timing pulses and angular address words uniquely identifying discrete addressable storage locations on the surface of said record member, said interlace control apparatus arranged to receive programmably alterable control signals, said progammably alterable control signals including coded interlace designators, said interlace control apparatus including:
input means for receiving programmably alterable control signals including coded interlace selection designators, said input means including a storage register comprised of a plurality of bistable flip-flop stages, said storage register having means for setting said register to a first stable condition in response to an activating signal, and including gating means for gating said control signals into associated ones of said stages of said storage register;
decoding means responsively coupled to said input means for providing interlace selection signals indicative of the selected interlace arrangement in response to said coded interlace designators, said decoding means including a plurality of storage elements each having input circuits and output circuits for providing true and complement signal values for each of said coded interlace selection designators, each of said elements associated with a respective predetermined stage of said storage register and including means for receiving a gating signal for causing the signals indicative of said coded interlace selection designators to be transferred from said storage register and stored in said storage elements, and a plurality of signal combining circuits, each having input terminals and output terminals, ones of said input terminals respectively coupled to predetermined ones of said output circuits for providing an active driving signal on one of said output terminals and for deactivating all other ones of said output terminals in response to said coded interlace designators;
angular address receiving means for receiving, and at least momentarily storing, pre-recorded signals indicative of angular address words read from the record member, said angular address word receiving means including a shift register having a predetermined number of bistable circuit stages, each of said stages having true and complement output circuits, said shift register having means for serially receiving signals collectively indicative of said angular address words read from said record member, and said shift register further including means for receiving pre-recorded timing signals read from said record member for controlling the serial shifting and assembly of said angular address signals in said shift register; and
interlace selection gates responsively coupled to said decoding means and arranged to receive as input signals the angular address word signals stored in said receiving means, said interlace selection gates operative to alter the effective addressing value of said angular address words in response to said interlace selection designators, said interlace selection gates including an angular address word shifting circuit including a plurality of logic circuits, each of said logic circuits having an output circuit and having a plurality of signal-combining input circuits, said plurality of signal-combining circuits for each of said logic circuits being equal to the number of said decoding means output terminals and each of said signal-combining circuits for each of said logic circuits being coupled to a different one of said decoding means output terminals, the active one of said decoding means output terminals enabling the associated ones of said signal-combining input circuits, and the inactive one of said decoding means output terminals disabling the respectively associated ones of said signal-combining input circuits, and means for coupling said true and complement output circuits of said receiving means to predetermined ones of said signal-combining input circuits, the signals provided at said logic circuit output terminals in response to said activating signals and said angular address words being indicative of the effective value of said angular address words read from said record member for accessing the interlaced addressable storage locations on said record member.

23. Dynamically alterable control apparatus for use with at least one addressable rotatable magnetic record member, said record member having angular address words pre-recorded thereon for defining discrete addressable storage locations and having pre-recorded control signals, and a programmable computer, said control apparatus including:
first receiving means for receiving, and at least momentarily storing, a plurality of coded signals indicative of a computer-supplied function word, said function word having a first coded portion indicative of a computer designated record member operation, and a second coded portion indicative of the programmed interlace designation for sequentially addressable data words on the rotatable record member;
second receiving means for receiving, and at least momentarily storing, signal groupings indicative of prerecorded angular address words read from the surface of a rotatable record member, said angular address words respectively indicative of discrete data word storage locations;
function word decoding means responsively coupled to said first receiving means, including means for decoding said first coded portions for determining the computer-designated record member operation and including means for decoding said second coded portion for determining the interlace designations;
storage means for at least temporarily storing signal groupings indicative of computer-designated angular address words;
gating and shifting means coupled to said second receiving means and responsively activated by said function word decoding means for shifting said pre-recorded angular address words read from the rotatable record member for effecting a programmably alterable effective address for each of said angular address words for use in storage location on the record member; and comparing means coupled to said storage means and to said gating and shifting means for providing an indicating output signal when the computer-designated angular address word has a predetermined relationship to said effective valve of said pre-recorded angular address words, whereby the spatial relationship of sequentially addressable storage locations are interleaved in accordance with the coded value of said programmed interlaced designation.

24. Apparatus as in claim 23 wherein said first receiving means includes a storage register comprised of a plurality of bistable flip-flop stages, said storage register including means for setting said register to a first stable condition in response to an activating signal, and including means for gating said function word signals into the associated ones of said stages of said storage register.

25. Apparatus as in claim 23 wherein said second receiving means includes a plurality of bistable circuits, each of said bistable circuits having true and complement output circuits, and including input circuits for receiving angular address words read from the record member.

26. Apparatus as in claim 23 wherein said second receiving means includes a shift register having a predetermined number of bistable circuit stages, each of said stages having true and complement output circuits, said shift register having means for serially receiving signals collectively indicative of angular address words read from said record member, and said shift register further including means for receiving timing signals read from said record member for controlling the serial shifting and assembly of the angular address signals in the said shift register.

27. Apparatus as in claim 23 wherein said function word decoding means includes a plurality of storage elements each having input circuits and output circuits for providing true and complement signal values for each of said coded interlace selection designators, each of said elements associated with a respective predetermined stage of said storage register and including means for receiving a gating signal for causing the signals indicative of said coded interlace selection designators to be transferred from said storage register and stored in said storage elements, and a plurality of signal combining circuits each having input terminals and output terminals, ones of said input terminals respectively coupled to predetermined ones of said output circuits for providing an active driving signal on one of said output terminals and for deactivating all other ones of said output terminals in response to said coded interlace designators.

28. The apparatus as in claim 23 wherein said gating and shifting means comprise an angular address word shifting circuit including a plurality of logic circuits, each of said logic circuits having an output circuit and having a plurality of signal-combining input circuits, said plurality of signal-combining input circuits for each of said logic circuits being equal to the number of said output terminals from said decoding means and each of said signal-combining circuits for each of said logic circuits being coupled to a different one of said decoding means output terminals, the active one of said decoding means output terminals enabling the associated ones of said signal-combining input circuits, and the inactive ones of said decoding means output terminals disabling the respectively associated ones of said signal-combining input circuits, and means for coupling said true and complement circuits of said receiving means to predetermined ones of said signal-combining input circuits, the signals provided at said logic circuit output terminals in response to said activating signals and said angular address words being indicative of the effective value of said angular address words read from said record member for accessing interlace addressable storage locations on said record member.

29. Apparatus as in claim 23 wherein said comparing means includes comparing logic circuits having input terminals and output terminals, ones of said input terminals coupled to said storage means and to said gating and shifting means for providing signals at said output terminals indicative of the comparison relationships between the computer-designated angular address word stored in said storage means and the effective value of the angular address words read from said record member and provided by the gating and shifting means, and gating logic means having an output circuit and a plurality of input circuits, ones of said gating logic input circuits coupled to associated ones of said comparing logic circuit output terminals, said gating logic means including means for coupling word mark control signals read from said record member to another of said gating logic input circuits for enabling said gating logic means, said gating logic means providing a signal on said gating logic output circuit indicative of the state comparison between said computer-designated angular address word and the effective value of the pre-recorded angular address words read from said record member when said word mark signal enables said gating logic means.

30. Dynamically alterable control apparatus for use with at least one addressable rotatable magnetic record member, said record member having angular address words pre-recoded thereon for defining discrete storage locations and having pre-recorded control signals, and a programmable computer, said control apparatus including:

first receiving means for receiving, and at least momentarily storing, a plurality of coded signals indicative of a computer-supplied function word, said function word comprised of a plurality of signals and having a first coded portion indicative of a computer-designated record member operation and a second coded designator portion indicative of the programmed interlace designation for sequentially addressable words on the rotatable record member, said first receiving means including a storage register having a plurality of bistable flip-flop stages, and including means for setting said register to a first stable condition in response to an activating signal, and including further means for gating said function word signals into the associated ones of stages of said storage register;

second receiving means for receiving, and at least momentarily storing, signal groupings indicative of pre-recorded angular address words read from the surface of a rotatable record member, said angular address words respectively indicative of discrete data words storage locations, said second receiving means including a plurality of bistable circuits, each of said bistable circuits having true and complement output circuits, and including input circuits for receiving angular address words read from said record member;

function words decoding means responsively coupled to said first receiving means, including means for decoding said first coded portion for determining the computer-designated record member operation and including means for decoding said second coded designator portion for determining the interlace designation, said function word decoding means including a plurality of storage elements each having input circuits and output circuits for providing true and complement signal values for each of said coded interlace selection designators, each of said elements associated with a respective predetermined stage of said storage register and including means for receiving a gating signal for causing the signals indicative of said interlace selection designators to be transferred from said storage register and stored in said storage elements, and a plurality of signal combining circuits each having input terminals and output terminals, ones of said signal combining circuits input terminals respectively coupled to predetermined ones of said storage element output circuits for providing an active driving signal on one of said output signal combining circuits output terminals and for deactivating all other ones of said signal combining circuits output terminals in response to said coded interlace designators;

storage means for at least temporarily storing signal groupings indicative of computer designated angular address words, said storage means including a plurality of bistable flip-flop stages;

gating and shifting means coupled to said second receiving means and responsively activated by said function word decoding means for shifting said prerecorded angular address words read from the rotatable record member for effecting a programmably alterable effective address for each of said angular address words for use in storage location on the record member, said gating and shifting means including an angular address word shifting circuit including a plurality of shifting logic circuits, each of said shifting logic circuits having an output circuit and having a plurality of signal combining input circuits, said plurality of signal combining input circuits for each of said shifting logic circuits being equal to the number of said output terminals from said decoding means and each of said signal combining circuits for each of said shifting logic circuits being coupled to a different one of said decoding means output terminals, the active one of said decoding means output terminals enabling the associated ones of said signal-combining input circuits, and the inactive ones of said decoding means output terminals disabling the respectively associated ones of said signal-combining input circuits, and means for coupling said true and complement circuits of said second receiving means to predetermine ones of said shifting logic circuit signal-combining input circuits, the signals provided at said shifting logic circuit output terminals in response to said activating signals and said angular address words being indicative of the effective value of said angular address words read from said record member; and comparing means coupled to said storage means and to said gating and shifting means for providing an indicating output signal when the computer-designated angular address word has a predetermined relationship to said effective value of said pre-recorded angular address words, whereby the spatial relationship of sequentially addressable storage locations are interleaved in accordance with the coded value of said programmed interlace designation.

References Cited

UNITED STATES PATENTS

| | | | |
|---|---|---|---|
| 3,311,886 | 3/1967 | Herman et al. | 340—172.5 |
| 3,305,842 | 2/1967 | Yuichiro Oya | 340—172.5 |
| 3,060,414 | 10/1962 | Dirks | 340—172.5 |
| 3,056,110 | 9/1962 | Cypser et al. | 340—172.5 |
| 2,947,478 | 8/1960 | Lentz et al. | 340—172.5 |
| 2,902,679 | 9/1959 | Phillipo et al. | 340—172.5 |
| 2,849,704 | 8/1958 | Neff | 340—172.5 |

ROBERT C. BAILEY, *Primary Examiner.*

G. D. SHAW, *Assistant Examiner.*